US008010806B2

(12) United States Patent　　(10) Patent No.: US 8,010,806 B2
Takashima et al.　　(45) Date of Patent: Aug. 30, 2011

(54) INFORMATION PROCESSING APPARATUS AND METHOD, INFORMATION RECORDING MEDIUM, AND COMPUTER PROGRAM

(75) Inventors: Yoshikazu Takashima, Tokyo (JP); Kenjiro Ueda, Kanagawa (JP); Satoshi Kitani, Tokyo (JP); Tomoyuki Asano, Kanagawa (JP); Katsumi Muramatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 1440 days.

(21) Appl. No.: 11/151,401

(22) Filed: Jun. 14, 2005

(65) Prior Publication Data

US 2005/0289139 A1　　Dec. 29, 2005

(30) Foreign Application Priority Data

Jun. 24, 2004　(JP) ................................. 2004-185896
Aug. 26, 2004　(JP) ................................. 2004-246641

(51) Int. Cl.
　G06F 11/30　　(2006.01)
(52) U.S. Cl. .......... 713/193; 713/189; 726/27; 380/201; 705/51; 705/901; 705/912
(58) Field of Classification Search .................. 713/165, 713/166, 189, 1, 100, 193; 380/201, 231, 380/277, 278, 200; 726/1, 2, 26, 27, 31, 726/33; 705/50, 51, 52, 57, 59, 901, 911, 705/912; 399/75, 80, 81
See application file for complete search history.

(56) References Cited

U.S. PATENT DOCUMENTS

| 5,469,272 | A | * | 11/1995 | Kubota et al. | .................... 386/75 |
| 5,978,012 | A | * | 11/1999 | Ozawa et al. | ................... 725/131 |
| 6,032,202 | A | * | 2/2000 | Lea et al. | ........................... 710/8 |
| 7,038,985 | B2 | | 5/2006 | Ryal | ........................... 369/53.21 |
| 7,092,392 | B2 | * | 8/2006 | Yoshino et al. | ............... 370/392 |
| 7,149,450 | B2 | * | 12/2006 | Takemura | ......................... 399/75 |
| 7,356,144 | B2 | * | 4/2008 | Nishimoto et al. | ........... 380/210 |
| 7,398,556 | B2 | * | 7/2008 | Erickson | ........................... 726/27 |
| 7,734,147 | B2 | | 6/2010 | Oka | .................... 386/83 |
| 2002/0029241 | A1 | * | 3/2002 | Yokono et al. | ................ 709/202 |
| 2002/0091642 | A1 | * | 7/2002 | Rahnasto | ......................... 705/52 |
| 2002/0152381 | A1 | | 10/2002 | Kuriya et al. | .................. 713/170 |
| 2003/0061165 | A1 | * | 3/2003 | Okamoto et al. | ............... 705/52 |
| 2003/0226026 | A1 | | 12/2003 | Magoshi | ....................... 713/193 |
| 2004/0059937 | A1 | * | 3/2004 | Nakano | ......................... 713/200 |
| 2004/0093494 | A1 | * | 5/2004 | Nishimoto et al. | ........... 713/165 |
| 2004/0177044 | A1 | | 9/2004 | Peterka | ........................... 705/57 |
| 2004/0228487 | A1 | * | 11/2004 | Maeda et al. | ................. 380/232 |

(Continued)

FOREIGN PATENT DOCUMENTS

JP　　3-12070　　1/1991

(Continued)

*Primary Examiner* — Nasser Moazzami
*Assistant Examiner* — Shanto M Abedin
(74) *Attorney, Agent, or Firm* — Oblon, Spivak, McClelland, Maier & Neustadt, L.L.P.

(57) ABSTRACT

An information processing apparatus includes a content usage control information analyzer configured to read content usage control information recorded on an information recording medium and to perform content usage processing according to the content usage control information. The content usage control information analyzer determines whether the usage of content corresponding to the content usage control information is allowed based on a value of a flag included in the content usage control information and device information whether the information processing apparatus is an extended device having an extended function or a basic device without an extended function.

10 Claims, 46 Drawing Sheets

U.S. PATENT DOCUMENTS

| | | | |
|---|---|---|---|
| 2004/0233467 A1* | 11/2004 | Namizuka | 358/1.13 |
| 2004/0236697 A1 | 11/2004 | Nagao | 705/59 |
| 2005/0114295 A1* | 5/2005 | Takashima | 707/1 |
| 2005/0125356 A1 | 6/2005 | Han et al. | 705/57 |
| 2005/0131998 A1 | 6/2005 | Takashima | 709/203 |
| 2005/0144140 A1* | 6/2005 | Nagao | 705/59 |
| 2005/0144141 A1* | 6/2005 | Nagao | 705/59 |
| 2005/0198222 A1 | 9/2005 | Kohinata et al. | 709/220 |
| 2005/0204037 A1 | 9/2005 | Levy | 709/225 |

FOREIGN PATENT DOCUMENTS

| | | |
|---|---|---|
| JP | 2002-16984 | 1/2002 |
| JP | 2003-345660 | 12/2003 |
| JP | 2005-92830 | 4/2005 |

\* cited by examiner

FIG. 4

| INDEX OR APPLICATION FILE IN APPLICATION LAYER OR DATA GROUP | CONTENT MANAGEMENT UNIT (CPS) | UNIT KEY (CPS) | |
|---|---|---|---|
| FIRST PLAYBACK | CPS1 | Ku1 | ⎫ MAIN CONTENT DATA |
| TOP MENU | CPS1 | Ku1 | |
| TITLE 1 | CPS2 | Ku2 | |
| ... | ... | ... | |
| APPLICATION 1 | CPS3 | Ku3 | |
| ... | ... | ... | ⎭ |
| DATA GROUP 1 | CPS4 | Ku4 | ⎫ SUB-CONTENT DATA |
| DATA GROUP 2 | CPS5 | Ku5 | |
| ... | ... | ... | ⎭ |

FIG. 7

| CONTENT MANAGEMENT UNIT (CPS) | INITIAL STATE | CURRENT STATE |
|---|---|---|
| CPS1 | DISCRETE ONLY | DISCRETE |
| CPS2 | DISCRETE INITIALLY | BOUND |
| CPS3 | BOUND ONLY | BOUND |
| CPS4 | BOUND INITIALLY | DISCRETE |
| ... | ... | ... |
| CPSm | DISCRETE ONLY | DISCRETE |

FIG. 8A

| field name | num_of_bits |
|---|---|
| Num_of_Content | 16 |
| for(I=0; I<Num_of_Content; I++){ | |
|     CCI_and_other_info_for_Content [I] | 128 |
| } | |

FIG. 8B

DETAILS OF CCI_and_other_info_for_Content [I] : PART OF OR THE ENTIRE FOLLOWING INFORMATION IS STORED AS FLAG OR VALUE (THE NUMBER OF BITS FOR VALUE IS NOT FIXED)

| | (FLAG/VALUE) | (DESCRIPTION) |
|---|---|---|
| <OPERATION IN DISCRETE STATE> | | |
| PLAYBACK | FLAG | OK/NG |
| PLAYBACK METHOD FOR CONTENT THAT CANNOT BE PLAYED BACK IN DISCRETE STATE | VALUE | CONNECT TO KEY DISTRIBUTION SERVER OR INSERT MEMORY CARD WITH KEY THEREIN |
| DESIGNATION OF SERVER | VALUE | INDEX VALUE TO SERVER LIST |
| <OPERATION IN BOUND STATE> | | |
| COPY-STREAMING COMPATIBILITY INFORMATION | VALUE | COMPATIBILITY INFORMATION FOR PLAYING BACK CONTENT IN ANOTHER DEVICE WITHIN NETWORK |
| COPY-STREAMING DATA CONVERSION METHOD | VALUE | METHOD FOR CONVERTING CONTENT FOR ANOTHER DEVICE |
| WHETHER COPY ON THE SAME TYPE OF RECORDING MEDIUM IN NETWORK IS ALLOWED | FLAG | OK/NG |
| NUMBER OF COPIES ON THE SAME TYPE OF RECORDING MEDIUM IN NETWORK | VALUE | NUMBER |
| EXPIRATION DATE OF COPY ON THE SAME TYPE OF RECORDING MEDIUM IN NETWORK | VALUE | EXPIRATION DATE |
| WHETHER COPY ON DIFFERENT TYPE OF RECORDING MEDIUM IN NETWORK IS ALLOWED | FLAG | OK/NG |
| NUMBER OF COPIES ON DIFFERENT TYPE OF RECORDING MEDIUM IN NETWORK | VALUE | NUMBER |
| EXPIRATION DATE OF COPY ON DIFFERENT TYPE OF RECORDING MEDIUM IN NETWORK | VALUE | EXPIRATION DATE |
| PRESENCE OR ABSENCE OF COPY DATA ON DIFFERENT TYPE OF RECORDING MEDIUM IN NETWORK | FLAG | OK/NG |
| DESIGNATION OF COPY DATA ON DIFFERENT TYPE OF RECORDING MEDIUM IN NETWORK | VALUE | INDEX VALUE INDICATING COPY DATA |
| WHETHER COPY ON PORTABLE UNIT IS ALLOWED | FLAG | OK/NG |
| NUMBER OF COPIES ON PORTABLE UNIT | VALUE | NUMBER |
| EXPIRATION DATE OF COPY ON PORTABLE UNIT | VALUE | EXPIRATION DATE |
| PRESENCE OR ABSENCE OF COPY DATA ON PORTABLE UNIT | FLAG | OK/NG |
| DESIGNATION OF COPY DATA ON PORTABLE UNIT | VALUE | INDEX VALUE INDICATING COPY DATA |
| WHETHER STREAMING IS ALLOWED | FLAG | OK/NG |
| DESIGNATION OF SUBJECT TO RECEIVE STREAMING DATA | VALUE | RESTRICT SUBJECT DEVICE |
| WHETHER REMOTE PLAYBACK IS ALLOWED | FLAG | OK/NG |
| DESIGNATION OF SUBJECT TO RECEIVE REMOTE PLAYBACK DATA | VALUE | RESTRICT SUBJECT DEVICE |
| HANDLING WHEN CONTENT IS NO LONGER IN BOUND STATE | VALUE | IMMEDIATELY INVALIDATE, INVALIDATE AFTER PREDETERMINED PERIOD, OR DELETE |
| TYPE OF DOWNLOADED DATA | VALUE | TYPE OF DOWNLOADED DATA (SUBTITLE, AUDIO, STILL IMAGE) |
| METHOD FOR OBTAINING DOWNLOADED DATA | VALUE | CONNECT TO DOWNLOAD SERVER OR INSERT MEMORY CARD WITH DATA THEREIN |
| DESIGNATION OF DOWNLOAD SERVER | VALUE | INDEX VALUE TO DOWNLOAD SERVER LIST |
| WHETHER OPERATION CONTROL INFORMATION IS OBTAINED FROM SERVER | FLAG | COMPLY WITH OPERATION CONTROL INFORMATION OBTAINED FROM SERVER |
| DESIGNATION OF SERVER TO OBTAIN OPERATION CONTROL INFORMATION | VALUE | INDEX VALUE TO SERVER LIST INDICATING SERVER FOR OBTAINING OPERATION CONTROL INFORMATION |

| field name | num_of_bits |
|---|---|
| Num_of_Content | 16 |
| for(I=0; I<Num_of_Content; I++){ | |
|   Num_of_function[I] | 16 |
|   for(J=0; J<Num_of_function; J++){ | |
|     CCI_and_other_info_length | 16 |
|     CCI_and_other_info_type | 8 |
|     CCI_and_other_info_value | 8 |
|     Additional_info | N |
|   } | |
| } | |

FIG. 9B

| field name | num_of_bits |
|---|---|
| Num_of_Content | 16 |
| for(I=0; I<Num_of_Content; I++){ | |
|   Num_of_Discrete_function[I] | 16 |
|   for(J=0; J<Num_of_function; J++){ | |
|     CCI_and_other_info_length | 16 |
|     CCI_and_other_info_type | 8 |
|     CCI_and_other_info_value | 8 |
|     Additional_info | N |
|   } | |
|   Num_of_Bound_function[I] | 16 |
|   for(J=0; J<Num_of_function; J++){ | |
|     CCI_and_other_info_length | 16 |
|     CCI_and_other_info_type | 8 |
|     CCI_and_other_info_value | 8 |
|     Additional_info | N |
|   } | |
| } | |

FIG. 9C

CCI_and_other_info_type LIST AND CORRESPONDING CCI_and_other_info_value, Additional_info

| "CCI_and_other_info_type" | "CCI_and_other_info_value" | "Additional_info" |
|---|---|---|
| PLAYBACK IN DISCRETE STATE | OK/NG | PLAYBACK METHOD FOR CONTENT THAT CANNOT BE PLAYED BACK IN DISCRETE STATE DESIGNATION OF SERVER |
| COPY ON THE SAME TYPE OF RECORDING MEDIUM IN NETWORK | OK/NG | NUMBER OF COPIES, EXPIRATION DATE |
| COPY ON DIFFERENT TYPE OF RECORDING MEDIUM IN NETWORK | OK/NG | NUMBER OF COPIES, EXPIRATION DATE, PRESENCE OR ABSENCE OF COPY DATA, DESIGNATION OF DATA CONVERSION METHOD |
| COPY ON PORTABLE UNIT | OK/NG | NUMBER OF COPIES, EXPIRATION DATE, PRESENCE OR ABSENCE OF COPY DATA, DESIGNATION OF COPY DATA, DESIGNATION OF DATA CONVERSION METHOD |
| STREAMING IN NETWORK | OK/NG | DESIGNATE STREAMING SUBJECT DEVICE, PRESENCE OR ABSENCE OF STREAMING DATA, DESIGNATION OF STREAMING DATA, DESIGNATION OF DATA CONVERSION METHOD |
| REMOTE PLAYBACK IN NETWORK | OK/NG | DESIGNATE REMOTE PLAYBACK SUBJECT DEVICE |
| HANDLING WHEN CONTENT IS NO LONGER IN BOUND STATE | VALUE | IMMEDIATELY INVALIDATE, INVALIDATE AFTER PREDETERMINED PERIOD, OR DELETE |
| PLAYBACK OF DOWNLOADED DATA | VALUE (ACCORDING TO DATA TYPE) | METHOD FOR OBTAINING DOWNLOADED DATA, DESIGNATION OF DOWNLOAD SERVER |
| INFORMATION FOR OBTAINING OPERATION CONTROL INFORMATION FROM SERVER | VALUE | DESIGNATION OF SERVER |
| USER DEFINITION INFORMATION | | UNIQUELY DEFINED BY CONTENT OWNER, UNIQUELY DEFINED BY CONTENT ADMINISTRATOR |

502 — INFORMATION FOR OBTAINING OPERATION CONTROL INFORMATION FROM SERVER
503 — USER DEFINITION INFORMATION (A) STORED IN USER DATA AREA ON RECORDING MEDIUM AS DEDICATED FILE (B) INSERTED INTO AV FORMAT FILE IN USER DATA AREA ON RECORDING MEDIUM (C) STORED IN PHYSICAL AREA (THAT CANNOT BE DIRECTLY ACCESSED BY USER) ON RECORDING MEDIUM (D) STORED IN EXTERNAL SERVER

FIG. 19

| [field name] | [num_of_bits] |
|---|---|
| Unit_Key_Generertion_Value.inf { | |
|   CPS_Unit_number_for_FirstPlayback | 16 |
|   CPS_Unit_number_for_TopMenu | 16 |
|   Number of Titles | 16 |
|   for(i=1; i< Number_of_Titles+1; i++){ | |
|     CPS_Unit_number for Title #i | 16 |
|   } | |
|   Number of CPS_Units | 16 |
|   for(i=1; i< Number_of_CPS_Unit+1; i++){ | |
|     Unit Key Generation Value for CPS_Unit #i | 128 |
|   } | |
| } | |

- IF FIRST PLAYBACK IS NOT IN AV CONTENT, CPS_Unit_number_for_FirstPlayback = 0
- IF TOP MENU IS NOT IN AV CONTENT, CPS_Unit_number_for_TopMenu = 0
- Title#1 – Title# [Number_of_Titles] DEFINES CPS_Unit NUMBERS IN THE SYNTAX

FIG. 25A

CCI_and_other_info(): EXAMPLES OF BASIC INFORMATION

| (NAME) | (DESCRIPTION) |
|---|---|
| WHETHER COPY IS ALLOWED | COPY ALLOWED / NOT ALLOWED / ONLY ONE GENERATION ALLOWED |
| VIDEO OUTPUT RESOLUTION RESTRICTION INFORMATION | OUTPUT RESTRICTED / NOT RESTRICTED |
| ANALOG COPY CONTROL INFORMATION | ALLOWED / NOT ALLOWED (DESIGNATE ANALOG-COPY-PROOF TECHNIQUE) |
| INFORMATION INDICATING WHETHER DATA IS ENCRYPTED | ENCRYPTED / NOT ENCRYPTED |
| INFORMATION INDICATING WHETHER COPYRIGHT IS ASSERTED | COPYRIGHT ASSERTED / NOT ASSERTED |

FIG. 25B

CCI_and_other_info(): EXAMPLES OF EXTENDED INFORMATION

| (NAME) | (DESCRIPTION) |
|---|---|
| WHETHER PLAYBACK IN SINGLE DISC IS POSSIBLE | INDICATE WHETHER CONTENT CAN BE PLAYED BACK ONLY BY DISC INFORMATION |
| PLAYBACK METHOD FOR CONTENT THAT CANNOT BE PLAYED BACK IN SINGLE DISC | CONNECT TO KEY DISTRIBUTION SERVER, INSERT MEMORY CARD WITH KEY THEREIN |
| DESIGNATION OF SERVER | INDEX VALUE TO SERVER LIST |
| COPY-STREAMING COMPATIBILITY INFORMATION | COMPATIBILITY INFORMATION FOR PLAYING BACK CONTENT IN ANOTHER DEVICE IN NETWORK |
| COPY-STREAMING DATA CONVERSION METHOD | METHOD USED FOR CONVERTING CONTENT FOR ANOTHER DEVICE |
| WHETHER COPY ON THE SAME TYPE OF RECORDING MEDIUM IN NETWORK IS ALLOWED | OK / NG |
| NUMBER OF COPIES ON THE SAME TYPE OF RECORDING MEDIUM IN NETWORK | NUMBER |
| EXPIRATION OF COPY ON THE SAME TYPE OF RECORDING MEDIUM IN NETWORK | EXPIRATION DATE |
| WHETHER COPY ON DIFFERENT TYPE OF RECORDING MEDIUM IN NETWORK IS ALLOWED | OK / NG |
| NUMBER OF COPIES ON DIFFERENT TYPE OF RECORDING MEDIUM IN NETWORK | NUMBER |
| EXPIRATION OF COPY ON DIFFERENT TYPE OF RECORDING MEDIUM IN NETWORK | EXPIRATION DATE |
| PRESENCE OR ABSENCE OF COPY DATA ON DIFFERENT TYPE OF RECORDING MEDIUM IN NETWORK | OK / NG |
| DESIGNATION OF COPY DATA ON DIFFERENT TYPE OF RECORDING MEDIUM IN NETWORK | INDEX VALUE INDICATING COPY DATA |
| WHETHER COPY ON PORTABLE UNIT IS ALLOWED | OK / NG |
| NUMBER OF COPIES ON PORTABLE UNIT | NUMBER |
| EXPIRATION DATE OF COPY ON PORTABLE UNIT | EXPIRATION DATE |
| PRESENCE OR ABSENCE OF COPY DATA ON PORTABLE UNIT | OK / NG |
| DESIGNATION OF COPY DATA ON PORTABLE UNIT | INDEX VALUE INDICATING COPY DATA |
| WHETHER STREAMING IS ALLOWED | OK / NG |
| DESIGNATION OF SUBJECT TO RECEIVE STREAMING DATA | RESTRICT SUBJECT DEVICE |
| WHETHER REMOTE PLAYBACK IS ALLOWED | OK / NG |
| DESIGNATION OF SUBJECT TO RECEIVE REMOTE PLAYBACK DATA | RESTRICT SUBJECT DEVICE |
| HANDLING OF CONTENT WHEN USAGE IN NETWORK IS FINISHED | IMMEDIATELY INVALIDATE, INVALIDATE AFTER PREDETERMINED PERIOD, DELETE |
| DOWNLOADED DATA TYPE | TYPE OF DOWNLOADED DATA (SUBTITLE, AUDIO, STILL IMAGE) |
| METHOD FOR OBTAINING DOWNLOADED DATA | CONNECT TO DOWNLOAD SERVER, INSERT MEMORY CARD WITH DATA THEREIN |
| DESIGNATION OF DOWNLOAD SERVER | INDEX VALUE TO DOWNLOAD SERVER LIST |
| WHETHER OPERATION CONTROL INFORMATION IS OBTAINED FROM SERVER | COMPLY WITH OPERATION CONTROL INFORMATION OBTAINED FROM SERVER |
| DESIGNATION OF SERVER TO OBTAIN OPERATION CONTROL INFORMATION | INDEX VALUE TO SERVER LIST INDICATING SERVER FOR OBTAINING OPERATION CONTROL INFORMATION |

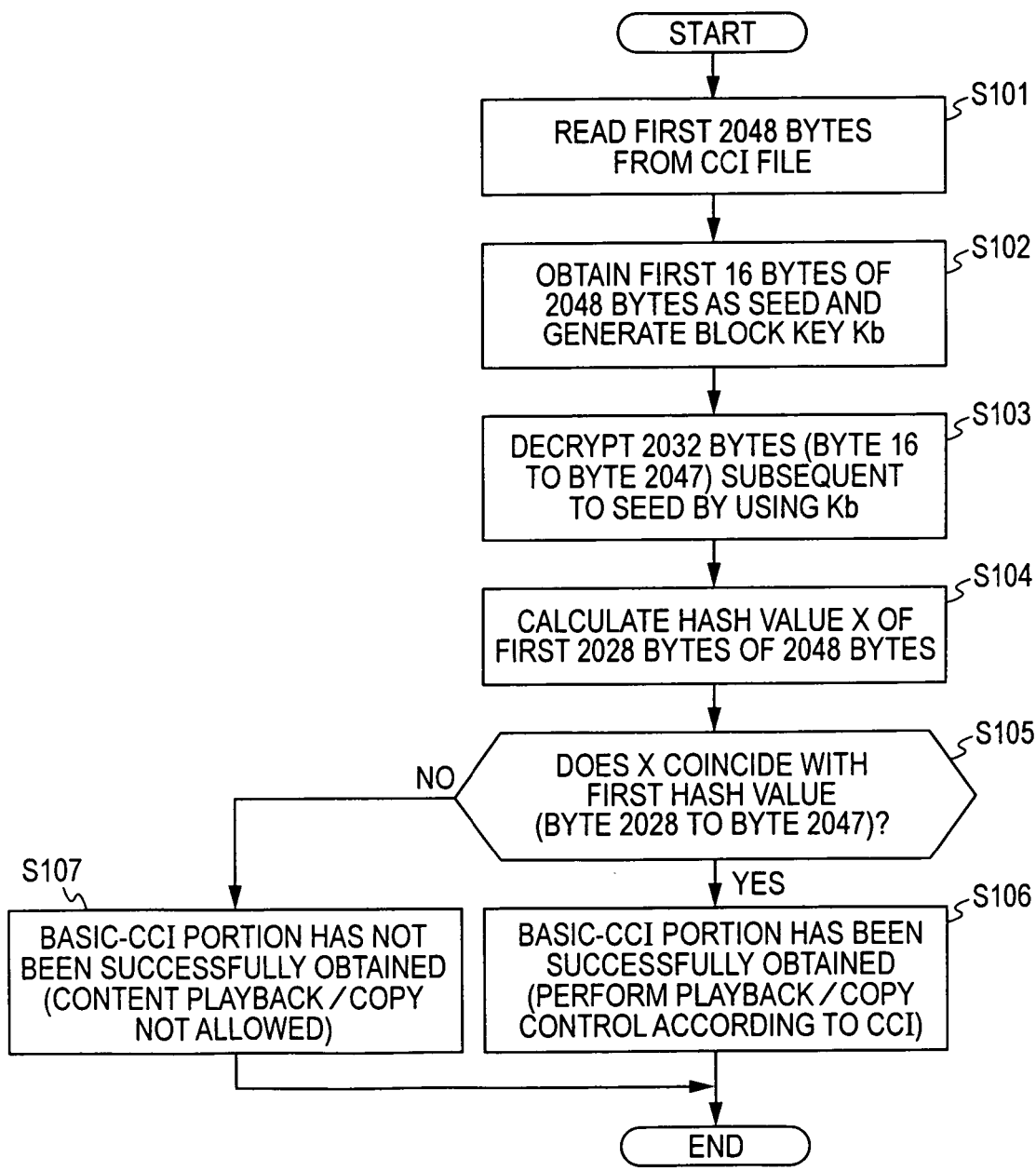

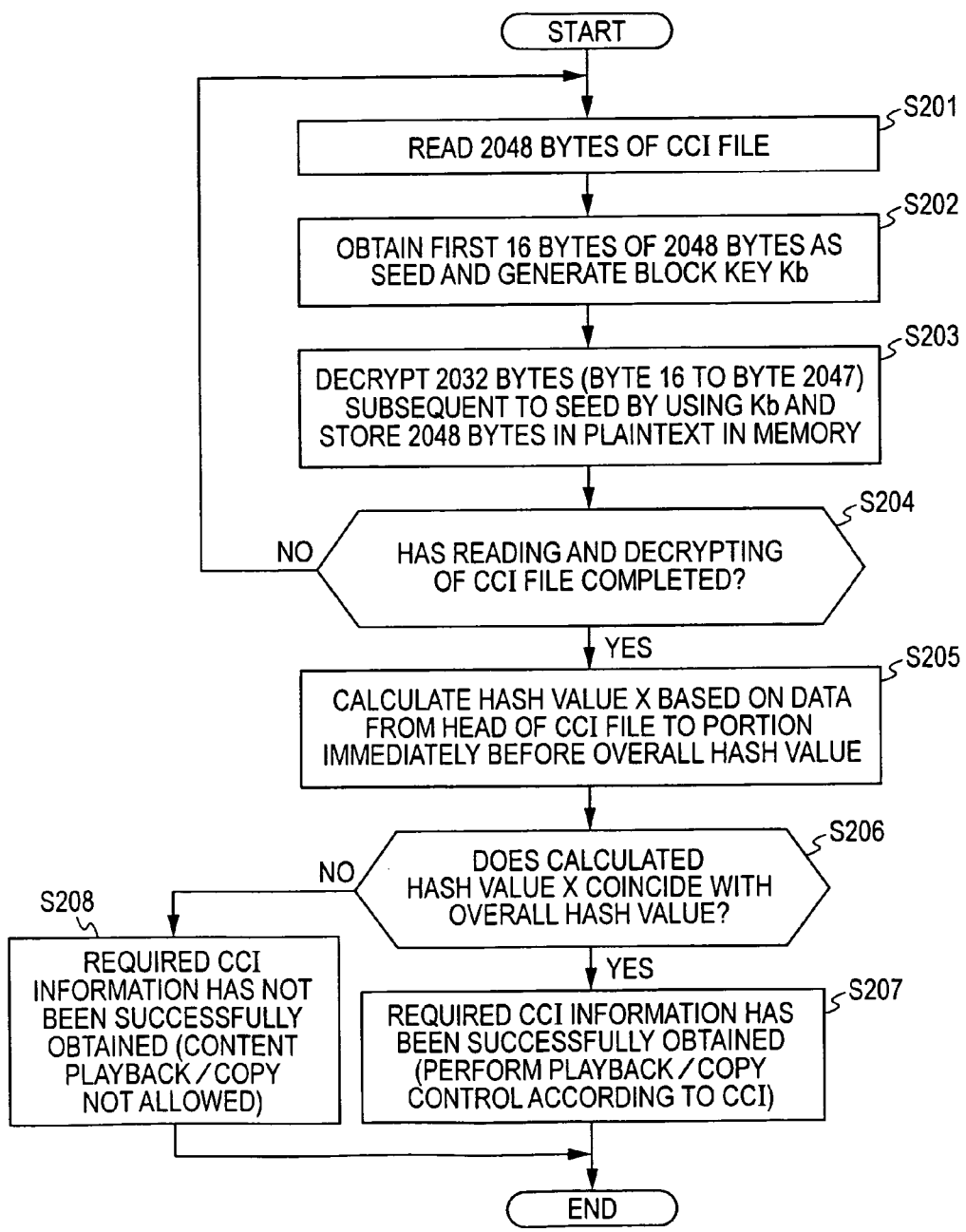

FIG. 29A

| [field name] | | [num_of_bits] |
|---|---|---|
| Basic CCI for BD { | | |
| CCI_and_other_info_type | (=0001₁₆) | 16 |
| CCI_and_other_info_data_length | (=0010₁₆) | 16 |
| reserved | | |
| EPN | | |
| CCI | | |
| reserved | | |
| Image_Constraint_Token | | |
| APS | | |
| reserved | | |
| } | | |

FIG. 29B

CCI_and_other_info_type : ID INFORMATION INDICATING BASIC CCI INFORMATION (=0001₁₆)
CCI_and_other_info_data_length : LENGTH OF BASIC CCI INFORMATION (=0010₁₆)
EPN : INFORMATION INDICATING WHETHER OR NOT DATA IS ENCRYPTED
CCI : WHETHER COPY IS ALLOWED
    COPY PERMITTED / NOT ALLOWED / ONLY ONE GENERATION ALLOWED
Image_Constraint_Token : VIDEO OUTPUT RESOLUTION RESTRICTION INFORMATION
    OUTPUT RESTRICTED / NOT RESTRICTED
APS : ANALOG COPY CONTROL INFORMATION
    ALLOWED / NOT ALLOWED (SPECIFY ANALOG-COPY-PROOF TECHNIQUE)

FIG. 30A

| [field name] | | [num_of_bits] |
|---|---|---|
| Basic CCI for BD { | | |
| CCI_and_other_info_type | (=0001₁₆) | 16 |
| CCI_and_other_info_data_length | (=0010₁₆) | 16 |
| reserved | | 5 |
| EPN | | 1 |
| CCI | | 2 |
| reserved | | 5 |
| Image_Constraint_Token | | 1 |
| APS | | 2 |
| extended_format_flag ~731 | | 1 |
| reserved | | 111 |
| } | | |

FIG. 30B

| | |
|---|---|
| CCI_and_other_info_type | : ID INFORMATION INDICATING BASIC CCI INFORMATION (=0001₁₆) |
| CCI_and_other_info_data_length | : LENGTH OF BASIC CCI INFORMATION (=0010₁₆) |
| EPN | : INFORMATION INDICATING WHETHER OR NOT DATA IS ENCRYPTED |
| CCI | : WHETHER COPY IS ALLOWED<br>COPY PERMITTED / NOT ALLOWED / ONLY ONE GENERATION ALLOWED |
| Image_Constraint_Token | : VIDEO OUTPUT RESOLUTION RESTRICTION INFORMATION<br>OUTPUT RESTRICTED / NOT RESTRICTED |
| APS | : ANALOG COPY CONTROL INFORMATION<br>ALLOWED / NOT ALLOWED (SPECIFY ANALOG-COPY-PROOF TECHNIQUE) |

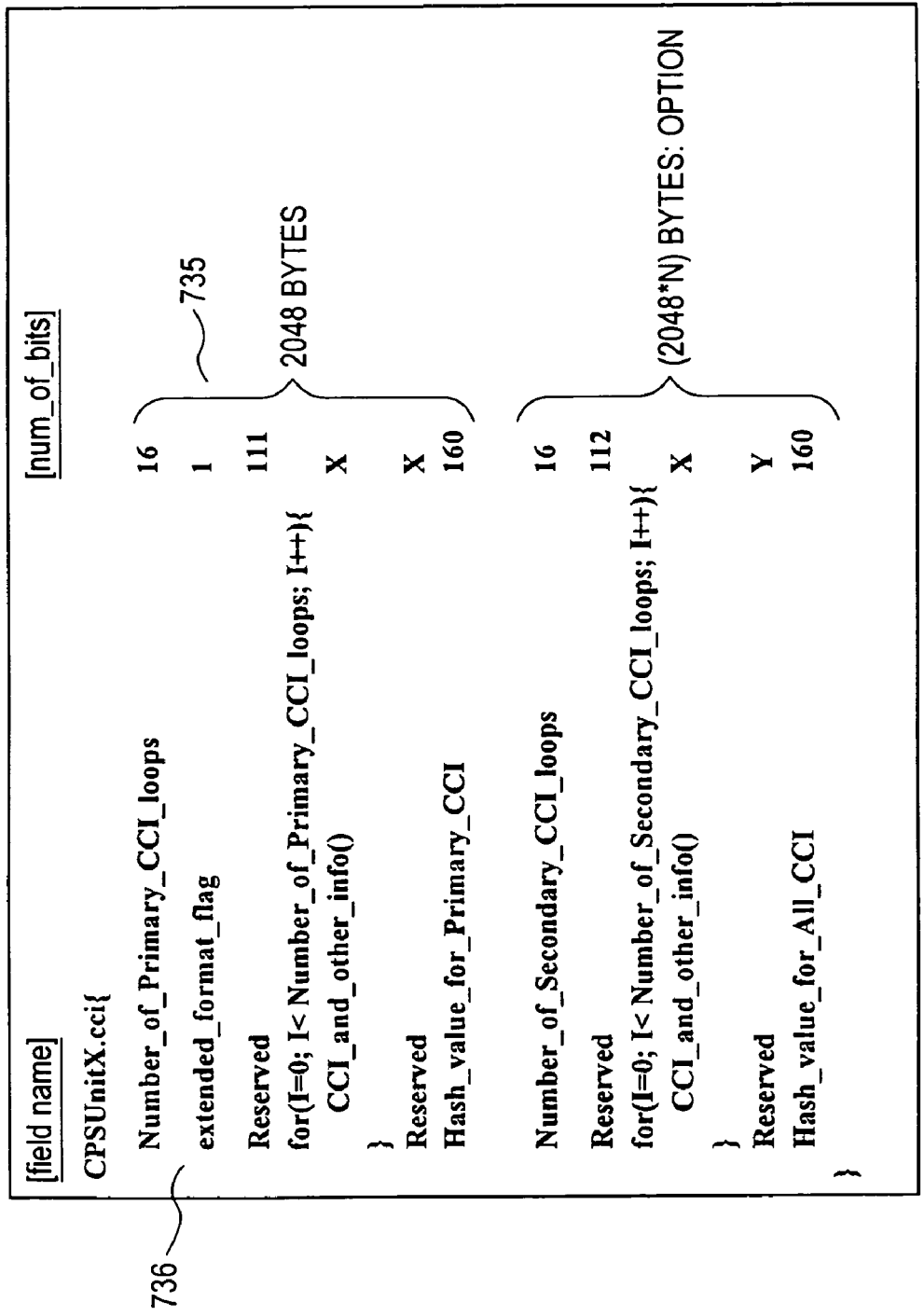

FIG. 32A

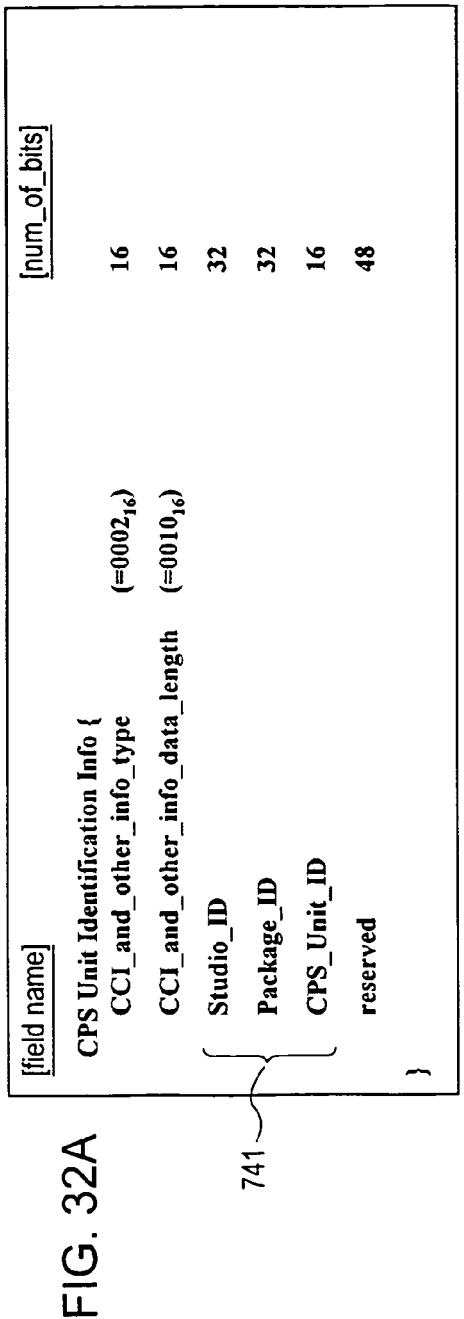

| [field name] | | [num_of_bits] |
|---|---|---|
| CPS Unit Identification Info { | | |
|   CCI_and_other_info_type | $(=0002_{16})$ | 16 |
|   CCI_and_other_info_data_length | $(=0010_{16})$ | 16 |
|   Studio_ID | | 32 |
|   Package_ID | | 32 |
|   CPS_Unit_ID | | 16 |
|   reserved | | 48 |
| } | | |

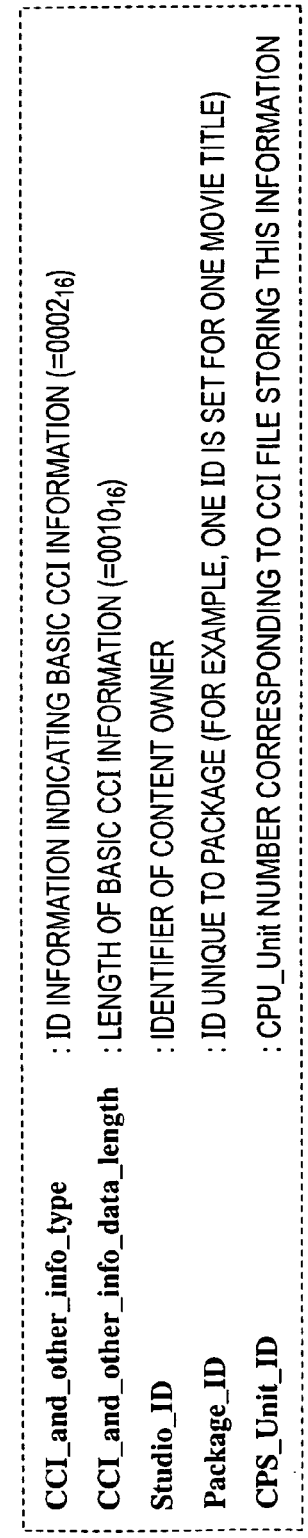

| | |
|---|---|
| CCI_and_other_info_type | : ID INFORMATION INDICATING BASIC CCI INFORMATION $(=0002_{16})$ |
| CCI_and_other_info_data_length | : LENGTH OF BASIC CCI INFORMATION $(=0010_{16})$ |
| Studio_ID | : IDENTIFIER OF CONTENT OWNER |
| Package_ID | : ID UNIQUE TO PACKAGE (FOR EXAMPLE, ONE ID IS SET FOR ONE MOVIE TITLE) |
| CPS_Unit_ID | : CPU_Unit NUMBER CORRESPONDING TO CCI FILE STORING THIS INFORMATION |

INFORMATION PROCESSING APPARATUS AND METHOD, INFORMATION RECORDING MEDIUM, AND COMPUTER PROGRAM

CROSS REFERENCES TO RELATED APPLICATIONS

The present invention contains subject matter related to Japanese Patent Application JP 2004-185896 filed in the Japanese Patent Office on Jun. 24, 2004 and Japanese Patent Application JP 2004-246641 filed in the Japanese Patent Office on Aug. 26, 2004, the entire contents of which are incorporated herein by reference.

BACKGROUND OF THE INVENTION

1. Field of the Invention

The present invention relates to information processing apparatuses and methods, information recording media, and computer programs. More particularly, the invention relates to an information processing apparatus and method, an information recording medium, and a computer program in which various items of content whose usage needs to be managed are stored and the usage of each data unit forming the content is managed.

2. Description of the Related Art

Various types of software data (hereinafter referred to as "content"), for example, audio data, such as music, image data, such as movies, game programs, and various application programs, can be stored in recording media, such as Blu-ray discs using blue-violet lasers, digital versatile discs (DVDs), mini discs (MDs), or compact discs (CDs) as digital data. In particular, Blu-ray discs can implement high-density recording, and can record large-capacity video data as high quality data.

Such various information recording media storing digital content are provided to users. The users play back the content by using a personal computer (PC) or a playback device, such as a disc player.

Generally, the distribution rights of many items of content, such as music data and image data, are owned by creators or sellers of the content. Accordingly, when distributing the content, certain measures are taken, such imposing as certain usage restrictions, to prevent unauthorized copying by permitting the usage of the content only to authorized users.

Digital recorders and recording media allow repeated recording and playback operations without the loss of image or sound quality. Accordingly, the distribution of the content which is copied without authorization via the Internet, the distribution of pirate discs, for example, CD-Rs, storing content, or the use of copied content stored in a hard disk, such as in a PC, is widespread.

Large-capacity recording media, such as DVDs and recently developed recording media using blue-violet lasers, can record a large amount of data equal to one or several movies on a single medium as digital information. As the recording digital information, such as video information, becomes common, it is important to consider the protection of copywriters by preventing unauthorized copying. To prevent unauthorized copying of digital data, various techniques for preventing unauthorized copying have been adopted in digital recorders and recording media.

For example, a content scramble system is employed for DVD players. In this system, video data or audio data is recorded on a DVD-read only memory (DVD-ROM) by being encrypted, and a key for decrypting the encrypted data is supplied to licensed DVD players. A license is provided only for DVD players that are designed based on predetermined operation rules, for example, complying with the rule for not performing unauthorized copying. A licensed DVD player decrypts the encrypted data recorded on a DVD-ROM by using the provided key, thereby playing back images or sound from the DVD-ROM.

On the other hand, a DVD player without a license is not allowed to decrypt the encrypted data recorded on the DVD-ROM since it does not have a key for decrypting the data. In this manner, in the content scramble system, DVD players which do not satisfy the required conditions for receiving a license are not allowed to play back digital data recorded on a DVD-ROM, thereby preventing unauthorized copying.

Due to the widespread use of data communication networks, so-called home networks, in which household electric appliances, computers, and peripheral devices are connected in a household via a network so that they can communicate with each other, are becoming common. In the home network, devices communicate with each other to share the data processing functions of the devices, and content can be sent and received between the devices, thereby providing a convenient and comfortable environment to the users. It is expected that home networks will become more widespread.

Because of the development of networking described above, content stored in information recording media is frequently accessed from devices connected to a home network. The above-described known system for preventing unauthorized copying is based on the concept that one license is given to one player. Accordingly, no consideration has been sufficiently taken for handling the processing for accessing a device in which a recording medium is installed, such as a home server or a player, connected to a network from another network-connected device, such as a PC or a television, and for playing back content from the accessed device via the network.

In the past, since one item of content stored in a recording medium was played back in one player, it was sufficient to manage the usage of the content by providing a content usage right, such as a license, to the content or a player. Currently, however, due to the progress of large-capacity information recording media and the digitization and networking of household electric appliances, a content usage management system different from the one in the past becomes necessary. More specifically, a content usage management system satisfying the following requirements is demanded:

(1) recording a plurality of items of content on a recording medium and conducting different types of management for the usage of the individual items of content;

(2) using content in a specific network, such as a home network, i.e., playing back content by a network-connected device or accessing a home server and copying content stored in the home server; and (3) distributing information required for playing back content, such as a key for decrypting content, to specific users via a network with high security.

SUMMARY OF THE INVENTION

In view of the above background, it is desirable to provide an information processing apparatus and method, an information recording medium, and a computer program in which, in using various items of content stored in the information recording medium, the copyright management and the usage management of each data forming content is implemented based on content usage control information.

In particular, it is desirable to provide an information processing apparatus and method, an information recording medium, and a computer program in which efficient content usage management can be implemented by storing information indicating whether the usage of content is allowed according to the type of information processing apparatus or content-management-unit identification information in the content usage control information.

It is also desirable to provide an information processing apparatus and method, an information recording medium, and a computer program in which the authorized use of content is implemented without the need to check whether content usage control information is tampered with in the information processing apparatus by eliminating the use of unauthorized content obtained by tampering with the content usage control information by the generation of a unit key based on the content usage control information.

According to an embodiment of the present invention, there is provided an information processing apparatus including: a content usage control information analyzer configured to read content usage control information recorded on an information recording medium and to perform content usage processing according to the content usage control information. The content usage control information analyzer determines whether the usage of content corresponding to the content usage control information is allowed based on a value of a flag included in the content usage control information and device information whether the information processing apparatus is an extended device having an extended function or a basic device without an extended function.

In the aforementioned information processing apparatus, the content usage control information may include basic control information and extended control information, and the content usage control information analyzer may determine based on the value of the flag included in the basic control information whether the usage of content corresponding to the content usage control information is allowed.

In the aforementioned information processing apparatus, if the information processing apparatus is an extended device having an extended function, the information processing apparatus may obtain, via a network, information necessary for using the content corresponding to the content usage control information based on the value of the flag included in the content usage control information.

The aforementioned information processing apparatus may further include encryption processing means configured to decrypt encrypted content recorded on the information recording medium. The encryption processing means may generate a unit key corresponding to each content management unit stored in the information recording medium and decrypt the content stored in the information recording medium by performing data processing using the unit key, and in generating the unit key, the encryption processing means may perform data processing by using data of the content usage control information set for the content management unit.

According to an embodiment of the present invention, there is provided an information processing apparatus including a content usage control information analyzer configured to read content usage control information recorded on an information recording medium and to perform content usage processing according to the content usage control information. The content usage control information analyzer obtains identification information of a content management unit to be controlled from the content usage control information and specifies the content management unit based on the obtained identification information.

The aforementioned information processing apparatus may further include: encryption processing means configured to decrypt encrypted content recorded on the information recording medium. The encryption processing means may generate a unit key corresponding to each content management unit stored in the information recording medium and decrypt the content stored in the information recording medium by performing data processing using the unit key, and in generating the unit key, the encryption processing means may perform data processing by using data of the content usage control information set for the content management unit.

According to an embodiment of the present invention, there is provided an information recording medium on which content whose usage is to be managed is recorded. Data included in the content is set as content management units. Data included in each content management unit is stored as data encrypted based on a unit key associated with the content management unit. Content usage control information corresponding to each content management unit is stored, the content usage control information including a flag indicating whether the usage of the content is allowed depending on whether a device to use the content is an extended device having an extended function or a basic device without an extended function.

In the aforementioned information recording medium, the content usage control information may include information having tamper-proof data for the content usage control information.

In the aforementioned information recording medium, the content usage control information may include a data portion having the flag set as a non-encrypted portion and an encrypted data portion.

According to an embodiment of the present invention, there is provided an information recording medium on which content whose usage is to be managed is recorded. Data included in the content is set as content management units. Data included in each content management unit is stored as data encrypted based on a unit key associated with the content management unit. Content usage control information corresponding to each content management unit is stored, the content usage control information including identification information of a content management unit whose usage is controlled.

In the aforementioned information recording medium, the content usage control information may include information having tamper-proof data for the content usage control information.

In the aforementioned information recording medium, the content usage control information may include a data portion having the flag set as a non-encrypted portion and an encrypted data portion.

According to an embodiment of the present invention, there is provided an information recording medium on which content whose usage is to be managed is recorded. Data included in the content is set as content management units. Data included in each content management unit is stored as data encrypted based on a unit key associated with the content management unit. Content usage control information corresponding to each content management unit is stored, the content usage control information including data encrypted with an encryption key which is generated by using data included in a header of the content usage control information as a seed.

In the aforementioned information recording medium, the data used as a seed may include identification information of the content management unit.

In the aforementioned information recording medium, the data used as a seed may include random-number data.

According to an embodiment of the present invention, there is provided an information processing method including the steps of: reading content usage control information recorded on an information recording medium; identifying a value of a flag included in the content usage control information; and determining whether the usage of content corresponding to the content usage control information is allowed based on the value of the flag and device information whether an information processing apparatus to use the content is an extended device having an extended function or a basic device without an extended function.

In the aforementioned information processing method, the content usage control information may include basic control information and extended control information, and, in the determining step, it may be determined based on the value of the flag included in the basic control information whether the usage of content corresponding to the content usage control information is allowed.

The aforementioned information processing method may further include the step of: obtaining, if the information processing apparatus is an extended device having an extended function, via a network, information necessary for using the content corresponding to the content usage control information based on the value of the flag included in the content usage control information.

The aforementioned information processing method may further include the steps of: generating a unit key corresponding to each content management unit stored in the information recording medium; and decrypting content stored in the information recording medium by performing data processing using the unit key. In the generating step, data processing by using data of the content usage control information set for the content management unit may be performed.

According to an embodiment of the present invention, there is provided an information processing method including the steps of: reading content usage control information recorded on an information recording medium; and analyzing the content usage control information. In the analyzing step, identification information of a content management unit to be controlled may be obtained from the content usage control information, and the content management unit may be specified based on the identification information of the content management unit.

The aforementioned information processing method may further include the steps of: generating a unit key corresponding to each content management unit stored in the information recording medium; and decrypting content stored in the information recording medium by performing data processing using the unit key. In the generating step, data processing by using data of the content usage control information set for the content management unit may be performed.

According to an embodiment of the present invention, there is provided a computer program allowing a computer to analyze content usage control information. The computer program includes the steps of: identifying a value of a flag included in the content usage control information read from an information recording medium; and determining whether the usage of content corresponding to the content usage control information is allowed based on the value of the flag and device information whether an information processing apparatus to use the content is an extended device having an extended function or a basic device without an extended function.

According to an embodiment of the present invention, there is provided a computer program allowing a computer to analyze content usage control information. The computer program includes the steps of: obtaining identification information of a content management unit to be controlled from the content usage control information; and specifying the content management unit based on the identification information of the content management unit.

The computer program according to an embodiment of the present invention can be provided to a computer system that can execute various program codes in the form of a computer-readable storage medium or communication medium, such as, a recording medium, for example, a compact disc (CD), a magneto-optical disk (MO), or a flexible disk, or a communication medium, for example, a network. By providing the computer program to the computer system in a computer-readable format, thereby allowing the computer system to execute the program.

Further features of the present invention will become apparent from the following description of exemplary embodiments with reference to the attached drawings.

According to an embodiment of the present invention, the content usage control according to the type of information processing apparatus to use content can be implemented. Playback/copy control information set for content (CPS unit) having playback or copy restrictions is divided into basic control information and extended control information. A basic playback device without, for example, a network connection function performs content usage processing according to the basic control information, and an extended playback device having a network connecting function performs content usage processing according to the extended control information.

According to an embodiment of the present invention, it is possible to prevent a basic playback device from playing back content that can be played back only by extended playback devices by checking the value of a flag set in a CCI file. An extended format flag is set in playback/copy control information. Based on the value of the extended format flag, it is determined whether the content (CPS unit) corresponding to the playback/copy control information can be used by a basic playback device.

According to an embodiment of the present invention, content corresponding to a CCI file can be efficiently obtained. CPS-unit identification (ID) data is set in playback/copy control information as information for associating content with a CCI file (playback/copy control information). Accordingly, even if content to be managed for each CPS unit is used outside a recording medium in a home network, it can be easily identified.

According to an embodiment of the present invention, CPS-unit attribute name information, such as a studio name, an authoring company name, or a package name, is set in playback/copy control information as a character string representing the attributes of a CPS unit, thereby facilitating the recognition of a CCI file. Additionally, if a character string is indicated in a first header of the CCI file, the frequent occurrence of fixed patterns in a seed used for generating a key for encrypting the first 2 KB of the CCI file can be prevented. As a result, data is encrypted with an encryption key using a variable seed, thereby making it more difficult to decrypt the data.

According to an embodiment of the present invention, random-number fields are set in the headers of a first area and a second area of a CCI file. Accordingly, the frequent occurrence of fixed patterns in a seed used for generating a key for encrypting the first 2 KB of the CCI file can be prevented. As a result, data is encrypted with an encryption key using a variable seed, thereby making it more difficult to decrypt the data.

According to an embodiment of the present invention, content usage control information (copy/playback control information (CCI)) is used as information for generating a unit key for decrypting content (CPS unit). A correct unit key can be generated only by authenticated, not-tampered content usage control information, and the content can be decrypted with the unit key. Thus, efficient, correct content usage processing can be implemented without the need to verify the integrity of the content usage control information.

BRIEF DESCRIPTION OF THE DRAWINGS

FIG. 4 illustrates an example of a content-management-unit-structure/unit-key table;

FIG. 7 illustrates an example of content state management table;

FIGS. 8A and 8B illustrate an example of a content-playback/copy-control information management table;

FIGS. 9A, 9B, and 9C illustrate an example of a content-playback/copy-control information management table in which content management information is recorded as variable length data according to the state of the content;

FIG. 19 illustrates the data structure of unit key generation value information (Unit_Key_Gen_Value.inf);

FIGS. 25A and 25B illustrate specific examples of basic control information (Basic CCI) and extended control information (Extended CCI);

FIG. 26 is a flowchart illustrating a sequence performed by an information processing apparatus for reading only basic control information and for executing content usage processing according to the basic control information;

FIG. 27 is a flowchart illustrating a sequence performed by an information processing apparatus for reading both basic control information and extended control information and for executing content usage processing according to the basic control information and the extended control information;

FIGS. 29A and 29B illustrate a specific example of a playback/copy control information storage block (CCI_and_other_info( ));

FIGS. 30A and 30B illustrate a specific example of the playback/copy control information storage block (CCI_and_other_info( )) in basic control information (Basic CCI) having an extended format flag;

FIG. 31 illustrates a file structure storing playback/copy control information (CCI information) in which an extended format flag is contained in the header of a first area;

FIGS. 32A and 32B illustrate an example of the data structure in which CPS-unit ID data for specifying a CPS unit corresponding to CCI information is contained in playback/copy control information (CCI information);

DESCRIPTION OF THE PREFERRED EMBODIMENTS

Details of an information processing apparatus and method, an information recording medium, and a computer program according to an embodiment of the present invention are described below with reference to the accompanying drawings. A description is given below according to the following order.

Figure 1:
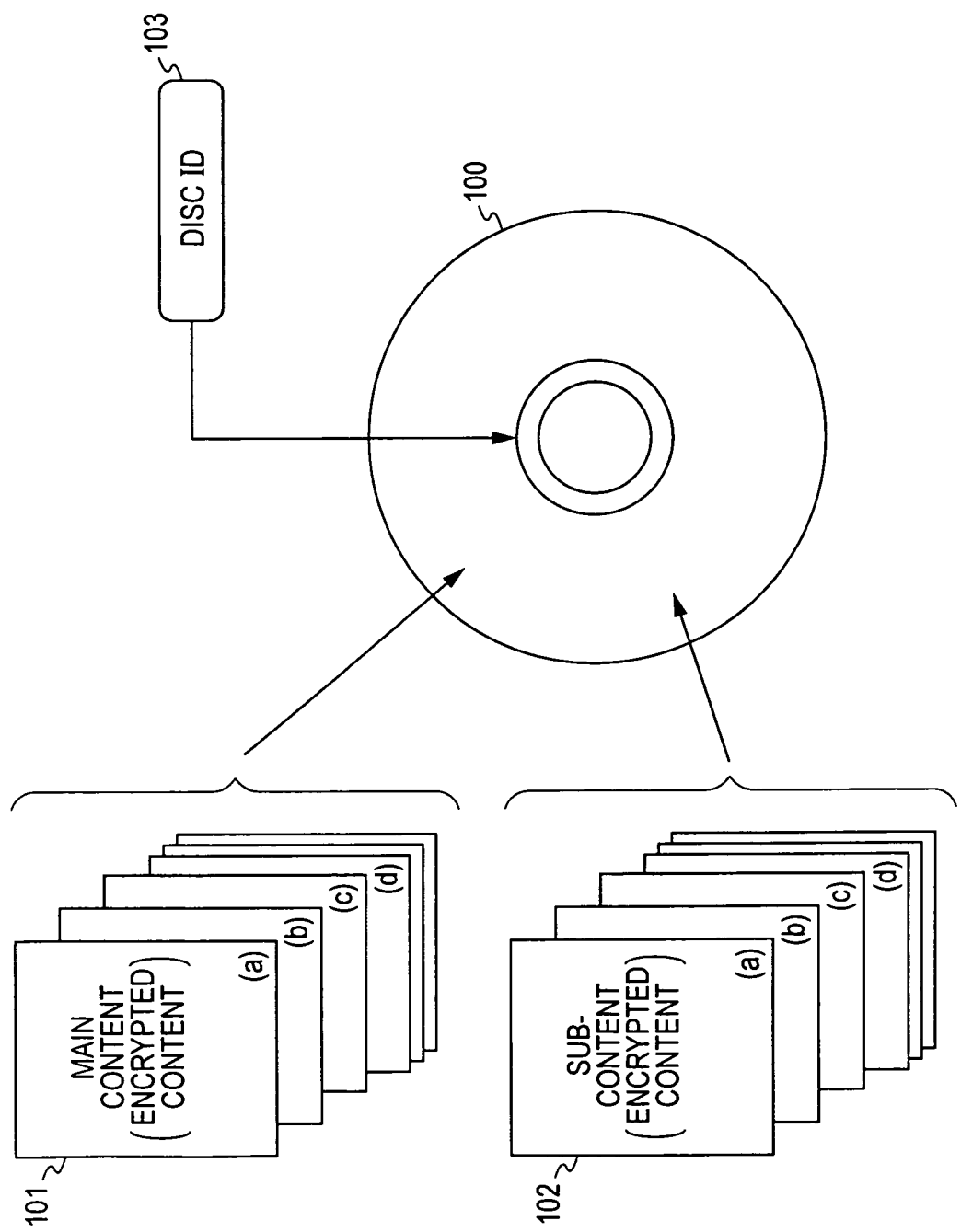
FIG. 1 illustrates the configuration of data stored in an information recording medium.

1. Data structure stored in information recording medium
2. Example of stored content structure
3. Encryption and usage management of stored content
4. Content usage management based on network discrete/bound state
5. Content copy management in network
6. Management information concerning content management units
7. Storage configuration of main content, sub-content, and content management information
8. Encryption and tamper-proof processing for content usage control information
  (8-1) Overview of encryption and tamper-proof processing for content usage control information
  (8-2) Specific example of encryption and tamper-proof processing for content usage control information
9. First example of detailed configuration of content usage control information
10. Second example of detailed configuration of content usage control information
11. Example of configuration of information processing apparatus 1. Data Structure Stored in Information Recording Medium The data structure stored in an information recording medium is first discussed. FIG. 1 illustrates an example of the information recording medium storing therein content on which the processing according to an embodiment of the present invention is executed. In this example, as a disc storing content, a ROM disc is used.

This ROM disc is an information recording medium storing authorized content which is manufactured in a disc manufacturing factory under the license of a content right holder owing an authorized content copyright or distribution right. Although in the following embodiment the information recording medium is discussed in the context of a disc medium, various other types of information recording media may be used in the present invention.

In an information recording medium 100, as shown in FIG. 1, various items of content are stored. The content is largely classified into two categories. One category is main content 101 including audio visual (AV) streams of moving picture content, such as high-definition (HD) movie content, which is HD moving picture data, game programs defined by specific standards, image files, audio data, and text data. The main content 101 is stored as specific AV-format standard data according to a specific AV data format, and more specifically, it is stored as Blu-ray disc ROM standard data according to the Blu-ray disc ROM standard format.

The other category is sub-content 102 including game programs, image files, audio data, and text data, as service data. The sub-content 102 is data having a data format which is not compliant with a specific AV data format, and more specifically, it is stored as Blu-ray disc ROM nonstandard data according to a certain format which is not compliant with the Blu-ray disc ROM standard format.

Both the main content 101 and sub-content 102 include various types of content, such as music data, image data, for example, moving pictures and still images, game programs, and web content. Such content includes various types of information, such as content information that can be used only by using data from the information recording medium 100 and content information that can be used with a combination of the data from the information recording medium 100 and data provided from a server connected to the information recording medium 100 via a network.

For the management of the content usage, each item of content or a set of a plurality of items of content included in the main content 101 or the sub-content 102 is stored in the information recording medium 100 by being encrypted with a corresponding encryption key (unit key). In the information recording medium 100, a disc ID 103 is stored as identification information concerning the information recording medium 100.

2. Example of Stored Content Structure

The format of content stored in an information recording medium according to an embodiment of the present invention is discussed below with reference to FIG. 2.

Figure 2:
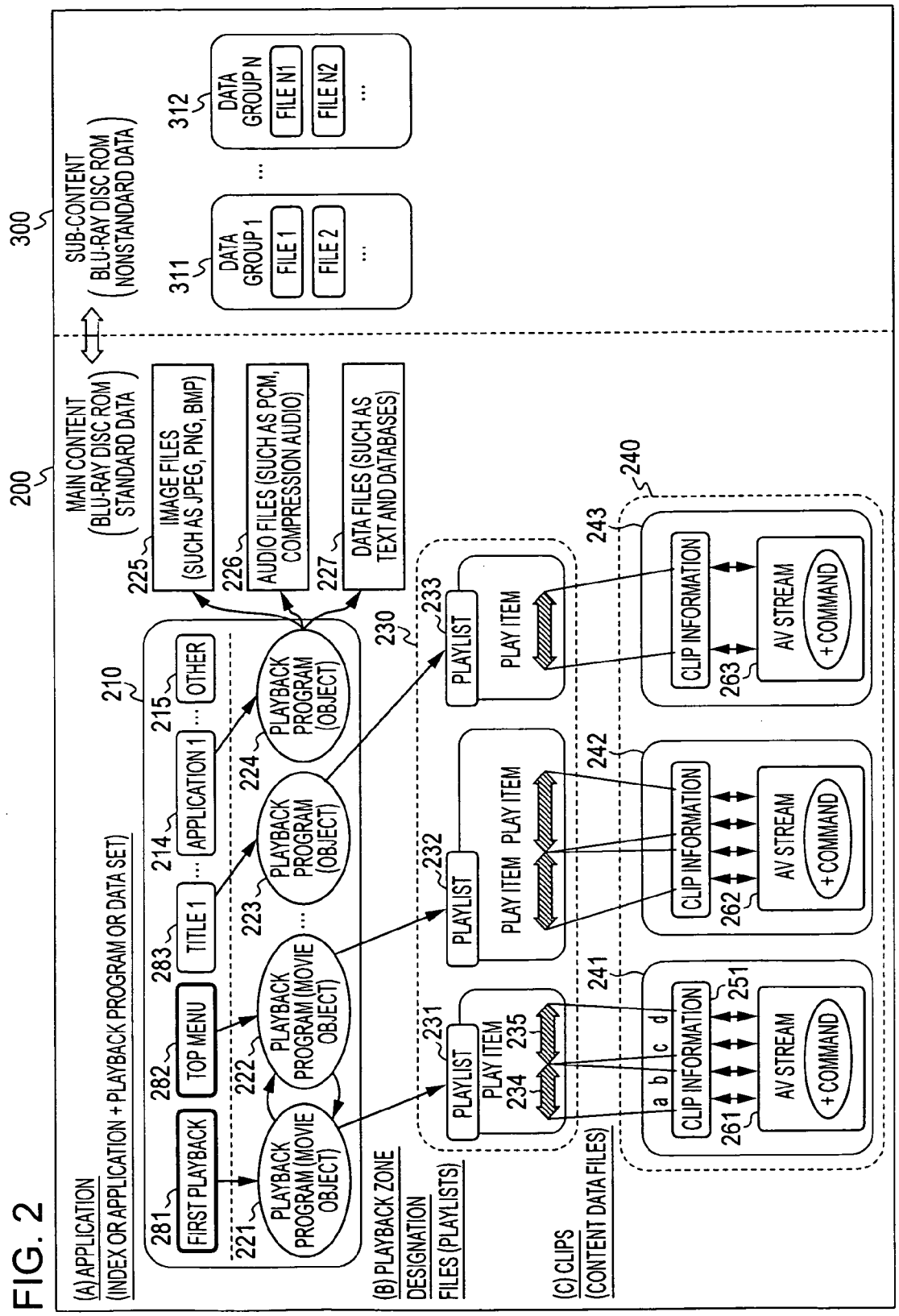
FIG. 2 illustrates an example of the content format stored in an information recording medium.

In the information recording medium, as shown in FIG. 2, AV streams of moving picture content, such as movie content, which is HD moving picture data, are stored as main content 200, and other data and programs, such as game programs, image files, audio data, and text data, which serve as service data, are stored as sub-content 300.

The main content 200 is stored in a specific AV format, for example, as the Blu-ray disc ROM standard data, according to the Blu-ray disc ROM standard format. The sub-content 300 is stored as Blu-ray disc ROM nonstandard data according to a certain format which is not compliant with the Blu-ray disc ROM standard format.

The main content 200 stored in the Blu-ray disc ROM standard format stores moving picture content (AV streams) to be played back as real content data, and has the following hierarchical structure according to the Blu-ray disc ROM standard format:

(A) application 210;
(B) playback zone designation files (playlists) 230; and
(C) clips (content data files) 240.

The clips (content-data files) 240 include clips 241, 242, and 243, which are content data files divided from the content, and each clip has a corresponding AV stream file and a corresponding clip information file, for example, the clip 241 has an AV stream file 261 and a clip information file 251.

The clip information file 251 is a data file storing attribute information concerning the AV stream file 261. The AV stream file 261 is, for example, Moving Picture Experts Group—Transport Stream (MPEG-TS) data, and has a data structure in which information, such as images (video), audio, subtitle data, etc., are multiplexed. Command information for controlling a playback device to perform a playback operation may be multiplexed in the AV stream file 261.

The playback zone designation files (playlists) 230 include a plurality of playback zone designation files (playlists) 231, 232, and 233. Each playback zone designation file (playlist) 231, 232, or 233 selects one of a plurality of AV stream data files contained in the clips (content data files) 240. Each playback zone designation file (playlist) has at least one play item obtained by selecting a specific data portion of the selected AV stream data file by designating the playback start point and the playback end point. By selecting one of the playback zone designation files (playlists) 231, 232, and 233, the playback sequence is determined and the playback operation is performed according to the play items contained in the selected playback zone designation file (playlist).

For example, if the playback zone designation file (playlist) 231 is selected, since a play item 234 has the playback start point a and the playback end point b in the clip 241 and since a play item 235 has the playback start point c and the playback end point d in the clip 241, the specific data portions from a to b and from c to d of the AV stream file 261, which is content in the clip 241, are played back.

The application 210 is set as a layer having the following combinations: a combination of a title 1 283, which serves as an application index file including a content title, shown on a display on which content is played back, and a playback program 223; a combination of application execution files 214 and 215, such as game content and web content, and the playback program 223 and a playback program 224; a combination of a first playback index 281, which serves as index information concerning playback content to be Started when the information recording medium (disc) is installed in a drive and a playback program 221; and a combination of a top menu index 282, which serves as index information concerning content to be played back when a menu display function is started, and a playback program 222.

The first playback index 281 is an index which specifies content to be started and played back when the information recording medium (disc) is installed in the drive, for example, the first playback index 281 plays back copyright information, such as a company logo of a studio or an authoring company which edits the content, according to a playback sequence unique to the studio or the authoring company. The top menu index 282 is an index which specifies content to be displayed when the menu display function is started in a playback device.

Based on the index, the playback program corresponding to the index is started, and the content data file (AV stream) specified by the playlist designated by the playback program is played back. The user may determine content to be played back by selecting the title.

The indexes, such as first playback index 281, the top menu index 282, and the title 1 283, are associated with the corresponding playback programs (movie objects), as shown in FIG. 2, and the playback processing based on the playback program associated with the index is started.

An application resource file used for executing an application may be contained in the application 210. Alternatively, various data files that can be obtained from the information recording medium or a network connecting server, such as image files 225, for example, Joint Photographic Experts Group (JPEG), Portable Network Graphics (PNG), and Bitmap (BMP)-files, audio files 226, for example, Pulse Code Modulation (PCM) and compressed audio files, and various data files 227, for example, text and databases, may be used as the application resource files.

The playback programs (movie objects) 221 through 224 are content playback processing programs which provide functions required for displaying playback content (HD movie content) in a programmable manner by, for example, specifying a playback zone designation file (playlist), responding to operation information concerning the content playback processing input from a user, switching between titles, and branching the playback sequence. The playback programs 221 through 224 can be switched between each other, and a playback program is selected based on the input from the user or a preset program, and playback content is selected and played back from the clips 240 according to the playback zone designation file (playlist) 230 specified by the selected playback program.

The main content 200 is managed, as shown in FIG. 2, as the Blu-ray disc ROM standard data, in a hierarchical structure according to the Blu-ray disc ROM standard format, and content management units (CPS units) are set for this hierarchical structure and content usage management is performed for each content management unit (CPS unit). Details of the content management units (CPS units) are given below.

In the information recording medium, not only the main content 200, but also the sub-content 300 is stored. The sub-content 300 is stored according to a specific AV format, for example, a certain format which does not comply with the Blu-ray disc ROM standard format.

The sub-content 300 is service data, for example, game programs, image files, audio data, and text data, and includes a set of a plurality of data files as a data group.

The sub-content 300 includes, as shown in FIG. 2, a data group 1 311 through data group N 312. Those data groups can be set as content whose usage is managed, in which case, a content management unit (CPS unit) can be set for each data group, and usage management is performed for each data group.

3. Encryption and Usage Management of Stored Content

Figure 3:
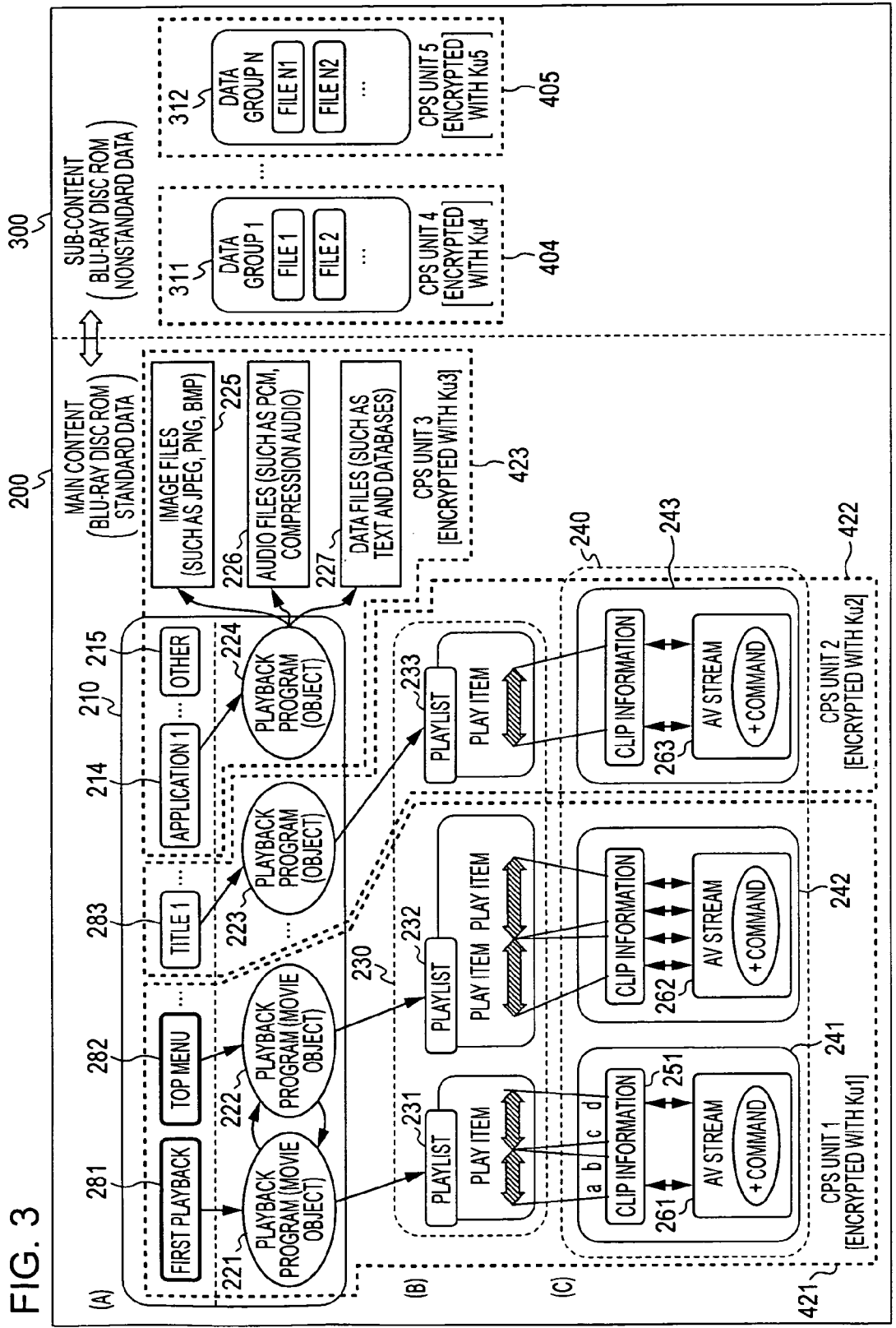
FIG. 3 illustrates an example in which content management units are set in the content stored in an information recording medium.

A description is now given, with reference to FIGS. 3 and 4, of the content management structure implemented by dividing content stored in the information recording medium into a plurality of content units and by performing different types of usage control for the individual divided content units.

According to an embodiment of the present invention, in the basic structure to implement the above-described usage control, different keys (unit keys) are assigned to the divided content units. Each divided content unit to which one unit key is assigned is referred to as a "content management unit (CPS unit)".

Content stored in each content management unit is encrypted with the corresponding unit key, and when using the content, the unit key assigned to each unit is obtained and the content is played back. The unit keys can be individually managed. The acquisition and the management of the unit keys can be set independently of each other. For example, a unit key assigned to unit A is a key that can be obtained from the information recording medium. A unit key assigned to unit B is a key that can be obtained by accessing a server connected to a network and by performing a predetermined procedure by the user.

The setting of a unit to which one key is assigned, i.e., a content management unit (CPS unit), is discussed below with reference to FIG. 3.

The setting of a content management unit (CPS unit) in the main content 200 is first discussed.

In the application 210 of the main content 200, as content management units, a CPS unit including an application index file having at least one title, a CPS unit including an application execution file, and a CPS unit including the content associated with the first playback index 281 and the content associated with the top menu index 282 are managed.

That is, the content associated with the first playback index 281 and the content associated with the top menu index 282 are encrypted with the corresponding unit key, and when using the content, the corresponding unit key is obtained so that the content can be played back.

In the example shown in FIG. 3, the content associated with the first playback index 281 and the content associated with the top menu index 282 are set as one unit. That is, in FIG. 3, a CPS unit 1 421 is a content management unit including those items of content.

Alternatively, the content associated with the first playback index 281 and the content associated with the top menu index 282 may be set as different CPS units.

The CPS unit 1 421 shown in FIG. 3 contains, as one unit, application index files including the first playback index 281 and the top menu index 282, playback program files, playlists, and AV stream files serving as real content data.

A CPS unit 2 422 contains, as one unit, an application index file, a playback program file, a playlist, and AV stream files serving as real content data.

A CPS unit 3 423 contains, as one unit, application execution files, a playback program file, and various data files that can be obtained from the information recording medium or a network connecting server.

Those units are individually encrypted with the corresponding keys Ku1, Ku2, and Ku3 shown in FIG. 3 and are stored in the information recording medium.

The content management unit (CPS unit) 1 421 includes the first playback index 281, the top menu index 282, the playback programs 221 and 222, the playlists 231 and 232, and the clips 241 and 242. The AV stream data files 261 and 262 serving as real content data contained in the clips 241 and 242, respectively, are encrypted with the unit key Ku1, which is an encryption key, associated with the content management unit (CPS unit) 1 421.

The content management unit (CPS unit) 2 422 includes the title 1 283, the playback program 223, the playlist 233, and the clip 243. The AV stream data file 263 serving as real content data contained in the clip 243 is encrypted with the unit key Ku2, which is an encryption key, associated with the content management unit (CPS unit) 2, 422.

The content management unit (CPS unit) 2 423 includes the application files 214 and 215 and the playback program 224 contained in the application layer 210, which is a higher layer, and various data files that can be obtained from the information recording medium or a network connecting server by the playback program 224, such as the image files 225, for example, JPEG, PNG, and BMP files, the audio files 226, for example, PCM and compressed audio files, and various data files 227, for example, text and databases.

The content management unit (CPS unit) 3 423 is encrypted with a unit key Ku3, which is an encryption key, associated with the content management unit (CPS unit) 3 423.

To play back the content associated with the content management unit (CPS unit) 1 421, i.e., the content associated with the first playback index 281 and the top menu index 282, the user should obtain the unit key Ku1, which is an encryption key associated with the content management unit (CPS unit) 1 421, and decrypts the content with the unit key Ku1, and then, the user can execute the program and plays back the content.

Although it is not shown, a general playback control program for controlling the entire content playback processing is provided.

The general playback control program identifies the content management unit (CPS unit) corresponding to the content specified by the user and obtains the CPS encryption key associated with information concerning the identified CPS management unit. If the acquisition of the CPS encryption key has failed, the general playback control program displays a message indicating that the playback operation cannot be performed. The general playback control program also determines whether content management units (CPS units) have been switched when playing back the content, and if so, the general playback control program obtains the required key and displays a corresponding message if the acquisition of the key has failed.

The general playback control program performs the playback management based on a unit-structure/unit-key management table shown in FIG. 4.

The table configuration shown in FIG. 4 corresponds to the content management units (CPS units) shown in FIG. 3. The content management unit (CPS unit) 1 421 is the unit including the content associated with the first playback index 281 and the top menu index 282, and the unit key Ku1 is assigned to the content management unit (CPS unit) 1 421. The different unit keys Ku2 through Ku5 are assigned to the corresponding content management units (CPS units) 2 through 5, respectively, and when playing back the content included in each unit, the content should be decrypted with the corresponding unit key.

The unit-structure/unit-key management table is a table, as shown in FIG. 4, in which the content management units (CPS units) corresponding to indexes and application files in the application layer and data groups are associated with the unit key information. The general playback control program executes management based on this management table.

In the management table shown in FIG. 4, management data corresponding to the main content 200 stored in a specific AV format, for example, the Blu-ray disc ROM standard format, and management data corresponding to the sub-content 300 stored in a format different from a specific AV format are set together. However, the management data corresponding to the main content 200 and the management data corresponding to the sub-content 300 may be set separately. A specific file structure (directory structure) of the management data is discussed later.

The general playback control program determines whether content management units (CPS units) have been switched by changing the application indexes, and if so, the general playback control program changes the unit key, or displays a message indicating an instruction to obtain corresponding unit key.

For example, it is now assumed that, in a playback device which is playing back content, both the unit key Ku1 associated with the content management unit (CPS unit) 1 401 and the unit key Ku2 associated with the content management unit (CPS unit) 2 402 are stored. In this case, when detecting that application units or content items have been switched, the general playback control program changes the unit key associated with the switched content management unit (CPS unit), for example, it changes from the unit key Ku1 to the unit key Ku2.

If, in a playback device which is playing back content, only the unit key Ku1 associated with the content management unit (CPS unit) 1 401 is stored, when detecting that application units or content items have been switched, the general playback control program displays a message indicating an instruction to acquire the corresponding unit key.

The above-described processing also applies to the switching between main content units or between sub-content units, or between a main content unit and a sub-content unit. Upon detecting that the units have been switched, the general playback control program switches between the unit keys Ku1 through Kun or displays a message indicating an instruction to acquire the corresponding unit key.

4. Content Usage Management Based on Network Discrete/bound State

A description is now given of the following type of content usage management. When an information recording medium storing content divided into content management units encrypted with unit keys, which serve as encryption keys, for the units is installed in a playback device connected to a network, such as home network, and when the content is played back from the information recording medium, the content usage management is performed based on whether each content unit is connected to a network, i.e., whether the content unit is in the discrete state or in the bound state. It is now assumed that the content described below includes both main content and sub-content.

Figure 5:
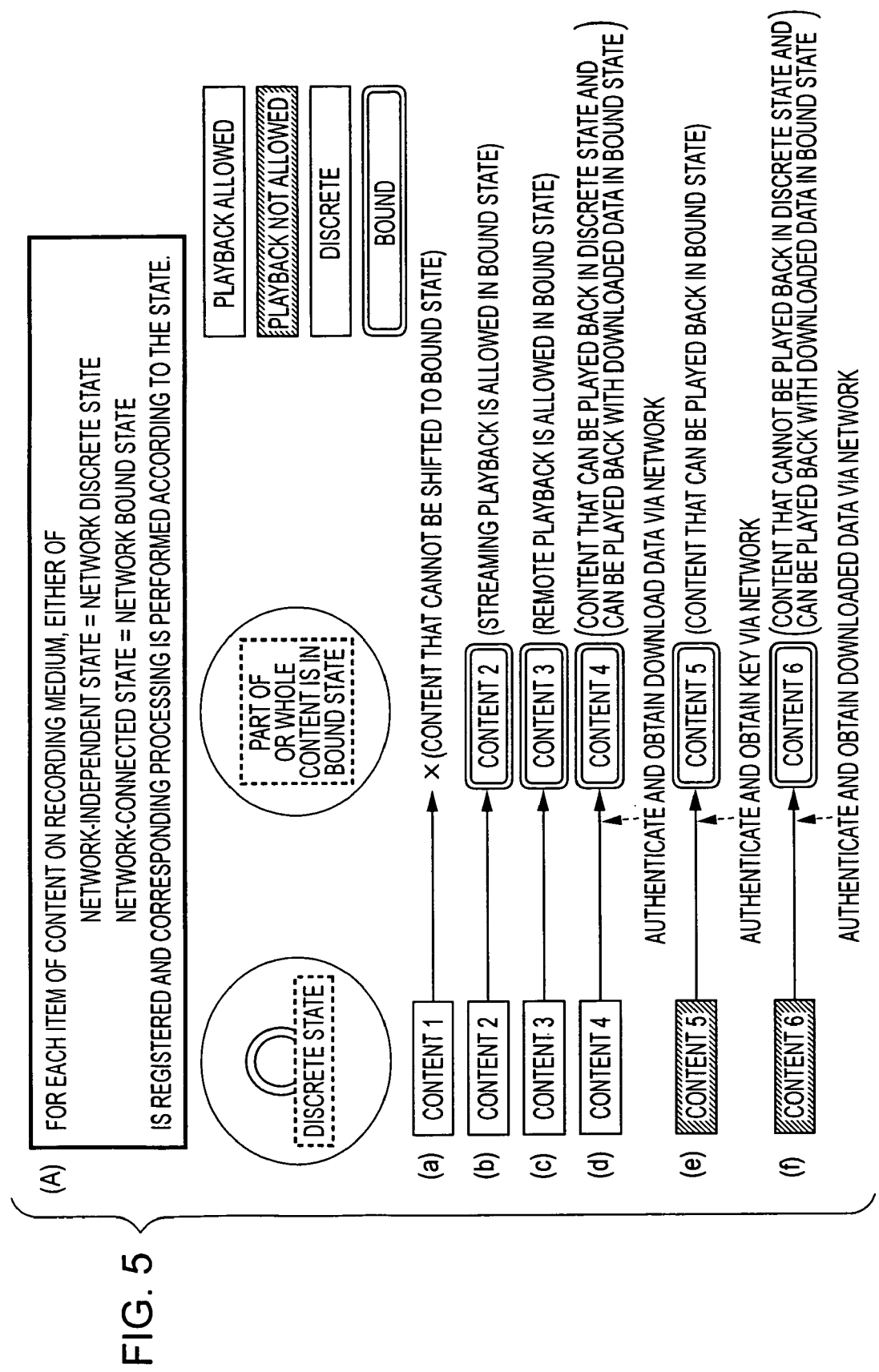
FIG. 5 illustrates content usage modes and usage restrictions when the content is in a network discrete state or in a network bound state.

Two states are defined for a content management unit (CPS unit) recorded on an information recording medium, as indicated by (A) of FIG. 5, i.e., the state in which the content management unit is not connected to a network (network discrete state) and the state in which the content management unit is connected to the network (network bound state).

If a plurality of content items (content management units) are recorded on the information recording medium, it is determined for each content management unit (CPS unit) whether the unit is in the network discrete state or in the network bound state. The management information concerning the discrete/bound state of each content management unit (CPS unit) is recorded on the information recording medium, a player (information playback device) in which the information recording medium is installed, or a management server on a home network executing the information management processing.

Content 1 through content 6 shown in FIG. 5 are content management units (CPS units), and belong to either main content or sub-content.

The playback method for the content is as follows. Concerning content management units (CPS units) stored in an information recording medium, there are some units that can be played back when it is in the network discrete state and some units (CPS units) that cannot be played back when it is in the network discrete state.

In FIG. 5, content 1 through content 4 can be played back when in the network discrete state, and content 5 and content 6 cannot be played back when in the network discrete state.

In response to the user operation or the operation of a playback device, the state of each content management unit recorded on a recording medium can be shifted to the network bound state. There is content that is prohibited from being shifted to the network bound state, such as content 1 indicated by (a) of FIG. 5.

Information concerning the state of each content management unit is determined as attributes of the corresponding content management unit, and is stored in the information recording medium as attribute information concerning the content management unit.

Each content management unit has predetermined processing types executable in the two states, i.e., (1) in the network discrete state and (2) in the network bound state, and information-concerning such processing types is recorded in the information recording medium or a management server possessing management information as attribute information concerning the content management unit.

For example, there are content management units indicated by (a) through (f) of FIG. 5.

(a) Content 1 can be played back only in the network discrete state and is prohibited from being shifted to the bound state.

(b) Content 2 can be played back in the network discrete state and the streaming playback using a network connection is allowed in the network bound state. The streaming playback is the content playback operation by sending data recorded on a recording medium or converted data on a recording medium as digital data via a network and by decoding and displaying the data by a receiver device.

(c) Content 3 can be played back in the network discrete state and the remote playback using a network connection is allowed in the network bound state. The remote playback is the content playback operation by performing processing, as in DVD-video interactive content, such as responding to a user operation by a sender device, and sending data in a data format that allows only video to be displayed on the screen and sound to be played back in a receiver device. In the remote playback operation, it is necessary that a user operation command is received by the receiver device and is sent to a playback device via a network.

(d) Content 4 can be played back in the network discrete state and can be played back together with data downloaded via a network in the network bound state.

Data to be downloaded may include, not only a subtitle, audio data, or menu screen data of a language which is not stored in the recording medium, but also the latest edition of data to be used when the content is played back. Content 4 is an example of the content that can be played back in the network discrete state and can be played back together with downloaded data in the network bound state.

(e) Content 5 cannot be played back in the network discrete state and can be played back in the network bound state.

In this case, a key required for playing back the content, i.e., a unit key associated with content 5, is acquired via a network so that the content 5 can be played back. With this arrangement, services for distributing and selling content that cannot be played back in the network discrete state and for selling key information to bill for the content when being played back can be provided.

(f) Content 6 cannot be played back in the network discrete state and can be played back together with data downloaded via a network in the network bound state.

Content 4 through content 6 are connected to a network to download data and acquire the corresponding unit keys. Before performing this operation, authentication processing is conducted to verify the integrity of a device or a user, and only when authentication has succeeded, downloaded data or the unit key is provided from a server. The data downloaded via a network is provided to the user device by being encrypted, which is discussed in detail below.

5. Content Copy Management in Network

A description is now given of the following type of content copy management. When an information recording medium storing content divided into content management units encrypted with unit keys, which serve as encryption keys, is installed in a playback device connected to a network, such as a home network, and when the content is played back from the information recording medium, the content copy management is performed based on whether each content unit is in the network discrete state or in the network bound state. It is now assumed that the content described below includes both main content and sub-content.

Figure 6:
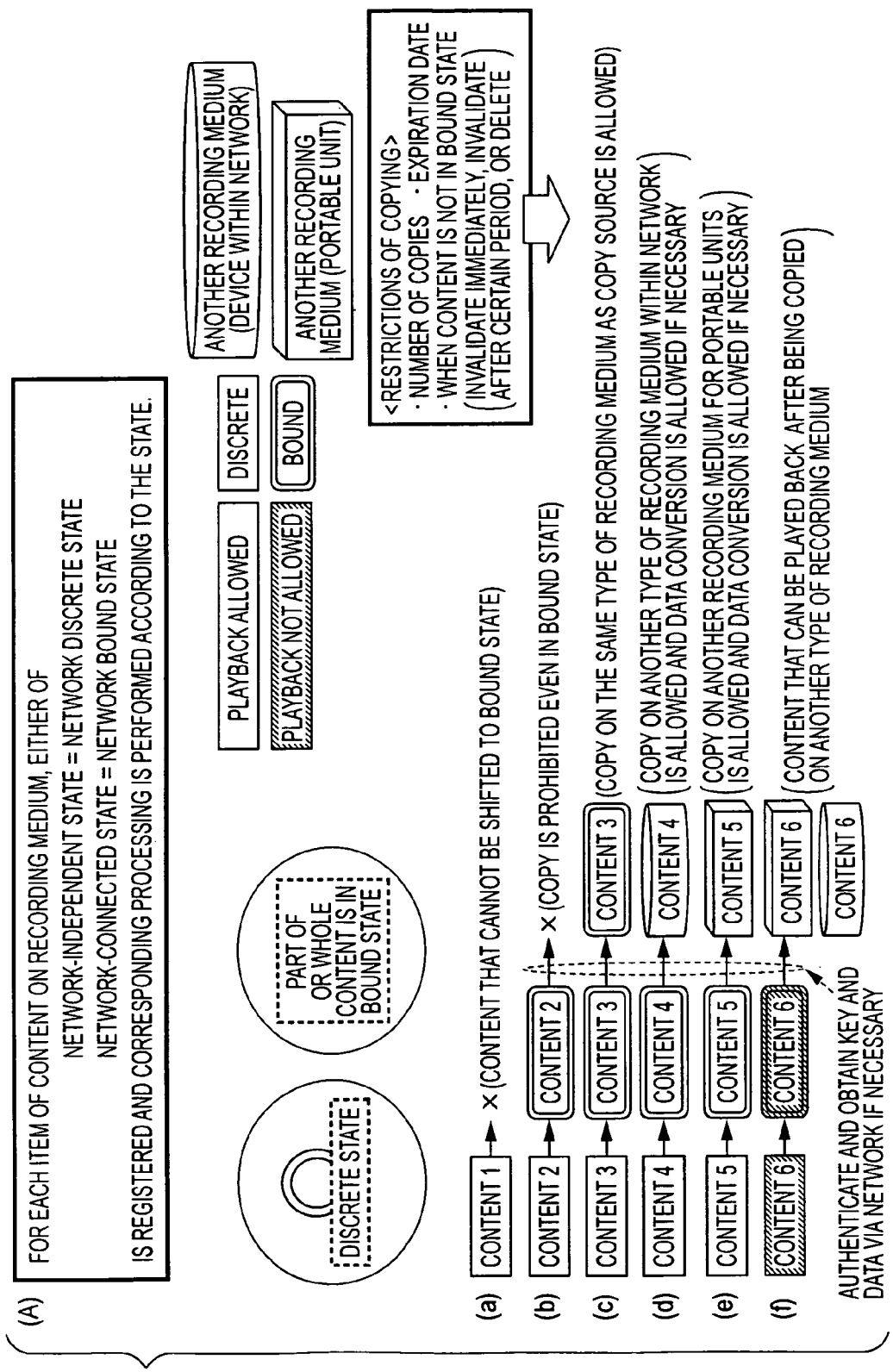
FIG. 6 illustrates content copy restrictions when the content is in the network discrete state or in the network bound state.

Two states are defined, as shown in FIG. 6, for a content management unit (CPS unit) on an information recording medium, i.e., the state in which the content management unit is in the network discrete state and the state in which the content management unit is in the network bound state.

If a plurality of content management units are recorded on the information recording medium, it is determined for each content management unit (CPS unit) whether the unit is in the network discrete state or in the network bound state. The management information concerning the discrete/bound state of each content management unit (CPS unit) is recorded on the information recording medium, a player (information playback device) in which the information recording medium is installed, or a management server on a home network executing the information management processing.

Content 1 through content 6 indicated by (a) through (f) of FIG. 6 are content management units (CPS units). In response to the user operation or the operation of a playback device, the state of each content management unit recorded on the recording medium can be shifted to the network bound state. There is content that is prohibited from being shifted to the network bound state, such as content 1 indicated by (a) of FIG. 6.

Information concerning the state of each content management unit is determined as attributes of the corresponding content management unit, and is stored in the information recording medium or in a management server storing management information as attribute information concerning the content management unit.

Each content management unit has predetermined processing types executable in the two states, i.e., (1) in the network discrete state and (2) in the network bound state, and information concerning such processing types is recorded in the information recording medium or the management server possessing management information as attribute information concerning the content management unit.

For example, there are content management units indicated by (a) through (f) of FIG. 6.

(a) Content 1 can be played back only in the network discrete state and is prohibited from being shifted to the bound state.

(b) Content 2 can be played back in the network discrete state and can also be played back in the network bound state, but is prohibited from being copied in either state.

(c) Content 3 can be played back in the network discrete state and can also be played back in the network bound state. It can be copied on the same type of recording medium as that of a copy source only in the network bound state.

As copy destinations, three types of destinations, such as the same type of recording medium as that of a copy source, a recording medium different from that of a copy source (within the same network), and a portable device, can be considered. Content 3 can be copied only on the same type of recording medium as that of a copy source, and only when it is verified that the copy destination is the same type of recording medium as that of the copy source, the copy source can send the data on the recording medium to the copy destination.

(d) Content 4 can be played back in the network discrete state and can also be played back in the network bound state. It can be copied on a different type of recording medium from that of a copy source only in the network bound state.

Content 4 can be copied on a different type of recording medium from that of a copy source, and if necessary, a copy source or a copy destination can convert data before recording it.

(e) Content 5 can be played back in the network discrete state and can also be played back in the network bound state. It can be copied on a portable unit only in the network bound state. The portable unit may be carried outside the home network, and thus, it is necessary to perform copy management by considering this situation.

As restrictions concerning copying, the number of copies, the expiration date, and handling of copy data when the original recording-medium is no longer in the network bound state should be defined. It is preferable that those restrictions be defined for each of the three types of copy destinations. When the original recording medium is no longer in the network bound state, copy data may be invalidated immediately, invalidated after a predetermined period, or deleted. If data is not deleted, it can be reused when the recording medium resumes in the network bound state. In this case, when the recording medium is lent to a friend, copy data cannot be temporarily used but can be reused when the recording medium is returned.

(f) Content 6 cannot be played back in the network discrete state, and can be played back in the network bound state. Copy data has been stored in a recording medium, assuming that content 6 is copied within the home network.

This copy data may be in a format that cannot be played back in a copy source device and can be played back when being copied into another device. For example, in a recording medium storing data in a multi-layered hierarchical format discussed with reference to FIG. 2 or 3, the copy data having the same content as that shown in FIG. 2 or 3 in a data format that can be played back in a general network-connected device (for example, the Audio Visual Interleaved (AVI) format or the MPEG-PS format that can be played back in a PC) is stored, and this copy data is sent to a device via a network to allow the device to play back the copy data.

It is preferable that authentication is conducted and a key is acquired before copying the content. If billing is carried out, i.e., if a key is required, every time the content is copied, it is preferable that the number of copies is restricted by the number of distributions of the key.

6. Management Information Concerning Content Management Units

A description is now given of, in an information recording medium storing content divided into content management units encrypted with unit keys, which serve as encryption keys, management information concerning the content management units. The content described below includes both main content and sub-content.

As stated above, one unit key is assigned to each content management unit (CPS unit), and the unit-structure/unit-key management table shown in FIG. 4 indicating the relationship between the content management units and the unit keys is set.

The attribute information concerning each content management unit (CPS unit) includes state information indicating whether the content management unit (CPS unit) is in the network discrete state or in the network bound state. However, for a read-only information recording medium, only the initial state is stored as the state information.

In a rewritable information recording medium, two types of information, such as the initial state and the current state, can be recorded. The current state information can be written by an information recording apparatus, which is a playback device, in which the information recording medium is installed, or by a management server connected to the network.

FIG. 7 illustrates an example of the configuration of a state management table in which the initial state and the current state are recorded in a rewritable information recording medium. In the initial state and the current state of the content management units, either the network discrete state or the network bound state is indicated.

The state management table shown in FIG. 7 is recorded, not only on the information recording medium, but also on an information processing apparatus, which serves as a playback device in which the information recording medium is installed, or an external device, such as a management server, connected to the network.

On a read-only information recording medium, only the initial state is recorded, and the state management table recording both the initial state and the current state is stored in the information processing apparatus, which serves as a playback device, in which the information recording medium is installed, or an external device, such as a management server, connected to the network.

In the initial state in the state management table, one of the following four states can be set: a. discrete only, b. discrete initially, c. bound only, and d. bound initially.

In the discrete only state, the content management unit is allowed to be only in the network discrete state, and is prohibited from being shifted to the network bound state.

In the discrete initially state, the content management unit is initially in the network discrete state, and may be shifted to the network bound state.

In the bound only state, the content management unit is allowed to be only in the network bound state, and is prohibited from being shifted to the network discrete state.

In the bound initially state, the content management unit is initially in the network bound state, and may be shifted to the network discrete state.

In the network bound state in the initial state, it is assumed that content is distributed by being related to information on the network, for example, the content is played back together with the information on the network.

In the current state, the network discrete state or the network bound state is indicated.

The current state can be set for each content management unit. To perform the content usage management, two state management methods can be considered. In one method, when a recording medium is carried outside the home network, it is typically reset to the initial state.

For example, if a removable medium that can be attached to and detached from a playback device is used as a content storage recording medium, the states of the individual content items are reset to the initial states when the removable medium is removed from the playback device. In this case, the state management table stored outside the recording medium is also initialized.

In the second method, the states of the recording medium are registered in, for example, an external management server. In this case, it is not necessary that the state management table outside the recording medium be initialized when the removable medium is removed from the playback device.

If a removable recording medium storing content set in the network bound state in a playback device connected to a home network A is installed in a playback device connected to a home network B constructed in another household and is set to the network bound state, the management server detects based on the state management table that the content in the network bound state in the home network A is to be set in the network bound state also in the home network B, and prohibits the multiple setting of the content in the network bound state in the home network B.

With this management, the multiple and simultaneous use of the same content can be prevented.

Since the state management table, such as that shown in FIG. 7, is stored in, for example, the management server, the current state can be checked even if the removable medium is removed, and the content usage management based on the current state can be implemented.

If the information recording medium is a recordable medium on which the current state can be recorded, the current state can be directly read from the recording medium without checking with the server whether the content is in the network bound state, and the content usage management can be conducted based on the read information.

If the information recording medium is a ROM medium, it is preferable that an area allowing the state management information to be written is formed in the ROM medium.

Alternatively, a write-once-read-many optical medium or a cartridge medium having an IC memory is preferably used.

The state management table shown in FIG. 7 may be integrated with the unit-structure/unit-key management table shown in FIG. 4 or may be formed independently.

The management information concerning each content management unit further includes information concerning restrictions of the playback operation or the usage of the content when it is in the network discrete state or in the network bound state.

The content management information is recorded in the information recording medium or in the management server performing content management as attribute information associated with the content. For the content that can be used only in the network bound state, the content usage management can be conducted based on only the content management information recorded on the management server.

An example of the content management information is shown in FIGS. 8A and 8B. More specifically, FIGS. 8A and 8B illustrate an example of fixed-length-data content usage control information, i.e., the content-playback/copy-control information management table. The content-playback/copy-control information management table includes different data concerning the individual CPS units or single data concerning all CPS units.

In the content-playback/copy-control information management table shown in FIGS. 8A and 8B, control information concerning the content usage and copying, such as content management information according to the content state, i.e., whether the content is in the network discrete state or in the network bound state, is recorded in the fixed length data.

If the content usage in a home network is taken into consideration, it is preferable that the fixed-length-data content management information, such as that shown in FIGS. 8A and 8B, is set. The management information concerning the network discrete state includes information whether or not the content can be played back in the network discrete state. For the content that is prohibited from being played back in the network discrete state, a solution for playing back the content is indicated (for example, the connection with a key distribution server or the acquisition of key data distributed in another medium (such as memory card) is necessary), and also, information concerning a uniform resource locator (URL) or the telephone number for specifying the server, or the index to a list storing such information, is indicated.

The management information concerning the network bound state includes information whether copying, streaming, remote playback within a network is allowed, and information for each subject device concerning the number of copies, the expiration date, the presence or absence of copy streaming data, the data conversion method, and handling of the copy data when the content is no longer in the network bound state.

The table shown in FIGS. 8A and 8B is generated, assuming that part of or the entire information is stored in a fixed-length field. Thus, data having a large number of characters, such as a URL or data position (path information), is stored in another file, and an index to a list stored in another file is stored in the fixed-length field.

To obtain the operation control information from a server and to play back the content based on the obtained information without using the playback control information recorded on the recording medium, a flag indicating whether information is obtained from the server and information indicating a method for accessing the server may be stored, as indicated by content management information data 501 shown in FIG. 8B.

By setting such information as the content management information, complicated control that cannot be represented by fixed-length data or a change in the control method after selling the recording medium can be implemented.

FIGS. 9A, 9B, and 9C illustrate an example of the content-playback/copy-control information management table in which content usage control information, i.e., the content-playback/copy-control information, set for each CPS unit is recorded as variable length data.

The items of information set in the table shown in FIGS. 9A, 9B, and 9C are the same as those shown in FIGS. 8A and 8B. Since variable-length information can be set, data having a large number of characters, such as an URL or data position (path information), can be directly included in the content management information. The content management information is indicated in a loop structure, and each type of content management information (CCI_and_other_info_type) is defined. Accordingly, the addition of a new copy control method can be handled easily by defining the corresponding type and the accompanying information (CCI_and_other_info_value and Additional_info). In this case, devices released in the past do not have to process unknown types.

The management information may be set as two structures, such as a structure, as shown in FIG. 9A, in which content management information concerning the network discrete state and content management information concerning the network bound state are integrated into one loop, and a structure, as shown in FIG. 9B, in which the two types of management information are separated into two loops.

To obtain operation control information from a server and to play back the content based on the obtained information without using the playback control information on the recording medium, a flag indicating whether information is obtained from the server and a method for accessing the server may be stored, as indicated by content management information data 502 in FIG. 9C.

By setting such-information as the content management information, complicated control that cannot be represented by fixed-length data or a change in the control method after selling the recording medium can be implemented.

Additionally, user definition information 503 may be set, as shown in FIG. 9C, in the content-playback/copy-control information management table so that the type of control information that can be defined by the user can be set. With this arrangement, the content playback control based on individual users can be conducted, for example, only membership users are allowed to play back certain content in distinction from non-membership users, or copy control information (CCI information) independent of the recording medium standards can be defined. As a result, a control method exceeding the recording medium standard, or a control method that can be defined by a content distributor, can be implemented.

An example of the user-defined copy control information (CCI information) is copy control information (CCI information) independent of the recording medium standards.

Parameters of copy control information (CCI information) are defined by the standard of each specific recording system (for example, DVD standards), and once playback devices compatible with such standards are widespread, it is difficult to extend the copy control information (CCI information).

Accordingly, desired control information which is not contained in the copy control information (CCI information) defined by the recording system is set as the user-defined information, and the content owner or administrator sets unique copy control information (CCI information).

It is difficult to interpret the copy control information (CCI information) uniquely defined by the content owner or administrator by using only a playback device compliant with the standards. Thus, an application (for example, Java) interpreting the copy control information (CCI information) is obtained from the recording medium, the server, or an external source, and by executing the application, the unique copy control information (CCI information) can be interpreted, and the operation control according to the CCI information can be executed in the playback device.

7. Storage Configuration of Main Content, Sub Content, and Content Management Information The storage configuration of main content, sub-content, and content management information is described below.

Figure 10:
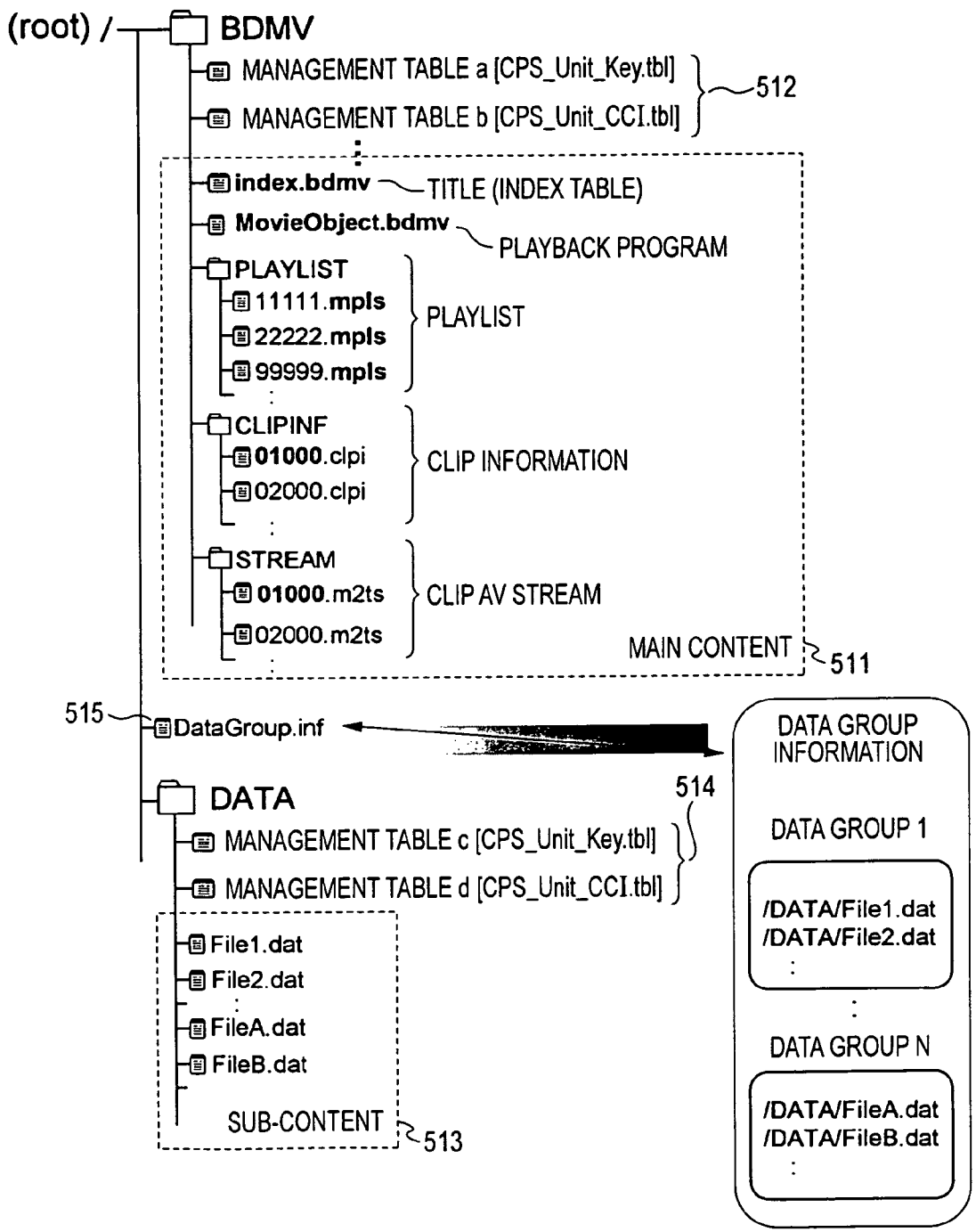
FIG. 10 illustrates a first example of the directory configuration of data stored in an information recording medium.

A description is now given, with reference to FIG. 10, of the directory configuration storing various content management units (CPS unit), various items of management information corresponding to the content management units, and examples of the settings of storage portions for the management information. The BDMV directory is a directory storing application files in the Blu-ray disc ROM format.

In the directory configuration shown in FIG. 10, a main content data portion 511 is a directory storing multi-layered main content data files according to the specific AV format described with reference to FIGS. 2 and 3, i.e., content and programs according to the specific AV format (Blu-ray disc ROM format) having a hierarchical structure including applications, playlists, and clips.

Those data files are stored in a user data area of the information recording medium. AV streams contained in the clips are data files encrypted by the corresponding unit keys, the unit key being set for each content management unit (CPS unit).

A main content management data portion 512 stores management files corresponding to the main content, and more specifically, data files in the unit-structure/unit-key management table shown in FIG. 4 indicating the relationships between the content management units (CPS units) and the unit keys, the state management table shown in FIG. 7 indicating the state of each content management unit (CPS unit), i.e., the network discrete state and the network bound state, and the content-playback/copy-control information management table shown in FIG. 8 or 9 storing information concerning the content usage and the copy control for each state. The tables are stored as individual data files or a single data file including a plurality of tables.

A sub-content data portion 513 is a directory storing content that does not belong to main content, and more specifically, content that does not comply with the specific AV format (Blu-ray disc ROM format), i.e., content that belong to the data groups shown in FIGS. 2 and 3. Those data files are also stored in the user data area of the information recording medium. The content belonging to the sub-content data portion 513 includes content that can be set as a content management unit (CPS unit) and content that cannot be set as a content management unit (CPS unit). Content that can be set as a content management unit (CPS unit) is a data file encrypted by the corresponding unit key.

A sub-content management data portion 514 stores management files corresponding to the sub-content, and more specifically, data files in the unit-structure/unit-key management table shown in FIG. 4, the state management table shown in FIG. 7, and the content-playback/copy-control information management table shown in FIG. 8 or 9.

Data group information 515 includes files storing data group information concerning the sub-content, and the paths of the data files are registered, as shown in FIG. 10, for each of the data group 1 through the data group N. When the sub-content is opened, the data group information 515 is first opened to obtain information concerning the group to which a desired item of content belongs, and a data file can be specified based on the obtained information.

If the group is set as a content management unit (CPS unit), it is encrypted with the corresponding unit key. Accordingly, when using a data file belonging to the group set as a content management unit (CPS unit), it should be decrypted by obtaining the unit key. Information required for this processing can be obtained from the management file of the sub-content management data portion 514.

In the sub-content data portion 513 shown in FIG. 10, the files belonging to all the groups are set together. Alternatively, as in a sub-content data portion 521 shown in FIG. 11, a folder for each data group may be set, and files belonging to each data group are set in the corresponding folder.

Figure 11:
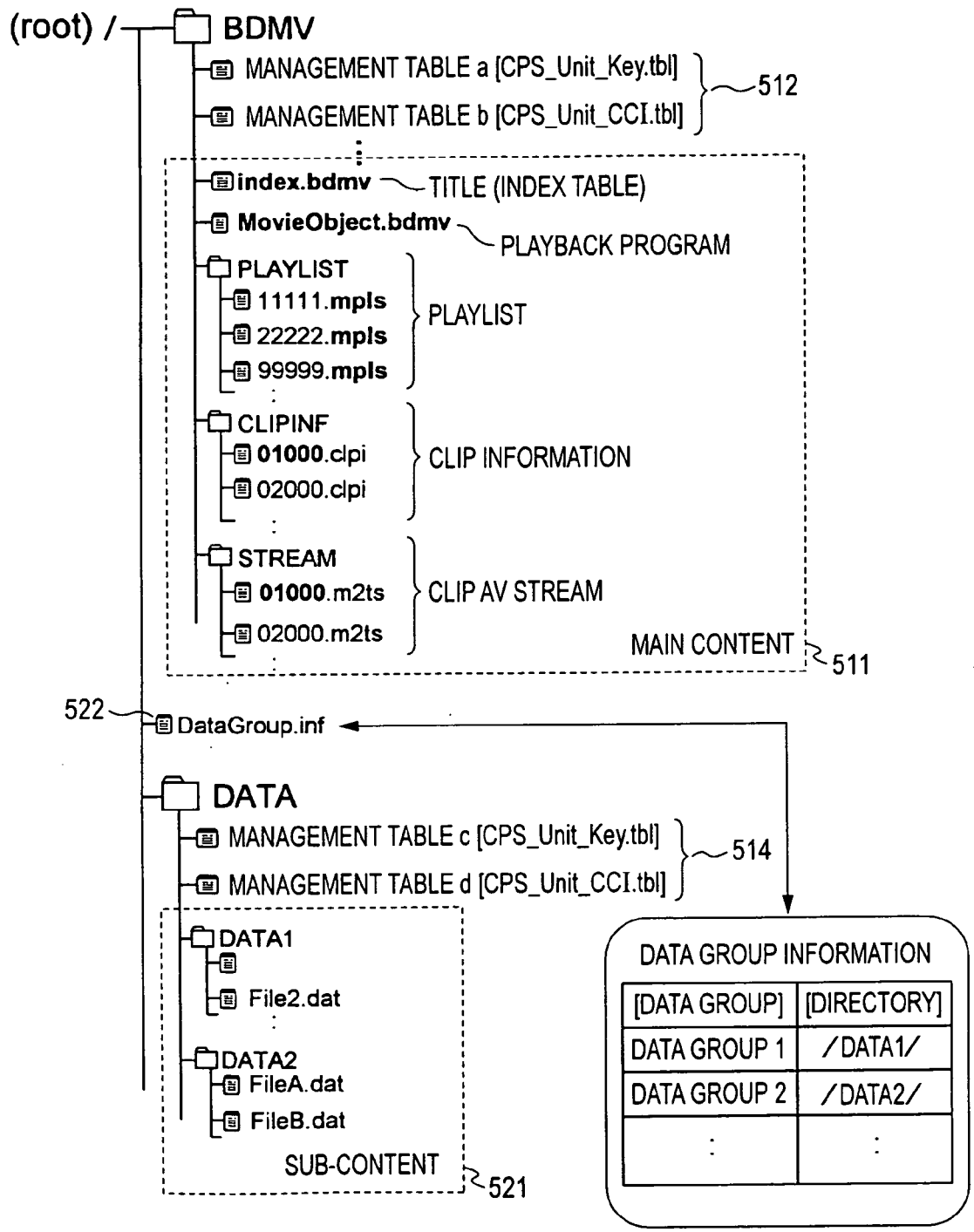
FIG. 11 illustrates a second example of the directory configuration of data stored in an information recording medium.

In the configuration shown in FIG. 11, data group information 522 is set as data in which a directory name (folder name) corresponding to each data group is set. To open the sub-content, the data group information 522 is first opened to obtain the directory name of the group to which a desired item of content belongs, and the data file is acquired based on the obtained information.

In the data storage configurations shown in FIGS. 10 and 11, the management information concerning the main content and the management information concerning the sub-content are separately set. However, the management information may be set as files directly connected to the root, as shown in FIG. 12, and all types of management information corresponding to the main content and the sub-content may be collectively managed.

Figure 12:
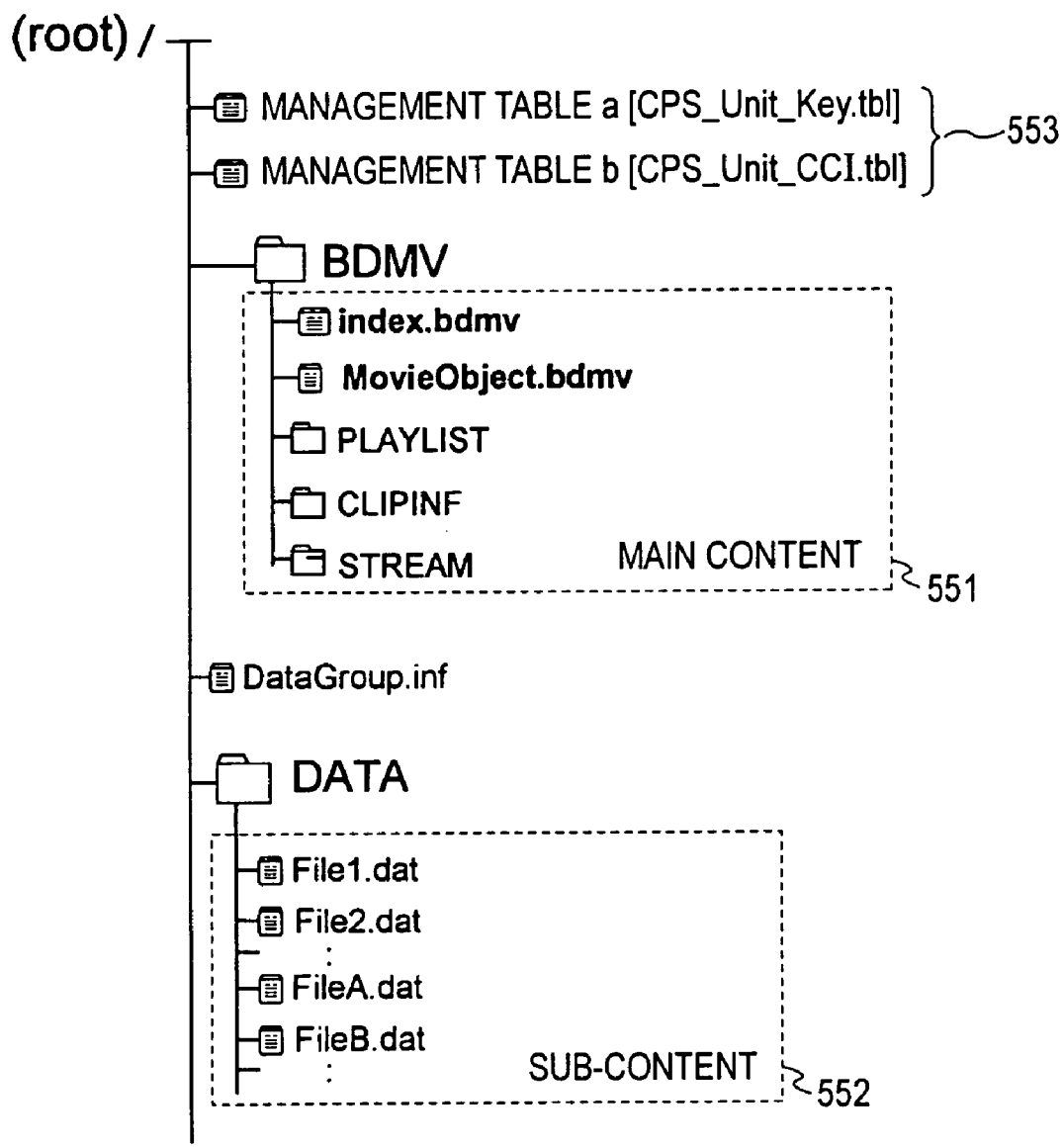
FIG. 12 illustrates a third example of the directory configuration of data stored in an information recording medium.

In the directory configuration shown in FIG. 12, a main content data portion 551, a sub-content data portion 552, and a content management data portion 553 corresponding to the main content and the sub-content are set.

The content management data portion 553 stores management files corresponding to the main content and the sub-content, and more specifically, data files in the unit-structure/unit-key management table shown in FIG. 4, the state management table shown in FIG. 7, and the content-playback/copy-control information management table shown in FIG. 8 or 9.

Various storage configurations are available for the main content management data, the sub-content management data, or content management data including both items of management data.

Figure 13A:
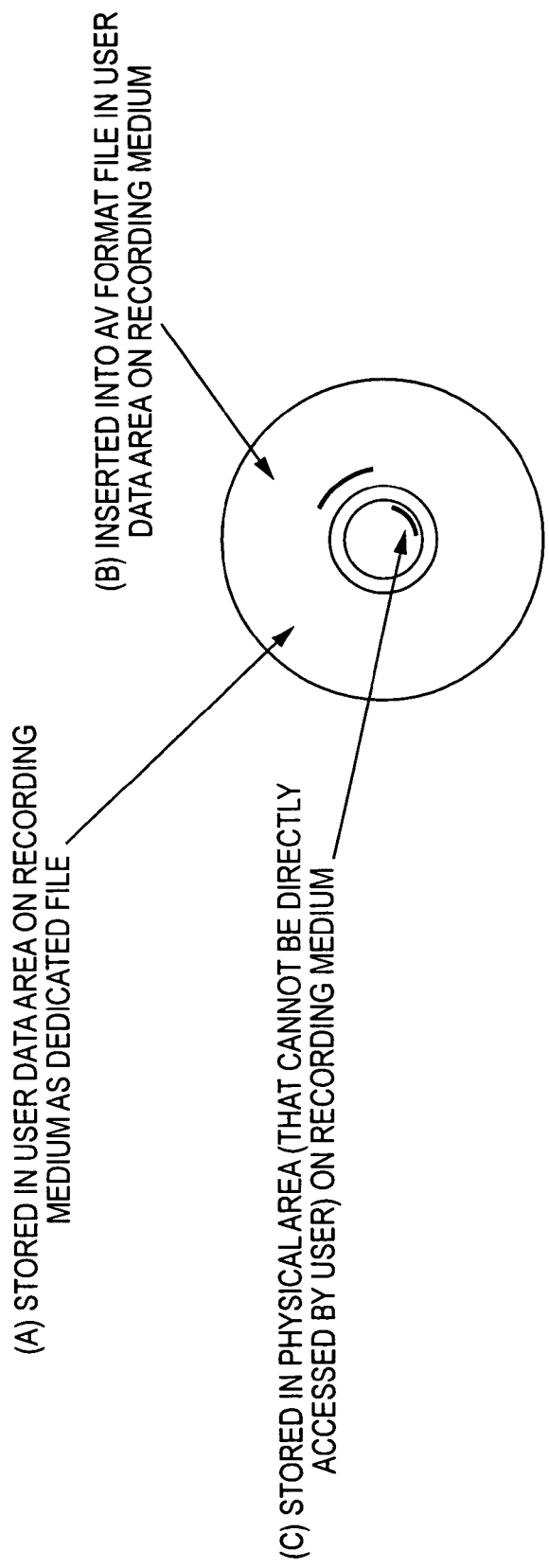
FIGS. 13A and 13B illustrate examples of storage configurations of management information.
Figure 13B:
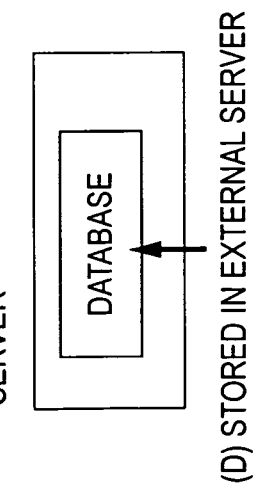

Examples of the storage configurations of the management data shown in FIGS. 13A and 13B are as follows:

(A) storing the management data in the user data area of the information recording medium as a dedicated file;

(B) inserting the management data into an AV format file in the user data area of the information recording medium, for example, inserting the management data into an AV format file, such as a title or index data file or a playlist;

(C) storing the management data in a physical area, i.e., an area that cannot be directly accessed by the user, of the recording medium; and (D) storing the management data in an external server. The management data is stored in any one of the storage configurations.

As stated above, examples of the management files are data files in the unit structure/unit-key management table shown in FIG. 4, the state management table shown in FIG. 7, and the content-playback/copy-control information management table shown in FIG. 8 or 9. The data files in those tables do not have to be stored in one storage configuration, and they may be stored by using different storage configurations.

The data files in the above-described three tables may be stored in a physical area, such as a lead-in area, on the information recording medium, as indicated by (C) of FIG. 13A. Alternatively, they may be stored in an external server, as indicated by (D) of FIG. 13B, in which case, a playback device should: obtain information concerning the three tables from the external server before playing back the recording medium.

8. Encryption and Tamper-proof Processing for Content Usage Control Information

The encryption processing and tamper-proof processing for the content usage control information is described below.

(8-1) Overview of Encryption and Tamper-proof Processing for Content Usage Control Information An overview of the encryption and tamper-proof processing for the content usage control information is first discussed. To prevent unauthorized tampering or reading, it is preferable that the content-playback/copy-control information table in which the content usage control information, i.e., the content usage and copy control information, described with reference to FIG. 8 or 9 be subjected to tamper-proof processing and encryption processing before being stored.

The tamper-proof and encryption processing for the playback/copy control information is discussed below with reference to FIG. 14.

Figure 14:
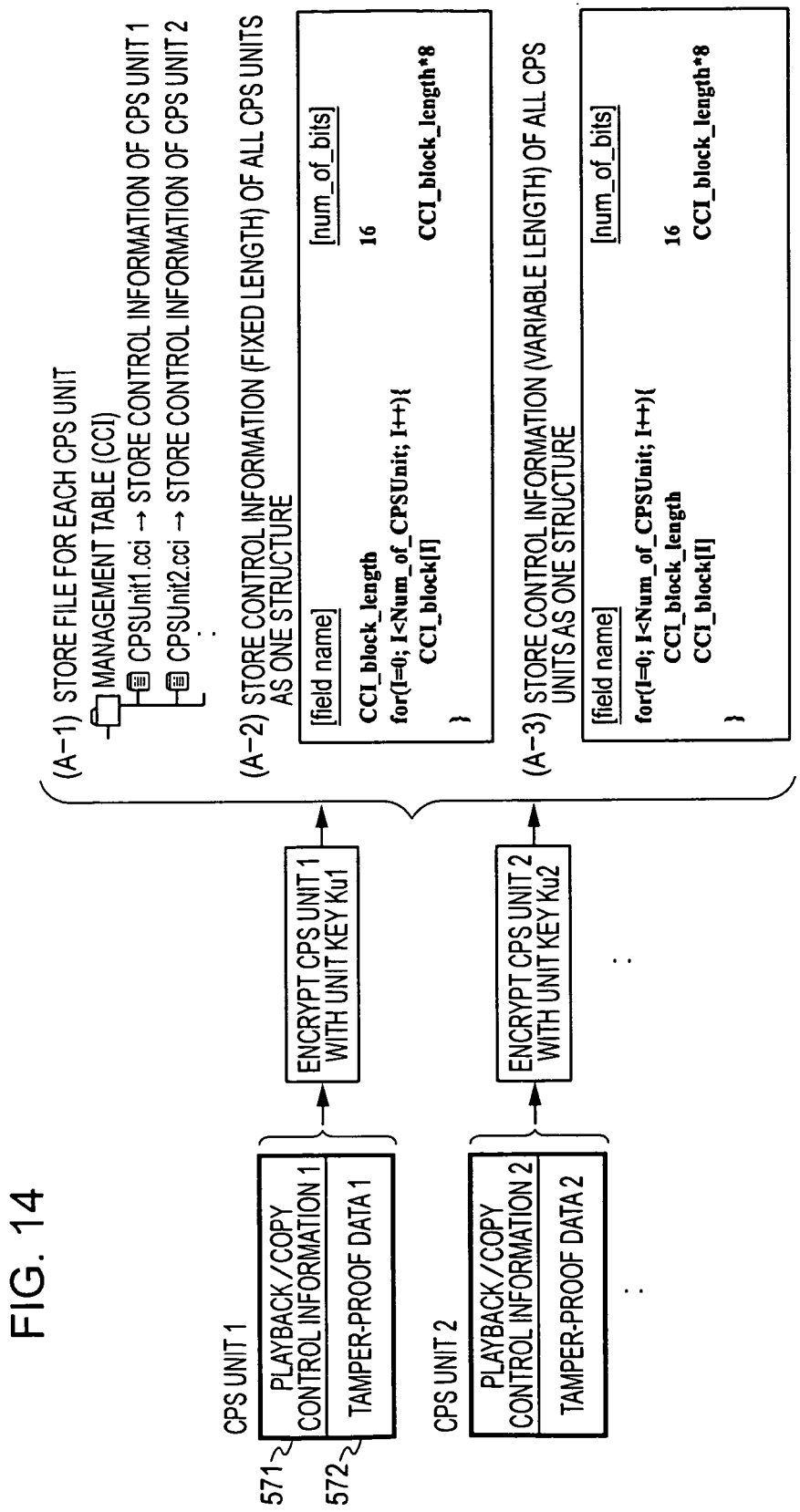
FIG. 14 illustrates tamper-proof and encryption processing for playback/copy control information.

Tamper-proof data is added, as shown in FIG. 14, to the playback/copy control information set for each CPS unit, and the resulting data is encrypted before being stored.

For example, tamper-proof data 1 572 is added to the playback/copy control information 1 571 set for CPS unit 1. As the tamper-proof data, hash data by using Secure Hash Algorithm 1 (SHA-1) or Message Authentication Code (MAC) based on the playback/copy control information may be used.

The playback/copy control information 1 571 provided with the tamper-proof data 1 572 is encrypted with the unit key for the corresponding CPS unit 1 and is then stored.

The storage configurations of the playback/copy control information are as follows: the configuration in which a playback/copy control information file is set for each CPS unit, as indicated by A-1 of FIG. 14, the configuration in which the control information of all the CPS units are stored as one fixed-length data file, such as that discussed with reference to FIG. 8, and the configuration in which the control information of all the CPS units are stored as one variable-length data file, such as that discussed with reference to FIG. 9.

Figure 15:
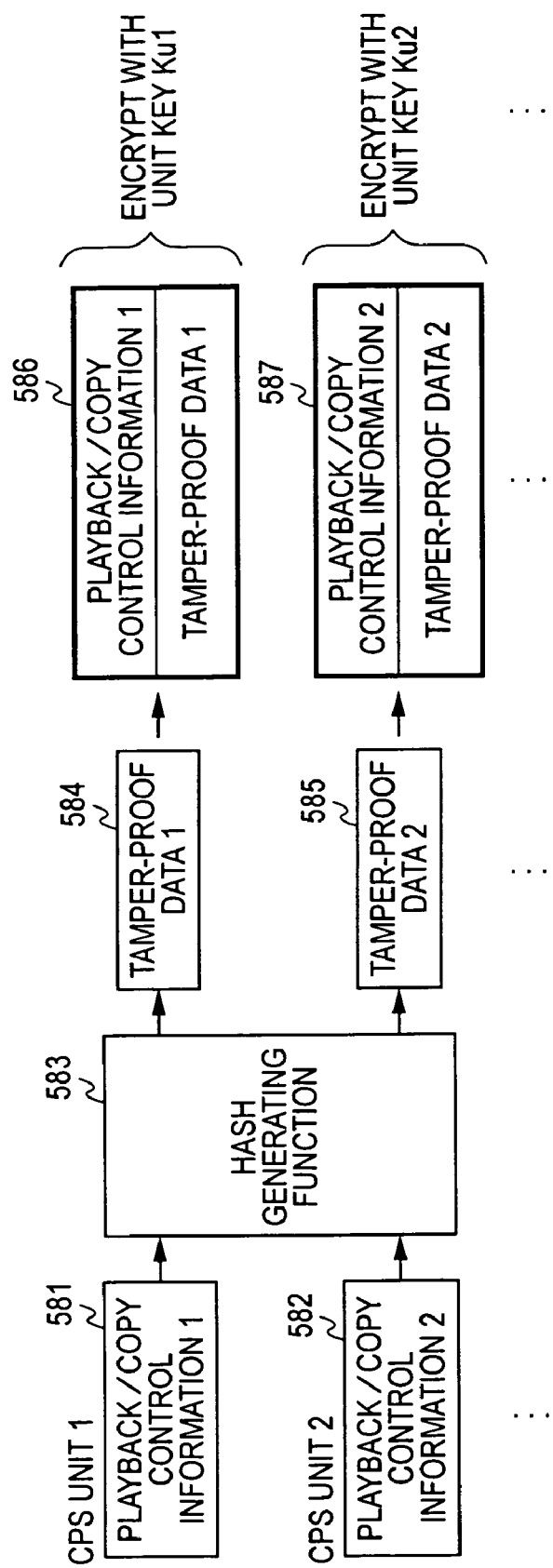
FIG. 15 is a block diagram illustrating tamper-proof and encryption processing implemented by applying a hash function to playback/copy control information.

A sequence when a hash function is used for the tamper-proof data is described below with reference to FIG. 15.

For playback/copy control information 581 and 582 corresponding to CPS units 1 and 2, hash values are generated by using a hash generating function 583, for example, SHA-1.

Those hash values are set as tamper-proof data 584 and 585 associated with the playback/copy control information 581 and 582, respectively, and combination data 586 and 587 having the playback/copy control information and the tamper-proof data are encrypted with the corresponding unit keys Ku1 and Ku2, and the resulting data are stored as files.

Figure 16:
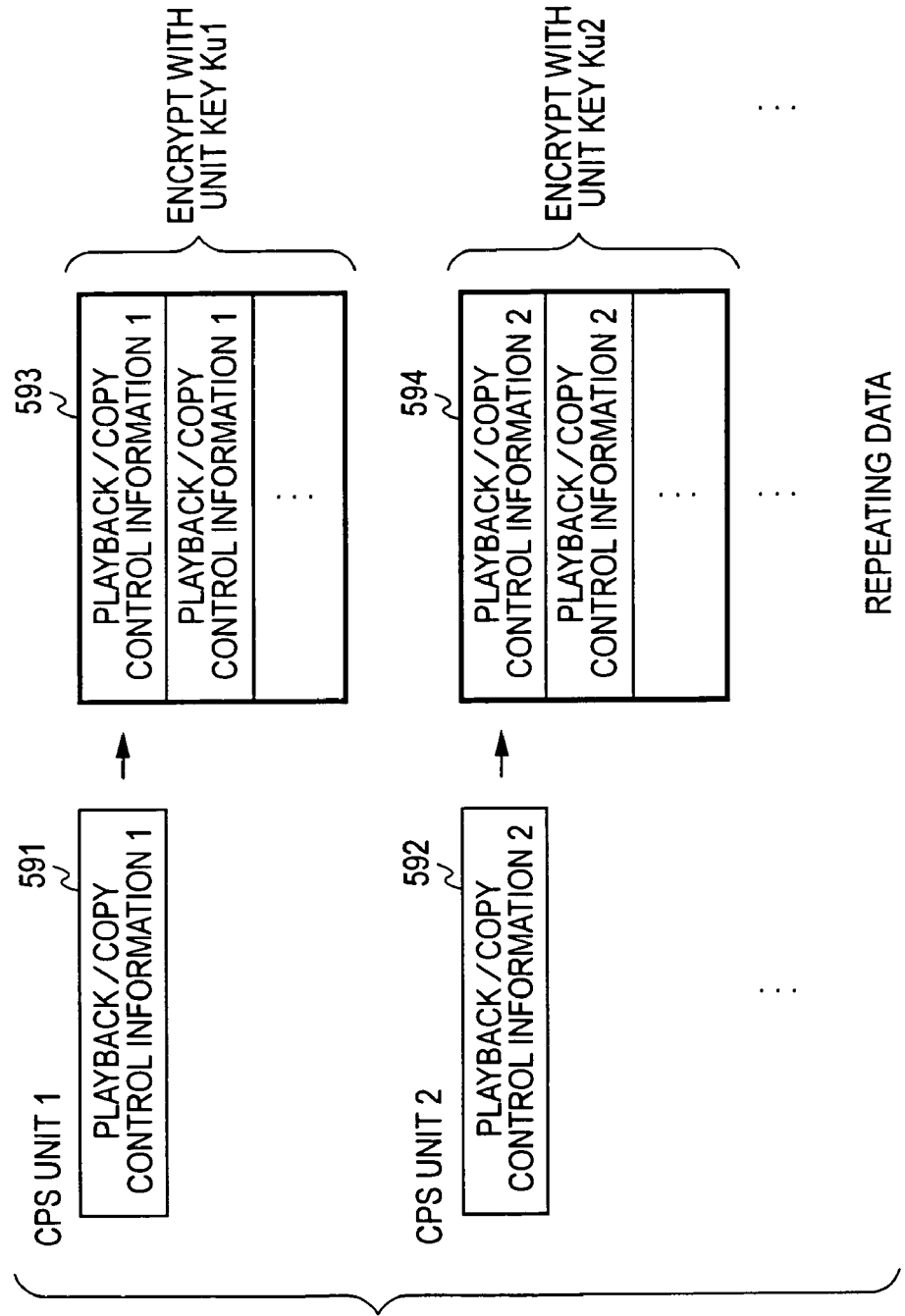
FIG. 16 is a block diagram illustrating tamper-proof and encryption processing by using repeating data of playback/copy control information.

The tamper-proof configuration without using a hash function is discussed below with reference to FIG. 16. Playback/copy control information 591 and 592 associated with CPS units 1 and 2 are set as combination data 593 and 594, respectively, obtained by repeating the playback/copy control information 591 and 592 for a plurality of times. The combination data 593 and 594 are encrypted with the unit keys Ku1 and Ku2, respectively, and the resulting data are stored as files.

When the encrypted combination data obtained by repeating the same data is decrypted by using the unit keys Ku1 and Ku2, the integrity of the data can be verified according to whether the same pattern as the repeating pattern used when the combination data is encrypted has been detected.

The information processing apparatus to perform content playback processing obtains the encrypted content usage control information associated with the content management unit (CPS unit) stored in the information recording medium, i.e., the playback/copy control information, and decrypts the playback/copy control information with the unit key set for the content management unit and checks the integrity of the playback/copy control information. Only when the integrity of the playback/copy control information is verified, the information processing apparatus performs content usage processing based on the content usage control information.

(8-2) Examples of Specific Encryption and Tamper-proof Processing for Content Usage Control Information A specific example of encryption and tamper-proof processing for the content usage control information is discussed below.

In this example, the playback/copy control information as the content usage control information is stored in the configuration indicated by A-1 of FIG. 14, i.e., in which the individual files are set for the playback/copy control information of the CPS units.

The encryption scheme of the playback/copy control information as the content usage control information is described below with reference to FIG. 17.

Figure 17:
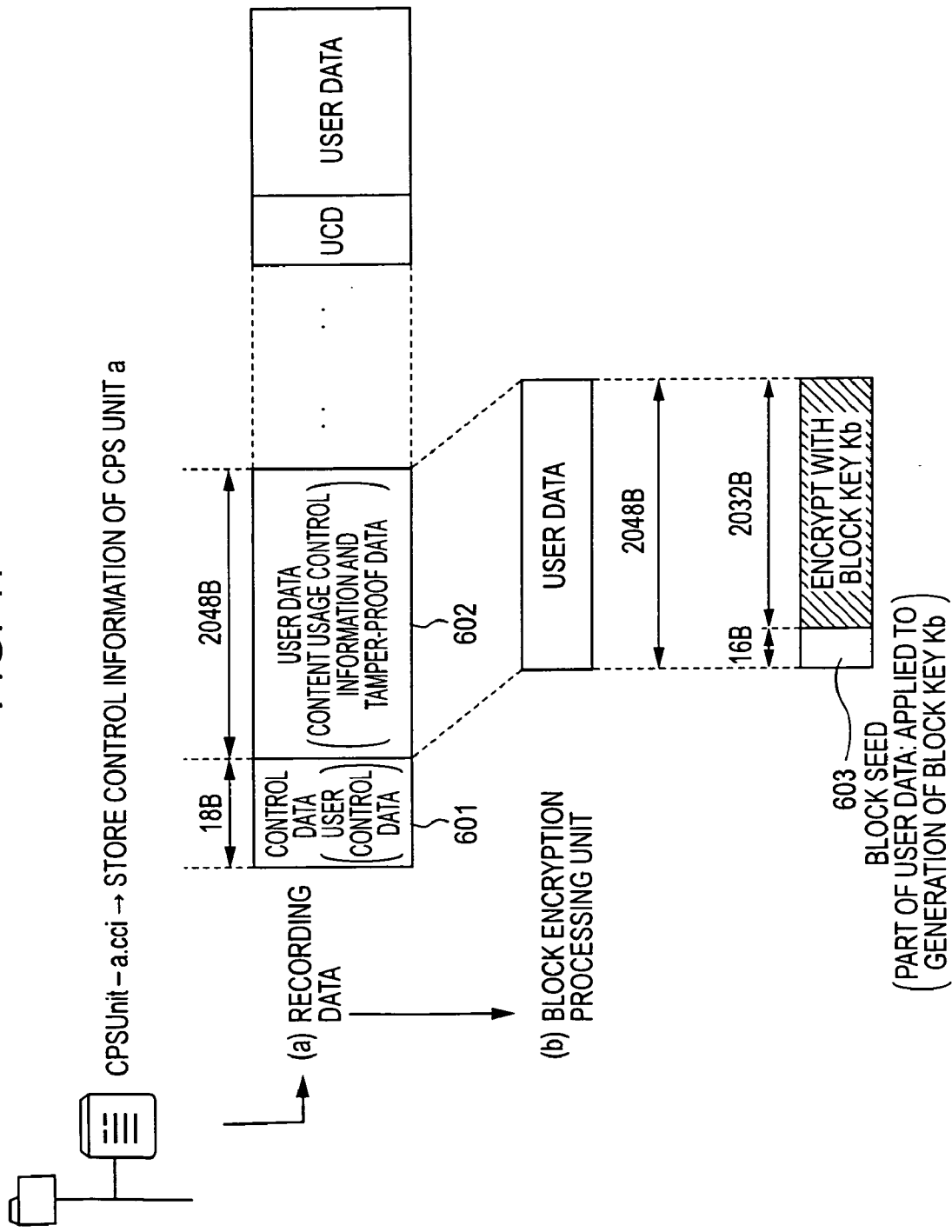
FIG. 17 illustrates the data structure of content usage control information stored in an information recording medium, that is, the recording configuration of data forming each file for playback/copy control information for each CPS unit.

FIG. 17 illustrates the data structure of the content usage control information stored in the information recording medium, i.e., the data structure of each file associated with the playback/copy control information for the corresponding CPS unit.

The structure of the recording data of the content usage control information for CPS unit 001 on the information recording medium is shown in (a) of FIG. 17. The recording data is formed of a plurality of data blocks, each data block including 18-byte user control data (UCD) 601 and 2048-byte user data 602 including the content usage control information and hash data serving as tamper-proof data. The number of data blocks varies according to the data length of the content usage control information.

The content usage control information of CPS unit a indicated by (a) of FIG. 17 is content usage control information associated with one CPS unit among a plurality of CPS units stored in the information recording medium. For example, the content usage control information corresponds to content usage control information [CPS Unit 001.cci] 610 of CPS unit 001 in the directory shown in FIG. 18 indicating the overall data structure recorded on the information recording medium.

Figure 18:
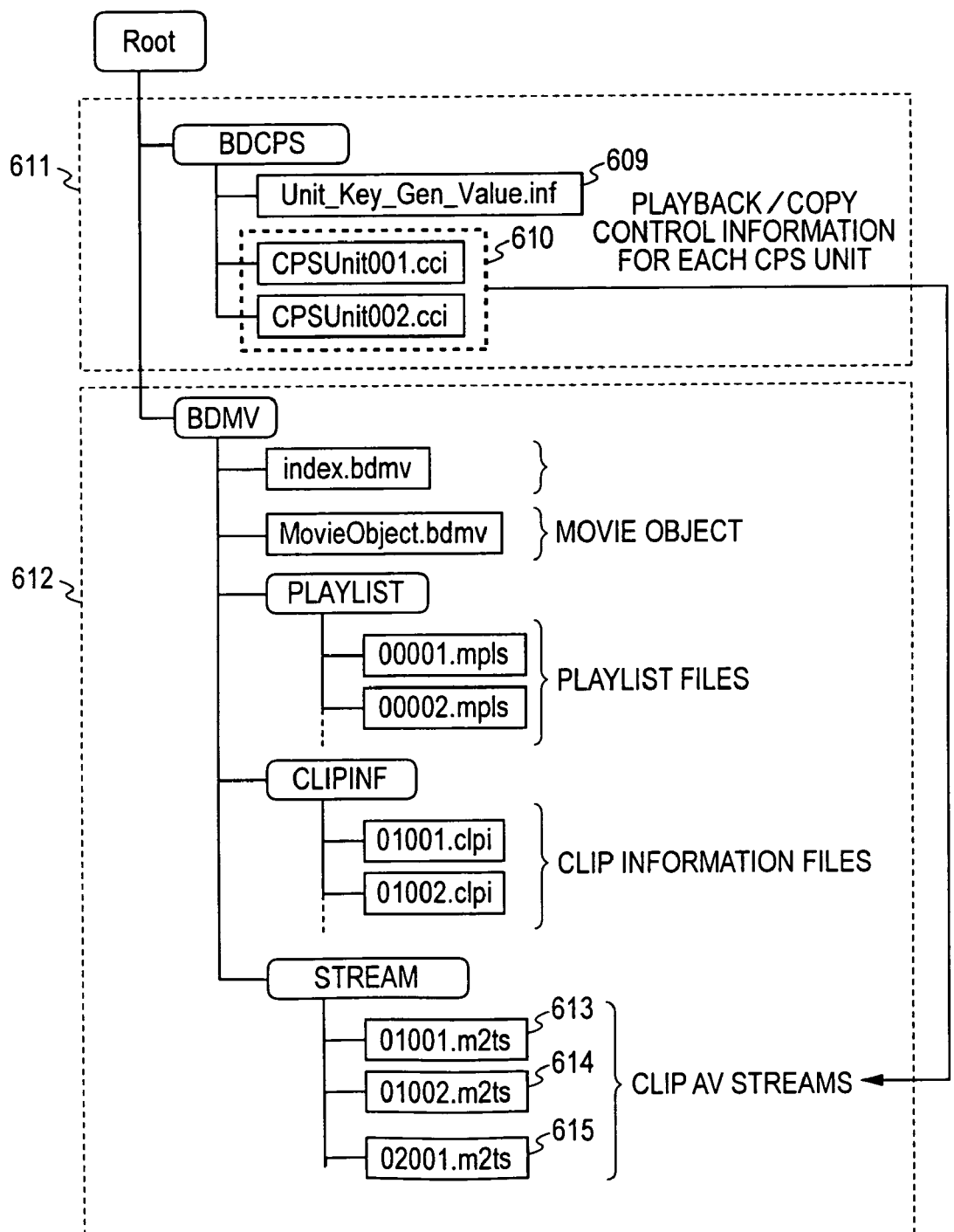
FIG. 18 illustrates the directory of the overall data recorded on an information recording medium.

The directory shown in FIG. 18 is formed of a content data portion 612 and a content management data portion 611 corresponding to the content. The BDMV directory indicated in the content data portion 612 is set as a directory storing content and applications according to the Blu-ray disc ROM format.

The content according to the Blu-ray disc ROM format has a hierarchical structure including titles, objects, playlists, clip information, and AV streams, discussed with reference to FIGS. 2 and 3, and the data files forming those data are set in the BDMV directory.

In the content management data portion 611, management files corresponding to the content are stored. For example, unit key generation value information (Unit_Key_Gen_Value.inf) 609 corresponding to the unit-structure/unit-key management table shown in FIG. 4 and content usage control information (CPSUnit0nn.cci) serving as content-playback/copy-control information set for each unit are stored for each CPS unit in the content management data portion 611.

The data structure of the unit key generation value information (Unit_Key_Gen_Value.inf) 609 is discussed with reference to FIG. 19. FIG. 19 illustrates an example of the syntax of the unit key generation value information (Unit_Key_Gen_Value.inf) file. The unit key generation value information file is a data file in which information associating the content management units with the indexes and random-number information for generating the unit keys are defined.

More specifically, the unit key generation value information (Unit_Key_Gen_Value.inf) file is a file in which information associating the CPS units with the first playback index 281 serving as playback content to be started when the information recording medium (disc) is installed in the drive, the top menu index 282 serving as content to be played back when the menu display function is started, and other indexes, such as a title, and random-number (Vu) information for generating the keys assigned to the CPS units are defined.

The unit key generation value information (Unit_Key_Gen_Value.inf) includes the following data:

(a) [CPS_Unit_number_for_FirstPlayback] as information specifying the CPS unit number corresponding to the first playback index 281;

(b) [CPS_Unit_number_for_TopMenu] as information specifying the CPS unit number corresponding to the top menu index 282;

(c) [Number of Titles] as title number information;

(d) [CPS_Unit_number for Title] as information specifying the CPS unit number corresponding to each title;

(e) [Number of CPS_Units] as CPS unit number information; and (f) [Unit Key Generation Value for CPS_Unit] as random-number (Vu) information for generating the key for each CPS unit.

If content corresponding to the first playback index is not stored, [CPS_Unit_number_for_FirstPlayback=0] is set. If content corresponding to the top menu index is not stored, [CPS_Unit_number_for_TopMenu=0] is set. The CPS unit numbers are set in association with the title numbers (Title#1 through Title#).

The content-playback/copy-control information is set for each CPS unit. More specifically, the content usage control information is set for each CPS unit stored in the information recording medium, for example, as follows.

[CPS Unit 1]
the allowable number of copies on the recording medium: a, the allowable number of playback operations: b, and the remote control playback is allowed/not allowed: allowed

[CPS Unit 2]
the allowable number of copies on the recording medium: 0, the allowable number of playback operations: c, and the remote control playback is allowed/not allowed: not allowed The content usage control information [CPSUnit001.cci] 610 shown in FIG. 18 is the content usage control information for CPS unit 001, and the content usage control information [CPSUnit002.cci] is the content usage control information for CPS unit 002.

The content usage control information is associated with the content stored in the CPS units, and more specifically, clip AV stream data 613, 614, and 615 in the directory shown in FIG. 18.

Figure 20:
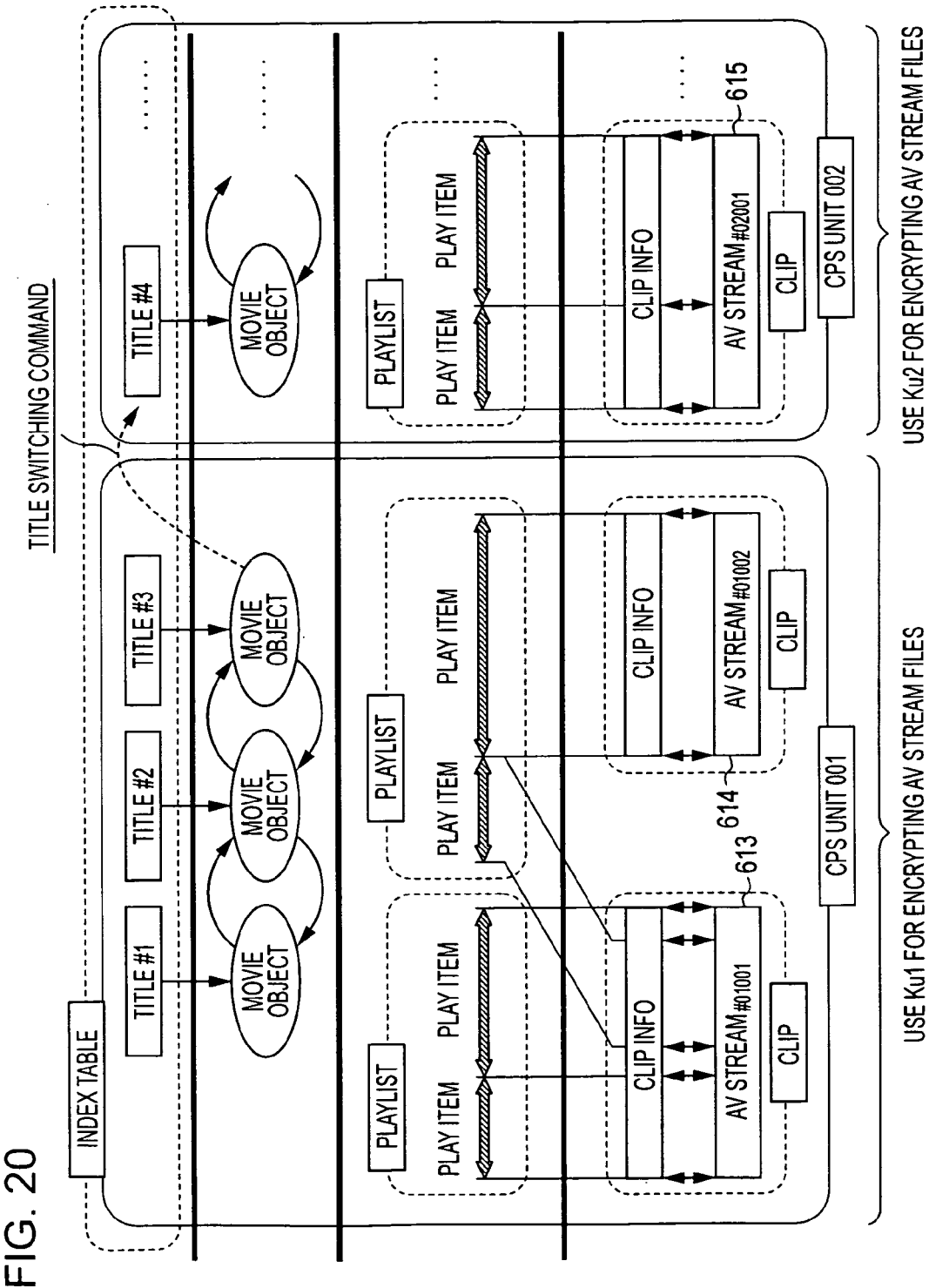
FIG. 20 illustrates the content configuration indicating the association between AV streams and CPS units according to the Blu-ray disc ROM format.

FIG. 20 schematically illustrates the content configuration indicating the association between the AV streams 613, 614, and 615 and the CPS units according to the Blu-ray disc ROM format. The clip AV streams 613, 614, and 615 shown in FIG. 18 correspond to AV stream data 613, 614, and 615, respectively, shown in FIG. 20.

That is, the clip AV stream data 613 and 614 belong to the CPS unit #1, while the clip AV stream data 615 belongs to the CPS unit #2.

Accordingly, the content playback control information for the clip AV stream data 613 and 614 is a content playback control information file set for the CPS unit 001, for example, the content usage control information [CPSUnit001.cci] 610 shown in FIG. 18, and the content playback control information for the clip AV stream data 615 is a content playback control information file set for the CPS unit 002, for example, the content usage control information [CPSUnit002.cci] shown in FIG. 18.

To play back the content contained in a CPS unit, the information processing apparatus reads the content usage control information corresponding to the CPS unit and performs usage processing according to the read control information.

Referring back to FIG. 17, the recording configuration of the content usage control information is discussed below. The 18-byte control data (UCD) of the recording data indicated by (a) of FIG. 17, which is control data set for each 2048-byte user data 602, includes playback control data. The playback/copy control information for each CPS unit and the hash value as tamper-proof data for the playback/copy control information are stored in the user data 602.

Each data block is encrypted with a block seed 603 set in the block and a block key Kb generated by the unit key Ku corresponding to each content management unit (CPS unit).

The block encryption processing by using the block key Kb is discussed below with reference to FIG. 21. User data 621 shown in FIG. 21 indicates user data (2048 bytes) in one data block. This user data contains playback/copy control information for the corresponding CPS unit.

In the block encryption processing, a predetermined block seed is extracted from this user data (2048 bytes), and the block key Kb is generated by the block encryption processing based on the block seed and the unit key Ku, and then, encryption processing is performed on the data portion other than the block seed by using the block key Kb.

Figure 21:
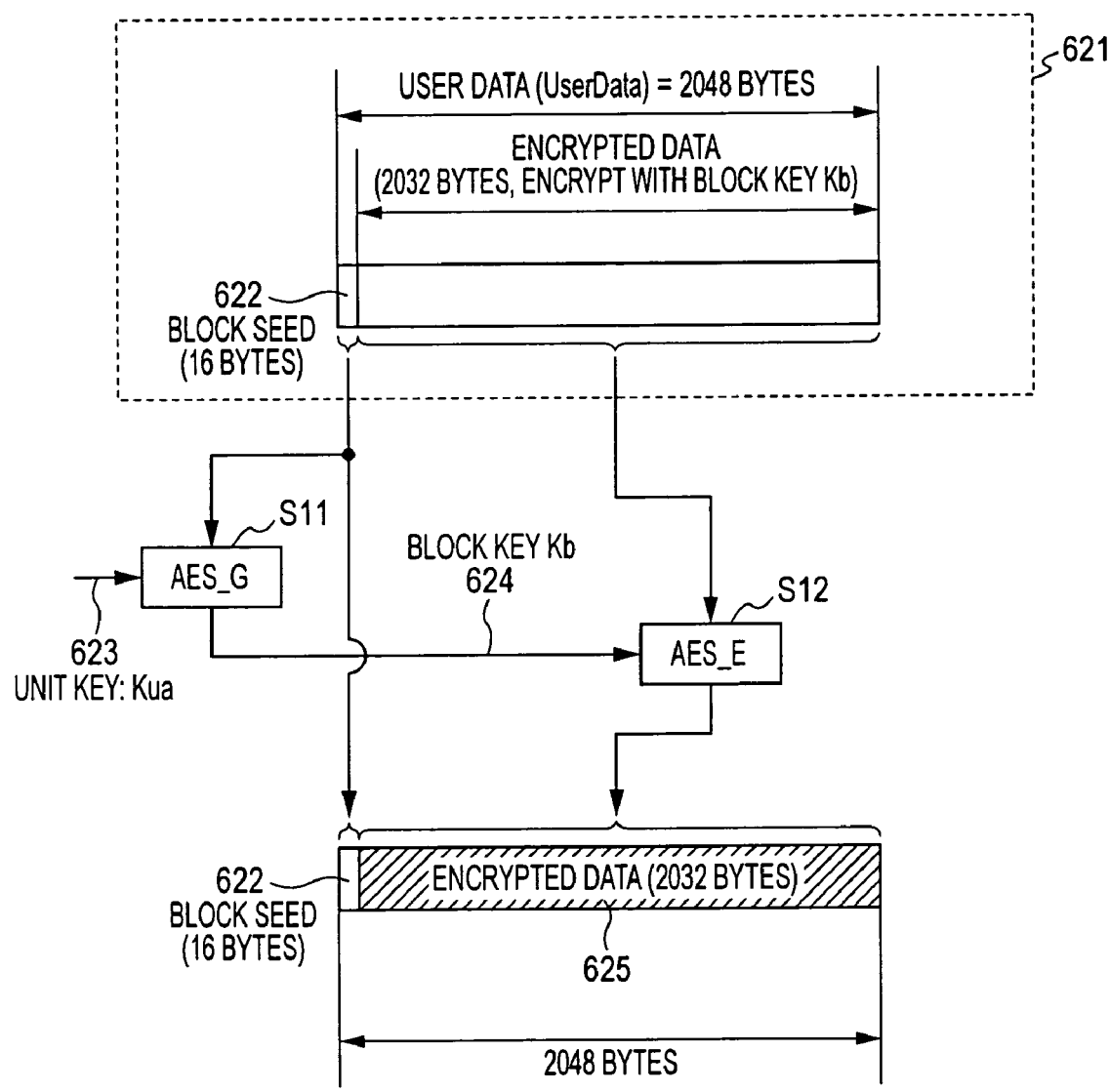
FIG. 21 illustrates block encryption processing with a block key Kb.

In the example shown in FIG. 21, 16-byte data is extracted from the head of the user data, and is set as the block seed 622.

In step S11, the 16-byte block seed 622 is encrypted, and more specifically, by Advanced Encryption Standard (AES) encryption processing, as shown in FIG. 21, by using a CPS unit key Ku-a 623, to generate block key Kb 624.

The CPS unit key Ku-a 623 is the unit key for the CPS unit corresponding to the content usage control information to be encrypted. If the content usage control information to be encrypted is control data corresponding to the CPS unit a, the unit key Ku-a associated with the CPS unit a is used. In this manner, the unit key set for each CPS unit is used for generating the block key.

Upon generating the block key Kb 624 in step S11, in step S12, the data portion of the user data 621 other than the 16-byte block seed 622, that is, the 2032-byte data area, is encrypted, for example, by AES encryption processing, with the block key Kb 624.

By this encryption processing, the 2048-byte user data is set as the 16-byte unencrypted block seed 622 and the 2032-byte data encrypted with the block key Kb 624, and is then recorded on the information recording medium.

The block seed 622 is data extracted from the user data and is set for each block. Accordingly, even if the same CPS unit key Ku is applied to a plurality of blocks in the CPS unit, the block key Kb becomes different depending on the block, and encryption processing with higher security can be implemented.

Figure 22:
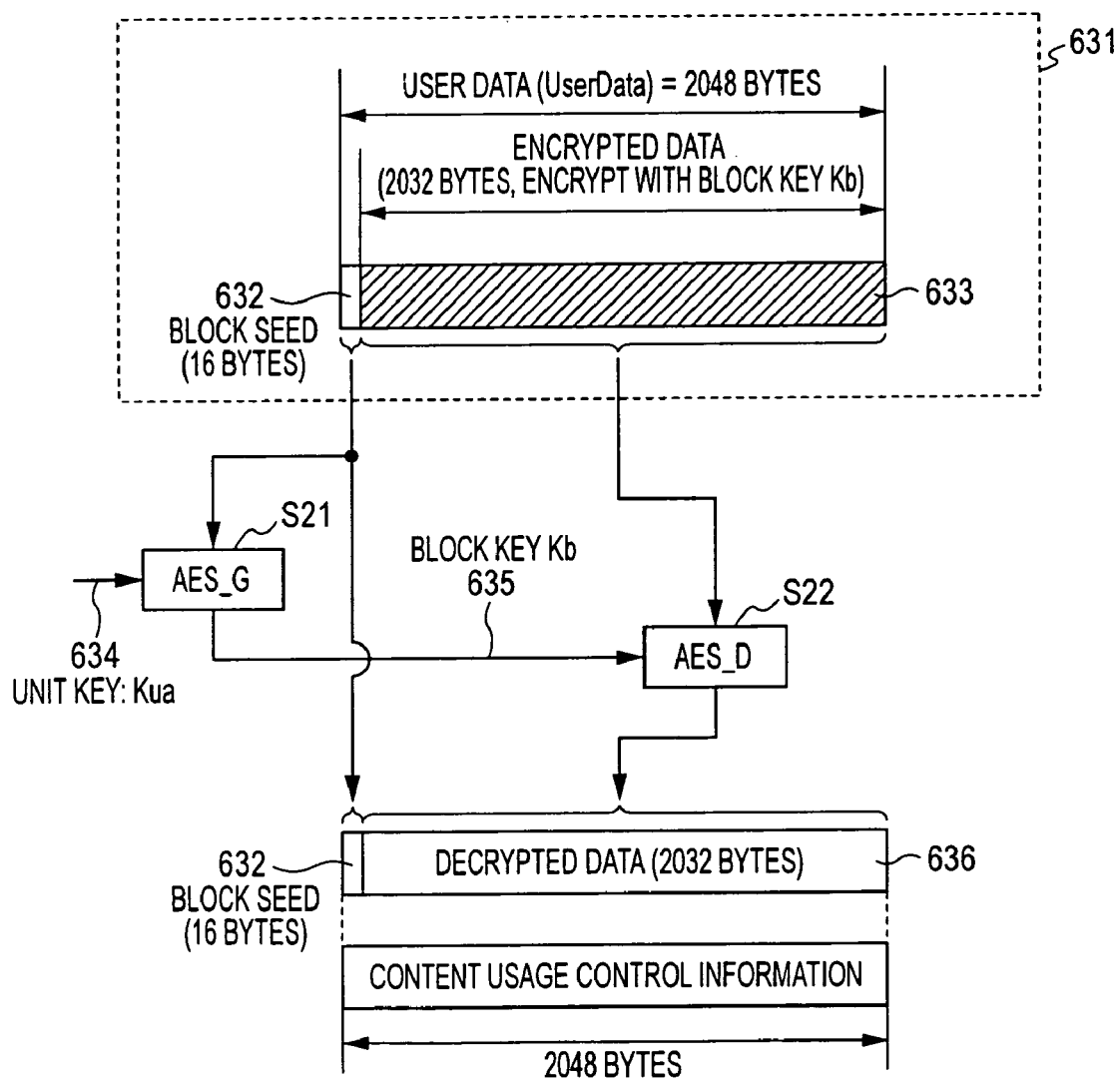
FIG. 22 illustrates decryption processing with a block key Kb.

A description is now given of a sequence for decrypting data subjected to block encryption processing with reference to FIG. 22. 2048-byte user data 631 shown in FIG. 22 is the data subjected to the block encryption processing discussed with reference to FIG. 21, and includes a 16-byte unencrypted block seed 632 and 2032-byte data 633 encrypted with the block key Kb.

As shown in FIG. 22, in step S21, the 16-byte block seed 632 at the head of the user data is encrypted, and more specifically, by AES encryption processing, by using a CPS unit key Ku-a 634 to generate a block key Kb 635.

The CPS unit key Ku-a 634 is the unit key for the unit corresponding to the content usage control information to be encrypted, and if the content usage control information to be encrypted is control data associated with the CPS unit a, the unit key Ku-a for the CPS unit a is used.

Upon generating the block key Kb 635 in step S21, in step S22, the data portion of the user data 631 other than the 16-byte block seed 632, i.e., the 2032-byte encrypted data 633, is decrypted, for example, by AES decryption processing, with the block key Kb 635.

By this decryption processing, the 2048-byte user data 631 is divided into the 16-byte unencrypted block seed 632 and the 2032-byte decrypted data 636. This user data is content usage control information corresponding to the specific CPS unit, and the information processing apparatus plays back the content based on this control information.

In FIGS. 21 and 22, the encryption and decryption processing for one block has been discussed. However, as described with reference to FIG. 17, content usage control information for the corresponding CPS unit is recorded in a plurality of blocks according to its data length. Accordingly, in recording or playing back the content usage control information, the encryption and decryption processing for each block described with reference to FIGS. 21 and 22 is performed for a plurality of blocks.

Figure 23:
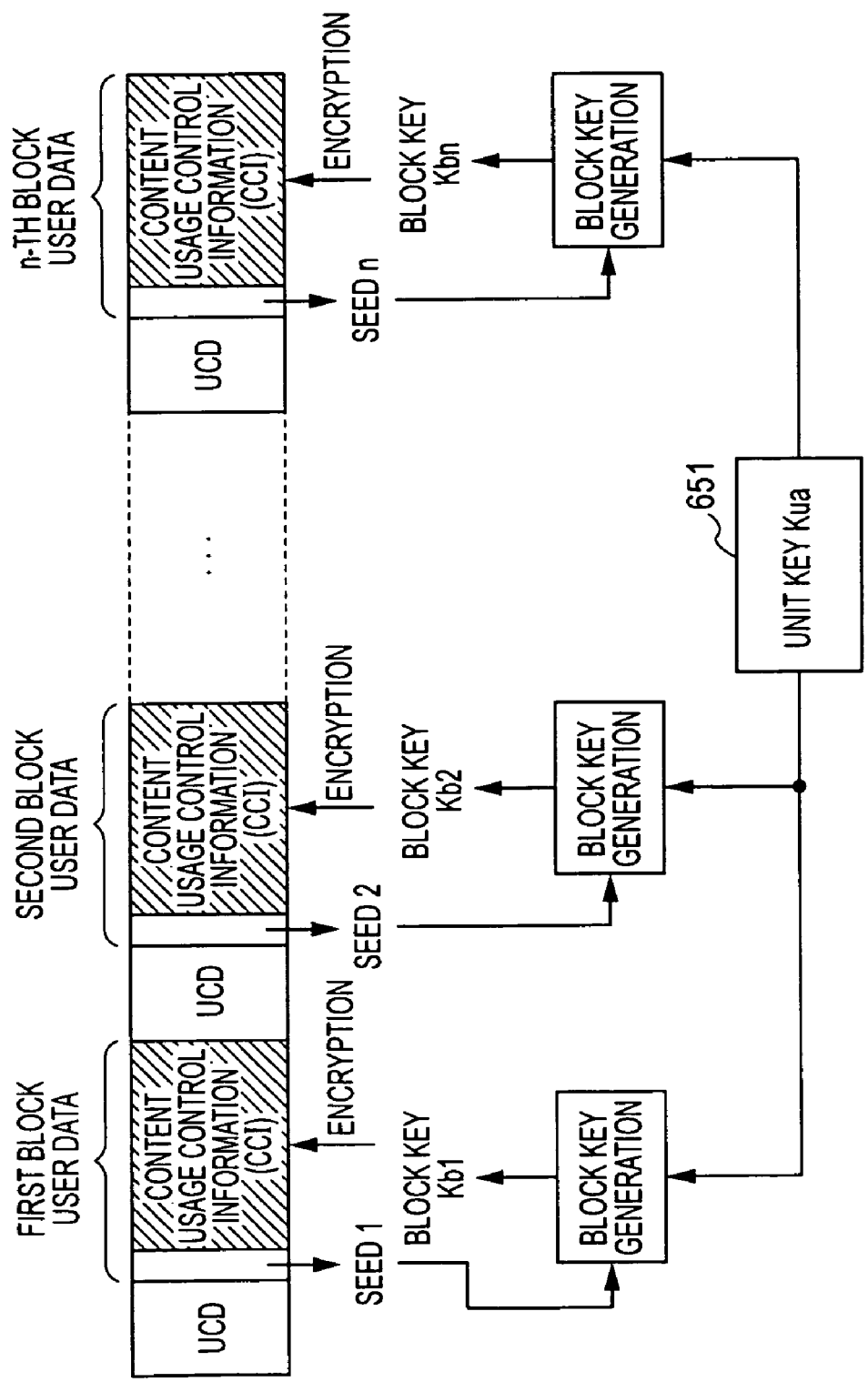
FIG. 23 illustrates an example of the overall configuration of recording data of content usage control information corresponding to one CPS unit.

FIG. 23 illustrates an example of the overall configuration of recording data of content usage control information corresponding to one CPS unit a. The content usage control information is stored by being distributed in user data areas of a plurality of blocks. In the example shown in FIG. 23, user data areas of first through n-th blocks are used.

The first 16 bytes are extracted from each user data in each block as a seed, and a key is generated by encryption processing by using a unit key Kua 651.

In the first block, encryption processing is performed by using the seed 1 and unit key Kua 651 to generate a block key Kb1, and the data area of the user data other than the seed 1 is encrypted with the block key Kb1. Similarly, in the second block, encryption processing is performed by using the seed 2 and unit key Kua 651 to generate a block key Kb2, and the data area of the user data other than the seed 2 is encrypted with the block key kb2. Thereafter, processing is similarly performed on all the blocks, thereby generating recording data.

Figure 24:
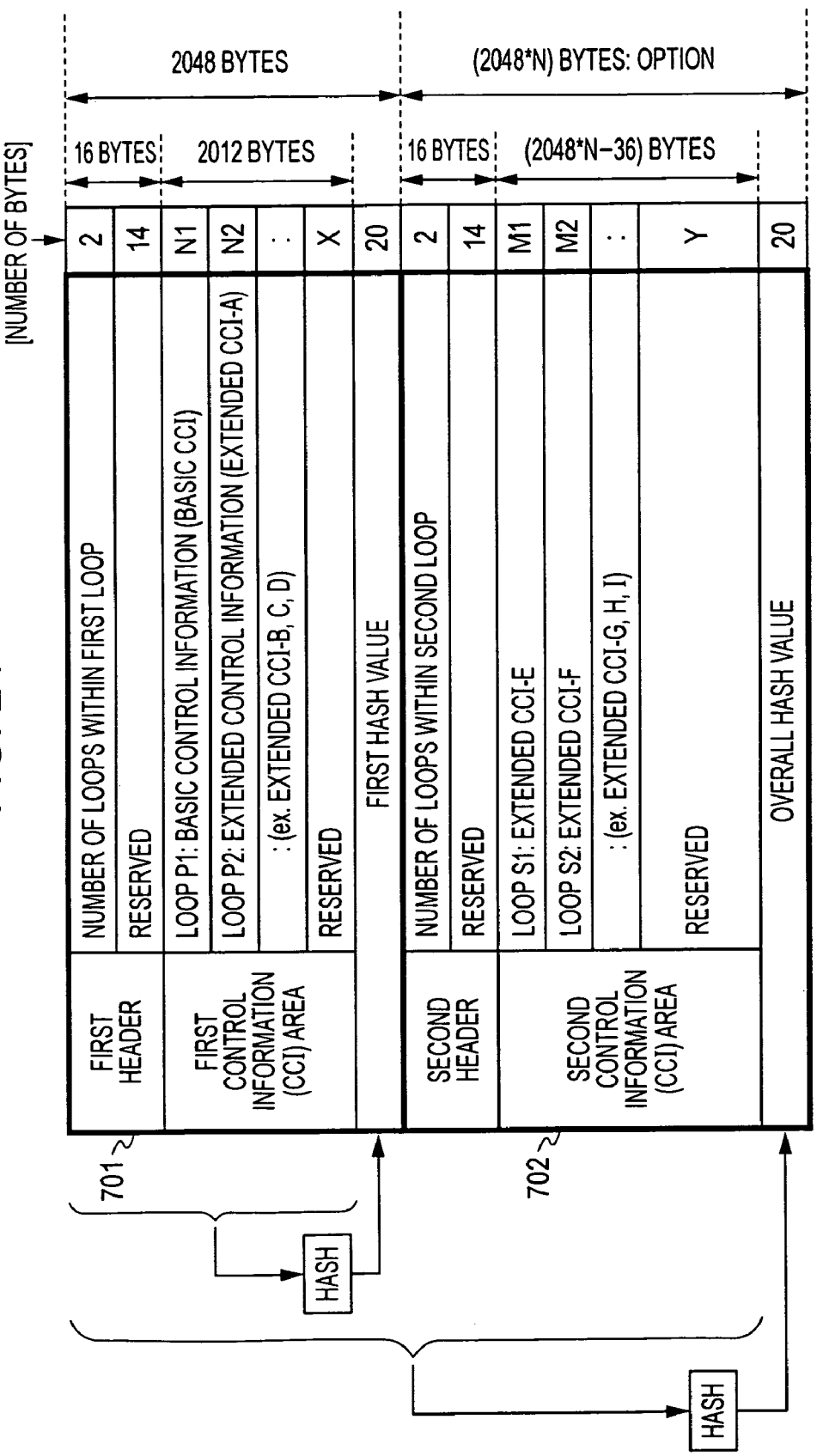
FIG. 24 illustrates an example of the recording of a content usage control information file for one content management unit (CPS unit) and an example of the setting of a hash value as tamper-proof data.

9. First Example of Detailed Configuration of Content Usage Control Information A first example of the detailed configuration of content usage control information corresponding to a content management unit (CPS unit) is described below with reference to FIGS. 24 through 37. Reference is first made to FIG. 24 to describe an example of the recording of a content usage control information file and an example of the setting of a hash value as tamper-proof data.

As discussed with reference to FIGS. 17 through 23, content usage control information as playback/copy control information for each CPS unit is stored by being distributed to a plurality of 2048-byte user data areas forming block data.

In FIG. 24, there are shown a first block 701 serving as a 2048-byte user data area forming block data storing the content usage control information and a subsequent block 702. The subsequent block 702 includes at least one block, for example, N blocks, resulting in (2048×N)-byte data.

The first block 701 is 2048-byte user data including a. a 16-byte first header, b. a 2012-byte first control information (CCI) area, and c. a 20-byte first hash value.

In the 16-byte first header, a reserved area and information concerning the number of loops of the content usage control information (playback/copy control information) included in the first control information (CCI) area are set. The first header is used as seed information for generating a block key corresponding to the first block 701.

As discussed with reference to FIGS. 17 through 23, since the seed information is not subjected to encryption processing, it is stored in the information recording medium as plaintext. Accordingly, if content usage control information as the playback/copy control information for each CPS unit is contained in the first 16 byte data, which is used as seed information, of the user data area of the block data, a leakage of the control information may occur. Thus, the first 16-byte area is set as the header information area storing lower-security data.

In the first control information (CCI) area (2012 bytes) subsequent to the first header, content usage control information (playback/copy control information) corresponding to the CPS unit is stored.

In the example shown in FIG. 24, as the content usage control information of the first block 701, two types of control information, i.e., basic control information (Basic CCI) and extended control information (Extended CCI), and more specifically, one item of basic control information (Basic CCI) and four items of extended control information (Extended CCI) A through D, are stored.

The basic control-information (Basic CCI) is data formed of basic, minimal content usage control information (playback/copy control information), and is read by almost all information processing apparatuses (basic playback devices) executing content playback processing according to a predetermined content playback processing program and instructs such apparatuses to perform processing according to the read control information. In contrast, the extended control information (Extended CCI) is data formed of extended content usage control information (playback/copy control information) applied to information processing apparatuses (extended playback devices) performing advanced content usage processing, for example, apparatuses having processing functions of network transferring, data streaming sending/receiving, etc.

It is now assumed that the basic playback device is an information processing apparatus performing content usage processing according to the basic control information (Basic CCI), and the extended playback device is an information processing apparatus performing content usage processing according to the extended control information (Extended CCI).

It is necessary that the basic control information (Basic CCI) be speedily extracted from the playback/copy control information storage file. In contrast, the extended control information (Extended CCI) is stored with small restrictions on, for example, the size, for future extensions. Specific examples of the basic control information (Basic CCI) and the extended control information (Extended CCI) are shown in FIGS. 25A and 25B, respectively.

The basic control information (Basic CCI) includes, as shown in FIG. 25A, the following control information:

information indicating whether copy is allowed: copy allowed/not allowed/only one generation allowed;

video output resolution restriction information: restricted/not restricted;

analog copy control information: allowed/not allowed (specify an analog-copy-proof technique);

information indicating whether data is encrypted: encrypted/not encrypted; and information indicating whether copyright is asserted: asserted/not asserted.

The extended control information (Extended CCI) includes, as show in FIG. 25B, the following information:

information indicating whether playback in a single information recording medium (disc) is possible: indicating whether content can be played back only by disc information;

playback method for content that cannot be played back in a single information recording medium (disc): indicate "connect to key distribution server" or "insert memory card with key therein";

designation of server: index value to server list;

copy-streaming compatibility information: compatibility information for playing back content in another device in the same network;

copy-streaming data conversion method: method used for converting content for another device;

copy restriction information, such as that whether copy on the same type of recording medium in the network is allowed;

copy restriction information, such as that whether copy on a portable unit is allowed;

information indicating whether streaming or remote playback is allowed;

control information concerning downloading processing; and information for obtaining operation control information from server.

Desired items of control information can be set for the extended control information (Extended CCI).

Referring back to FIG. 24, a description is given of the first block 701 serving as the 2048-byte user data area forming the block data storing content usage control information.

In the first block 701, the first hash value (20 bytes) generated based on the first header (16 bytes) and the first control information (CCI) area (2012 bytes) is stored. The first hash value is generated by applying a hash function, such as SHA-1, to the first header data and each data in the first control information (CCI) area, and is set as tamper-proof data for the first header data and the data in the first control information (CCI) area.

The size of the hash value varies depending on the hash function, and in the example of FIG. 24, the 160-bit (20-byte) hash value generated by using SHA-1 is used. However, a different hash function may be used to generate a different length of hash value. As the first hash value, the value obtained by applying the hash function to the area from the head of the file to the portion immediately before the area in which the hash value is recorded (2028 bytes from the head of the file if SHA-1 is used) is used.

To read the content usage control information and to use content according to the usage control information, the information processing apparatus calculates the hash value based on the first header data and the data in the first control information (CCI) area, and compares the calculated hash value with the hash value stored in the user data area of the block data. If the two hash values coincide with each other, the information processing apparatus determines that the content has not tampered with, and proceeds with the processing. If the two hash values are not the same, the information processing apparatus determines that the content has been tampered with, and discontinues playing back or using the content based on the content usage control information.

The subsequent block 702 is user data formed of N blocks having (2048×N)-bytes.

The user data of the subsequent block 702 has the following data:

a. second header: 16 bytes;
b. second control information (CCI) area: arbitrary bytes; and
c. overall hash value: 20 bytes.

The second header is the first 16-byte area of the user data of the second block subsequent to the first block 701, and stores a reserved area and information concerning the number of loops of the content usage control information (playback/copy control information) contained in the second control information (CCI) area. The data of the second header (16 bytes) is used as seed information for generating the block key corresponding to the first 2048 bytes of the second block.

The second control information (CCI) area is set as the area storing a plurality of content usage control information (playback/copy control information) without exceeding (2048×N−(16+20)) bytes, which are calculated by subtracting the header (16 bytes) and the overall hash value (20 bytes) from the data size (2048×N) of the subsequent block 702. In the example shown in FIG. 24, a total of five information blocks (extended control information (Extended CCI) E through I) are stored.

If the subsequent block 702 includes a plurality of blocks, the first 16 bytes of the user data of each block are used as a seed area storing information for generating the block key of each block. In this seed area, the data forming the content usage control information (playback/copy control information), information similar to the second header, or dummy data is stored.

As the overall hash value, the hash value (20 bytes) generated based on the overall data of the first block 701, the second header of the subsequent block 702, and the second control information (CCI) area of the second block 702 is stored. The overall hash value is data generated by applying a hash function, for example, SHA-1, to the overall data of the first block 701, the second header of the subsequent block 702, and the overall data of the second control information (CCI), and is set as tamper-proof data for the overall data of the first block 701, the second header of the subsequent block 702, and the overall data of the second control information (CCI).

The size of the hash value varies depending on the hash function, and in the example of FIG. 24, the 160-bit (20-byte) hash value generated by using SHA-1 is used. However, a different hash function may be used to generate a different length of hash value. As the overall hash value, the value obtained by applying the hash function to the area from the head of the file to the portion immediately before the area in which the hash value is recorded (a [file size−20]-byte area from the head of the file if SHA-1 is used) is used.

To read the content usage control information and to perform advanced content usage processing according to the extended usage control information, an information processing apparatus checks the integrity of the data based on, not the hash value of the first block, but the overall hash value.

More specifically, the information processing apparatus calculates the hash value based on the overall data of the first block 701, the second header of the subsequent block 702, and the second control information (CCI), and compares the calculated hash value with the overall hash value stored in the user data area of the subsequent block 702. If the two hash values coincide with each other, the information processing apparatus determines that the content has not been tampered with, and proceeds with the processing. If the two hash values are not the same, the information processing apparatus determines that the content has been tampered with, and discontinues playing back or using the content based on the content usage control information.

As discussed above, an information processing apparatus performing advanced content usage processing according to the extended control information calculates the hash value based on the data contained, not only in the first block, but also in the subsequent blocks, and compares the calculated hash value with the overall hash value. In contrast, an information processing apparatus performing content usage processing according to the basic control information rather than advanced content usage processing calculates the hash value based on the information set in the first block 701 and compares the calculated hash value with the first hash value set in the first block 701.

The storage configuration of the content usage control information and the setting of the hash values shown in FIG. 24 implements the following three advantages.

(1) Basic control information can be obtained and verified by generating a block key for the first 2048 bytes (first block), decrypting the encrypted data, and verifying the integrity of the data.

(2) By storing extended control information together with the basic control information if the size of the extended control information is small, basic control information and extended control information can be obtained and verified by generating a block key for the first 2048 bytes (first block), decrypting the encrypted data, and verifying the integrity of the data.

(3) By using a subsequent block, for example, the second block if the size of the extended control information is large, the content usage control information can be stored.

A sequence performed by an information processing apparatus for reading the content usage control information (playback/copy control information) having the data structure shown in FIG. 24 from the information recording medium and for performing processing according to the control information is described below with reference to FIGS. 26 and 27.

FIG. 26 is a flowchart illustrating a processing sequence performed by the information processing apparatus for reading only the basic control information and performing content usage processing according to the basic control information.

In step S101, the information processing apparatus selects the content usage control information file (CCI file) corresponding to a specific CPS unit, and reads the first 2048 bytes of the data area of the first block of the file.

In step S102, the information processing apparatus obtains the first 16 bytes of the read 2048-byte data of the first block, and encrypts the first 16 bytes with the CPS unit key as a seed, for example, by performing AES encryption, to generate the block key Kb. The CPS unit key applied here is the CPS unit key for the content management unit (CPS unit) associated with the content usage control information file (CCI file).

In step S103, the information processing apparatus decrypts the encrypted data area based on, for example, the AES encryption algorithms, other than the first 16 bytes of the 2048-byte first block read in step S101 by using the generated block key Kb.

In step S104, the hash value X is calculated based on the 2028-byte data other than the 20-byte hash data obtained as a result of the decryption processing, by using hash-value calculation algorithms, for example, SHA-1.

Then, it is determined in step S105 whether the calculated hash value coincides with the hash value (20-byte data from the 2028-th byte to the 2047-th byte of the block data) stored in the block data.

If it is determined in step S105 that the two hash values are not the same, the process proceeds to step S107. In step S107, the information processing apparatus determines that the data has been tampered with and discontinues performing content usage processing on the basis of the content usage control information.

If it is determined in step S105 that the two hash values are the same, the process proceeds to step S106. In step S106, the information processing apparatus determines that the data has not been tampered with, and obtains the content usage control information to perform content usage processing according to the content usage control information. In this case, the information processing apparatus performs the content usage processing based on the basic control information.

A description is now given, with reference to the flowchart of FIG. 27, of a sequence performed by the information processing apparatus for reading both the basic control information and extended control information and for performing content usage processing according to the basic control information and extended control information.

In step S201, the information processing apparatus selects the content usage control information file (CCI file) corresponding to a specific CPS unit, and reads the first 2048 bytes of the data area of the first block of the file.

In step S202, the information processing apparatus obtains the first 16 bytes of the read 2048-byte data of the first block, and encrypts the 16 bytes with the CPS unit key as a seed, by using, for example, AES encryption, to generate the block key Kb. The CPS unit key used here is the CPS unit key for the content management unit (CPS unit) associated with the content usage control information file (CCI file).

Then, in step S203, the information processing apparatus decrypts the encrypted data area based on, for example, the AES encryption algorithms, other than the first 16 bytes of the 2048-byte first block read in step S201 by using the generated block key Kb.

It is then determined in step S204 whether all block data forming the content usage control information file (CCI file) have been read and decrypted. If the reading and decrypting of the CCI file has not been completed, the process returns to step S201, and processing similar to the above-described processing is performed on the subsequent block. That is, the acquisition of a seed, the generation of the block key Kb, and the decryption processing is repeated.

If it is determined in step S204 that the reading and decryption of all block data forming the CCI file has been completed, the process proceeds to step S205.

In step S205, the hash value X is calculated based on all the block data forming the content usage control information file (CCI file) obtained as a result of the decryption processing other than the 20-byte overall hash data according to the hash value calculation algorithms, for example, SHA-1.

It is then determined in step S206 whether the calculated hash value coincides with the overall hash value read from the content usage control information file (CCI file).

If the two hash values are not the same, the process proceeds to step S208. In step S208, the information processing apparatus determines that the data has been tampered with, and discontinues the content usage processing on the basis of the content usage control information.

If it is determined in step S206 that the two hash values coincide with each other, the process proceeds to step S207. In step S207, the information processing apparatus determines that the data has not been tampered with and obtains the content usage control information to perform the content usage processing according to the obtained content usage control information, i.e., the basic control information and the extended control information.

Figure 28:
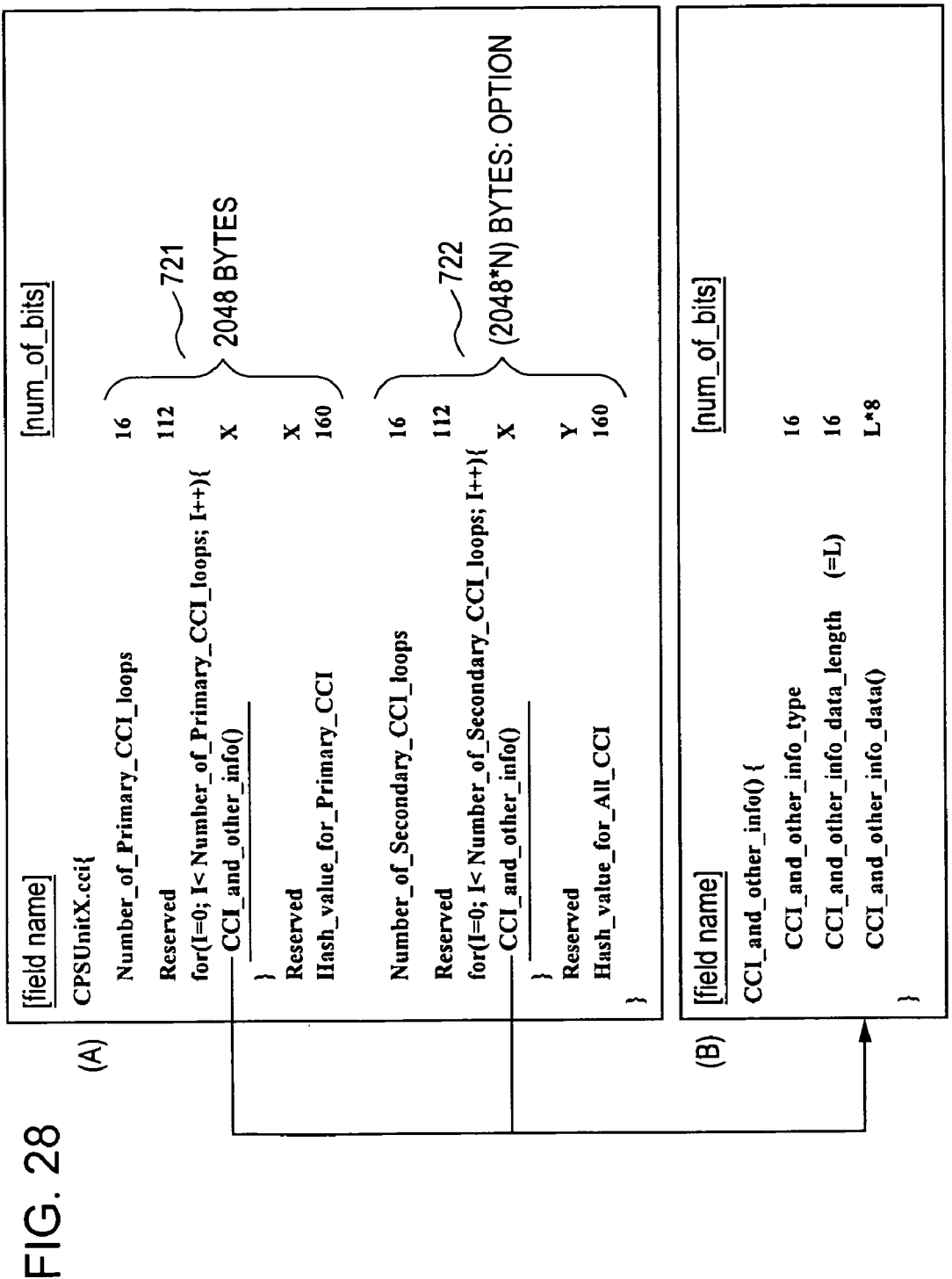
FIG. 28 illustrates the syntax of an example of the storage configuration of the content usage control information shown in FIG. 24.

FIG. 28 illustrates the syntax of an example of the storage configuration of the content usage control information shown in FIG. 24. The overall configuration of the content usage control information is shown in (A) of FIG. 28, and the detailed configuration of the playback/copy control information storage block [CCI_and_other_info] is shown in (B) of FIG. 28.

The content usage control information includes, as shown in (A) of FIG. 28, 2048-byte first block area data 721 and (2048×N)-byte (N is an integer) subsequent block area data 722.

The first block area data 721 includes, as header information, 16-bit information [Number_of_Primary_CCI_loops] indicating the number of information blocks (loops) forming the content usage control information (playback/copy control information) set in the first block area, and a 112-bit reserved area. Those two types of data form the 16-byte header data.

The first control information (CCI information) area information shown in (A) of FIG. 28 includes, as shown in (B) of FIG. 28, 16-bit data type information [CCI_and_other_info_type] of the content usage control information (playback/copy control information), 16-bit data length information [CCI_and_other_info_data_length] of the content usage control information (playback/copy control information), and CCI_and_other_info_data_length×8-bit data value information [CCI_and_other_info_data] of the content usage control information (playback/copy control information).

The first control information (CCI information) area information also includes, as shown in (A) of FIG. 28, an X-bit reserved area and a 160-bit hash value [Hash_value_for_Primary_CCI] calculated based on the first block data.

The data structure of the subsequent block area data 722 is similar to that of the first block area data 721, and is formed of a header including information indicting the number of loops and a reserved area, content usage control information (playback/copy control information) including the data type, the data length, and the data value, a reserved area, and the 160-bit overall hash value [Hash_value_for_All_CCI].

The overall hash value [Hash_value_for_All_CCI] is the hash value generated based on the overall data of the first block area data 721 and the data of the subsequent block area data 722 other than the overall hash value.

FIGS. 29A and 29B are a specific example of the syntax of the playback/copy control information storage block (CCI_and_other_info( )) shown in (B) of FIG. 28 for the basic CCI information.

In the data type information [CCI_and_other_info_type] of the content usage control information (playback/copy control information), ID information ($0001_{16}$) indicating that the information is basic CCI information is set. It should be noted that ($xxxx_{16}$) indicates bit information in hexadecimal notation.

In the data length information [CCI_and_other_info_data_length] of the content usage control information (playback/copy control information), data indicating the length of the basic CCI information ($0011_{16}$) is set.

The data value information [CCI_and_other_info_data] of the content usage control information (playback/copy control information) stores, as shown in FIG. 29B:

EPN: information indicating whether the data is encrypted (encrypted/not encrypted);

CCI: whether copy is allowed (copy allowed/not allowed/only one generation allowed);

Image_Contraint_Token: video output resolution restriction information (output restricted/not restricted); and APS: analog copy control information (allowed/not allowed (specify an-analog-copy proof technique)).

FIGS. 30A and 30B illustrate a specific example of the playback/copy control information storage block (CCI_and_other_info( )) in which information (extended_format_flag) for prohibiting a basic playback device from playing back content in the corresponding CPS unit is included in the playback/copy control information (basic CCI information) used by the basic playback device.

Unlike the data structure shown in FIG. 29A, the playback/copy control information (CCI information) shown in FIG. 30A includes an extended format flag [extended_format_flag] 731. The extended format flag is set to be 0 or 1. If the extended format flag is 0, the basic playback device can obtain and play back the content by decrypting it with the unit key associated with the CPS unit. If the extended format flag is 1, the basic playback device is prohibited from playing back the content included in the corresponding CPS unit.

This extended format flag can be used in the following situation. If, for example, a storage disc storing encrypted content without a content decryption key on the disc is manufactured and sold, and if an information processing apparatus is instructed to obtain the content decryption key to play back content via a network, the extended format flag can be set to be 1, thereby allowing the user to recognize that it is necessary to connect to a network to obtain the CPS unit key for decrypting the content.

If the extended format flag is 1, a basic playback device that is difficult to connect to a network cannot use the content. Only extended playback devices that can connect to a network can obtain the unit key or unit key generating information via a network to decrypt and use the content.

In this manner, a basic playback device that is difficult to connect to a network can refer to this flag to inform the user that the content cannot be played back while preventing decryption processing with an incorrect key.

An extended playback device having an extended function, such as a network connecting function, can analyze extended CCI information recorded for extended playback devices to obtain a key via a network and play back content.

If the basic CCI information itself shown in FIG. 30A is recorded on a recording medium by being encrypted with the unit key Ku, either of the basic playback device or the extended playback device can decrypt the CCI file by using the unit key Ku generated from the information recorded on the information recording medium (disc), and controls the playback operation by checking the extended format flag recorded in the basic CCI portion. More specifically, the basic playback device informs the user by displaying a message that the content cannot be playback, and the extended playback device executes processing, such as obtaining information required for decrypting the content via a network.

FIG. 31 illustrates a file structure storing playback/copy control information (CCI information) in which an extended format flag [extended_format_flag] 736, which is information for prohibiting a basic playback device from playing back content included in the corresponding CPS unit, is contained in the header of first block area data 735.

As in the extended format flag 731 shown in FIG. 30A, if the extended format flag 736 is 1, it indicates that a network connection is necessary for obtaining the CPS unit key for decrypting the content.

The first 16 bytes of 2048-byte the first block area data 735 shown in FIG. 31 are not encrypted, and the basic playback device can refer to the value of the extended format flag 736 without decrypting the CCI file.

FIG. 32A illustrates an example of the data structure in which, in playback/copy control information (CCI information) that can be referred to by an information processing apparatus, such as a basic playback device, CPS-unit ID data 741 for specifying the CPS unit corresponding to the CCI information is contained. More specifically, the CPS-unit ID data 741, such as studio ID, package ID, and CPS unit ID, for the content, is recorded on the playback/copy control information.

To play back the content stored in the CPS unit, the information processing apparatus obtains the CPS-unit ID data 741, such as the studio ID, package ID, and CPS unit ID, associated with the CCI information and included in the playback/copy control information, and executes processing according to the obtained information. Those IDs are effective as information for uniquely associating the CCI file with the content (CPS unit) when the content on a recording medium is copied on an external recording medium via a home network and is played back or when a remote playback operation is performed via a home network.

To play back the content, the information processing apparatus specifies the CPS unit (content) based on the IDs recorded in the CCI file to obtain the CPS unit from the information recording medium or another device connected via a network.

The CPS-unit ID data 741, such as the studio ID, package ID, and CPS unit ID, is managed, for example, as follows. The studio ID and the package ID are managed by a management center (KIC) that performs content management, and a unique combination of the studio ID and the package ID is provided for each package during an authoring process of generating a CCI file. The CPS unit ID is determined during the authoring process. By storing those IDs in a tamper-proof area based on the hash value, the correct association between the content and the CCI file can be identified even if the content and the CCI file are handled outside the ROM disc, such a home network.

Figure 33:
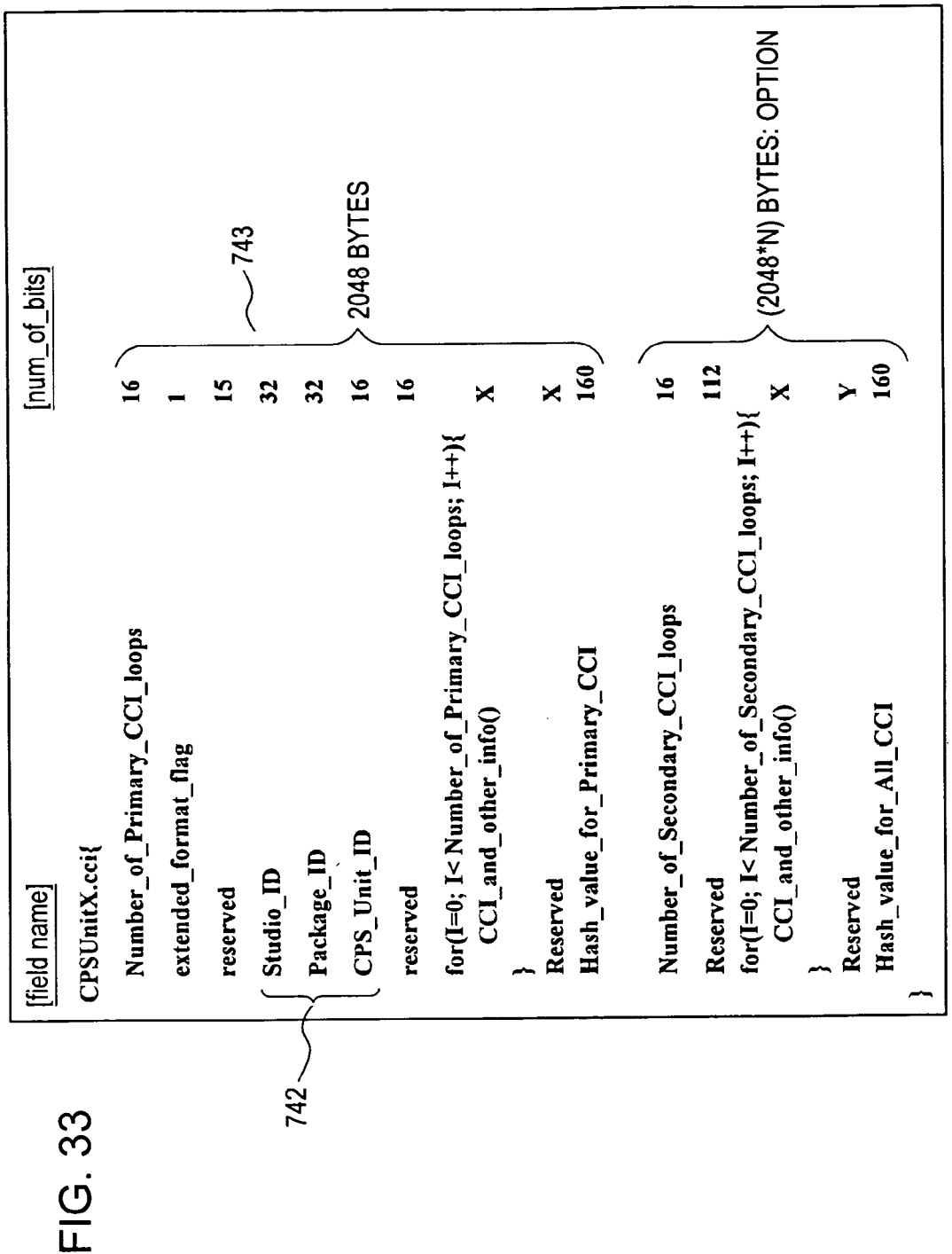
FIG. 33 illustrates a file structure storing playback/copy control information (CCI information) in which CPS-unit ID data for specifying a CPS unit corresponding to CCI information is contained in the header of the first area.
Figure 34A:
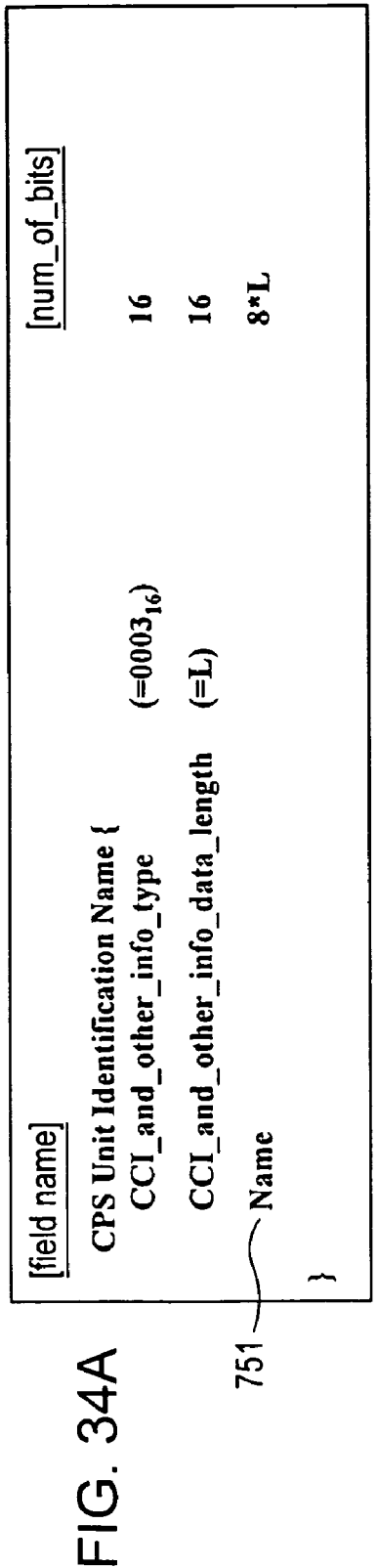
FIGS. 34A and 34B illustrate an example of the data structure in which CPS-Unit attribute name information as a character string representing the attributes of a CPS unit corresponding to CCI information is contained in playback/copy control information (CCI information)
Figure 34B:
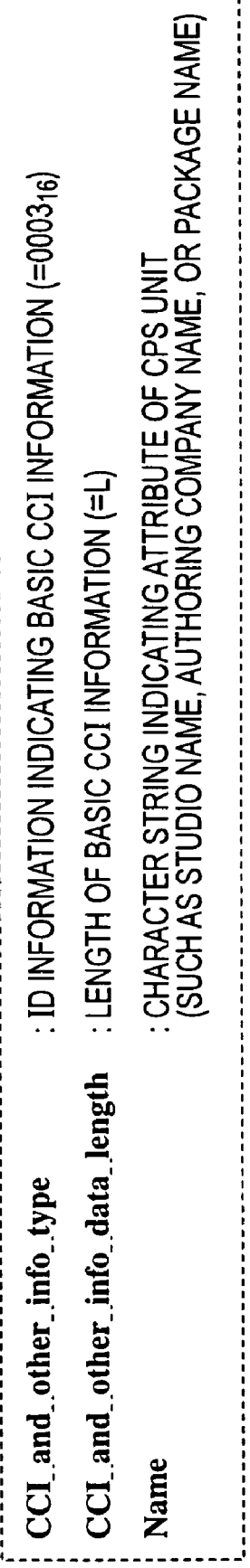

FIG. 33 illustrates a file structure storing playback/copy control information (CCI information) in which CPS-unit ID data 742 (such as studio ID, package ID, and CPS unit ID) for specifying the CPS unit corresponding to the CCI information is contained in the header of the first area.

The definition of the CPS-unit ID data 742 is similar to that of the CPS-unit ID data 741 shown in FIG. 32A.

The first 16 bytes of 2048-byte first block area data 743 shown in FIG. 33 are not encrypted, and the basic playback device can check the CPS-unit ID data 742 without decrypting the CCI file.

FIG. 34 illustrates an example of the data structure in which, in the playback/copy control information (CCI information) that can be referred to by an information processing apparatus, such as a basic playback device, CPS-unit attribute name information 751 as a character string representing the attributes of the CPS unit corresponding to the CCI information is contained. The CPS-unit attribute name information 751 includes character string data based on the studio name, the authoring company name, and the package name related to the content included in the CPS unit associated with the CCI information. With this configuration, the attributes of the content (CPS unit) corresponding to the CCI file can be easily identified based on the data of the CCI file.

Figure 35:
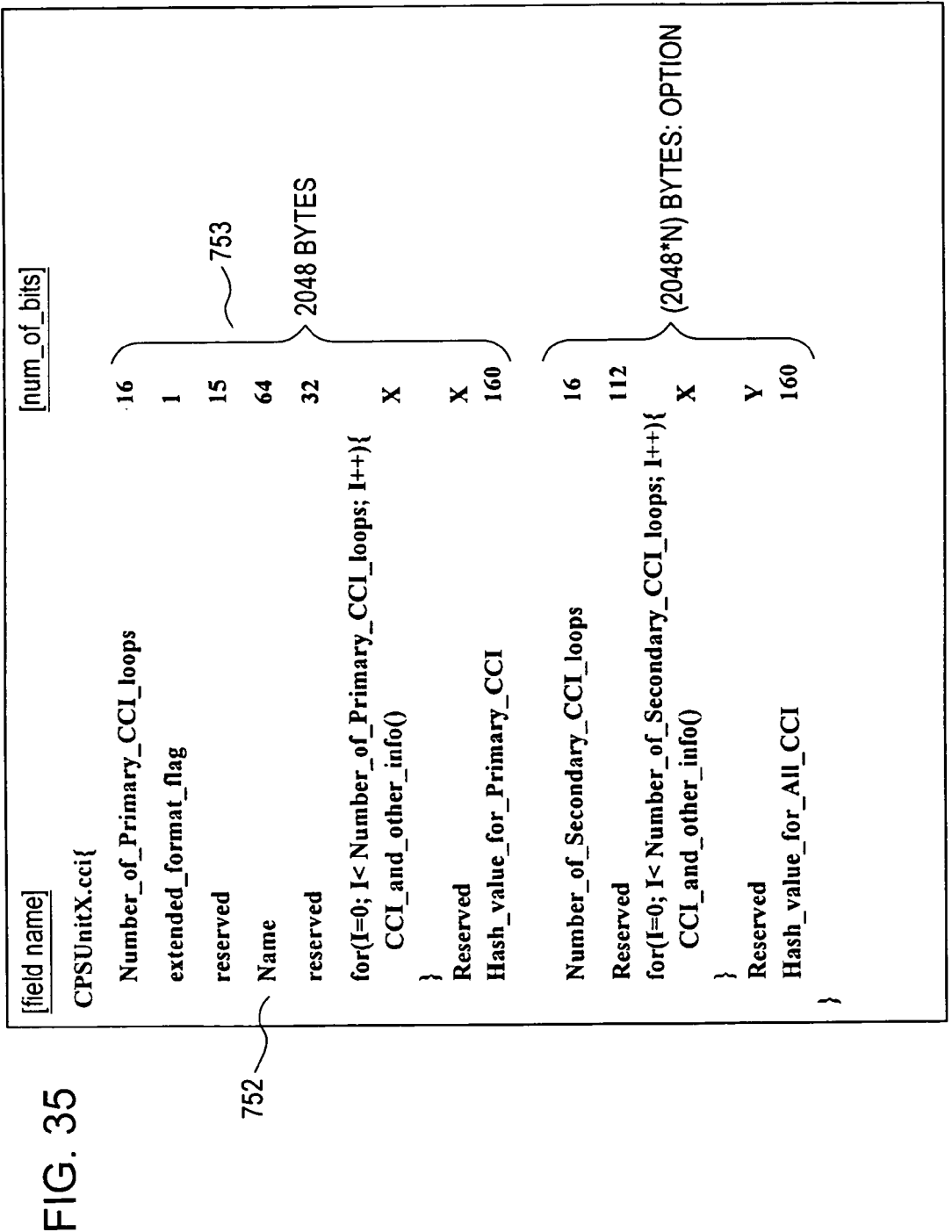
FIG. 35 illustrates a file structure storing playback/copy control information (CCI information) in which CPS-unit attribute name information as a character string representing the attributes of a CPS unit corresponding to CCI information is contained in the header of the first area.

FIG. 35 illustrates a file structure storing playback/copy control information (CCI information) in which CPS-unit attribute name information 752 as a character string representing the attributes of the CPS unit corresponding to the CCI information is contained in the header of the first area.

The CPS-unit attribute name information 752 is such as a studio name, an authoring company name, and a package name, similar to the CPS-unit attribute name information 751 shown in FIG. 34. With this configuration, the attributes of the CCI file can be easily identified, and also, the frequent occurrence of fixed patterns in the seed used for encrypting the first 2 KB of the CCI file can be prevented, thereby making it more difficult to decrypt the data.

More specifically, as stated with reference to FIG. 23, content usage control information (CCI information) corresponding to one CPS unit is stored by being distributed to user data areas of a plurality of block data. The first 16 bytes of the user data of each block are extracted as a seed, and are encrypted with the unit key corresponding to the unit, thereby generating a block key. Then, the data area of the user data other than the seed is encrypted with the generated block key.

If the seed used for generating the block key is fixed data, it is relatively easy to decrypt the data. However, by including variable information, such as a studio name, an authoring company name, and a package name, in the seed used for encrypting the first 2 KB at the head of the CCI file, the seed information becomes variable, thereby making it more difficult to decrypt the data.

Figure 36:
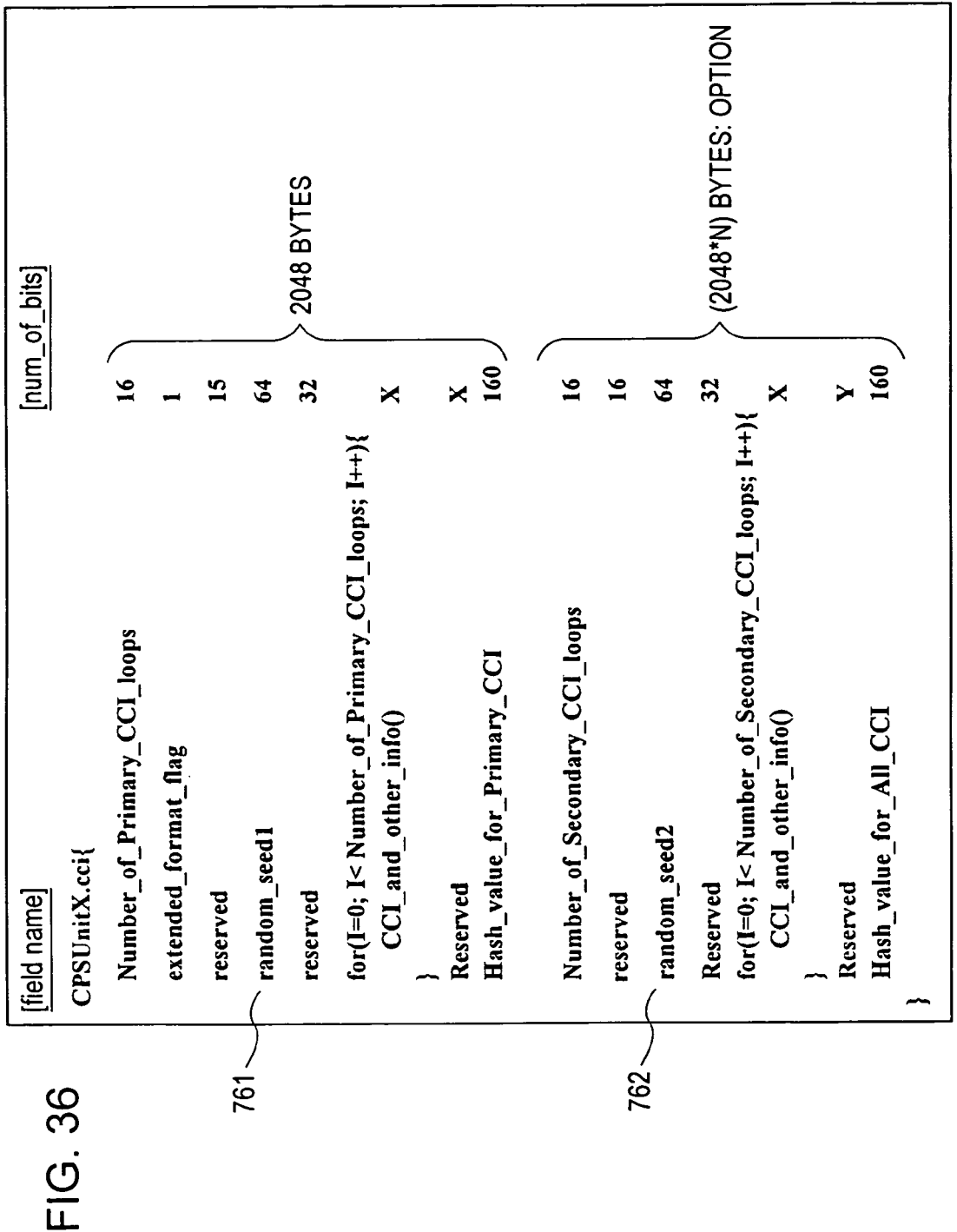
FIG. 36 illustrates a file structure storing playback/copy control information (CCI information) in which random-number data having a specific length is contained in the headers of first and second areas.

FIG. 36 illustrates a file structure storing playback/copy control information (CCI information) in which specific-length random-number data 761 and 762 are recorded in the headers of first and second areas, thereby increasing the randomness of the byte string stored in each 16-byte header.

With this configuration, as in the CPS-unit attribute name information 752, such as a studio name, an authoring company name, and a package name, discussed with reference to FIG. 35, the frequent occurrence of fixed patterns in the seed used for encrypting the first 2 KB of the CCI file can be prevented, thereby making it more difficult to decrypt the data.

A description is given below, with reference to the flowchart of FIG. 37, of a sequence performed by an information processing apparatus for obtaining various items of information contained in the content usage control information (playback/copy control information), such as the extended format flag, CPS-unit ID data, and CPS-unit attribute name.

Figure 37:
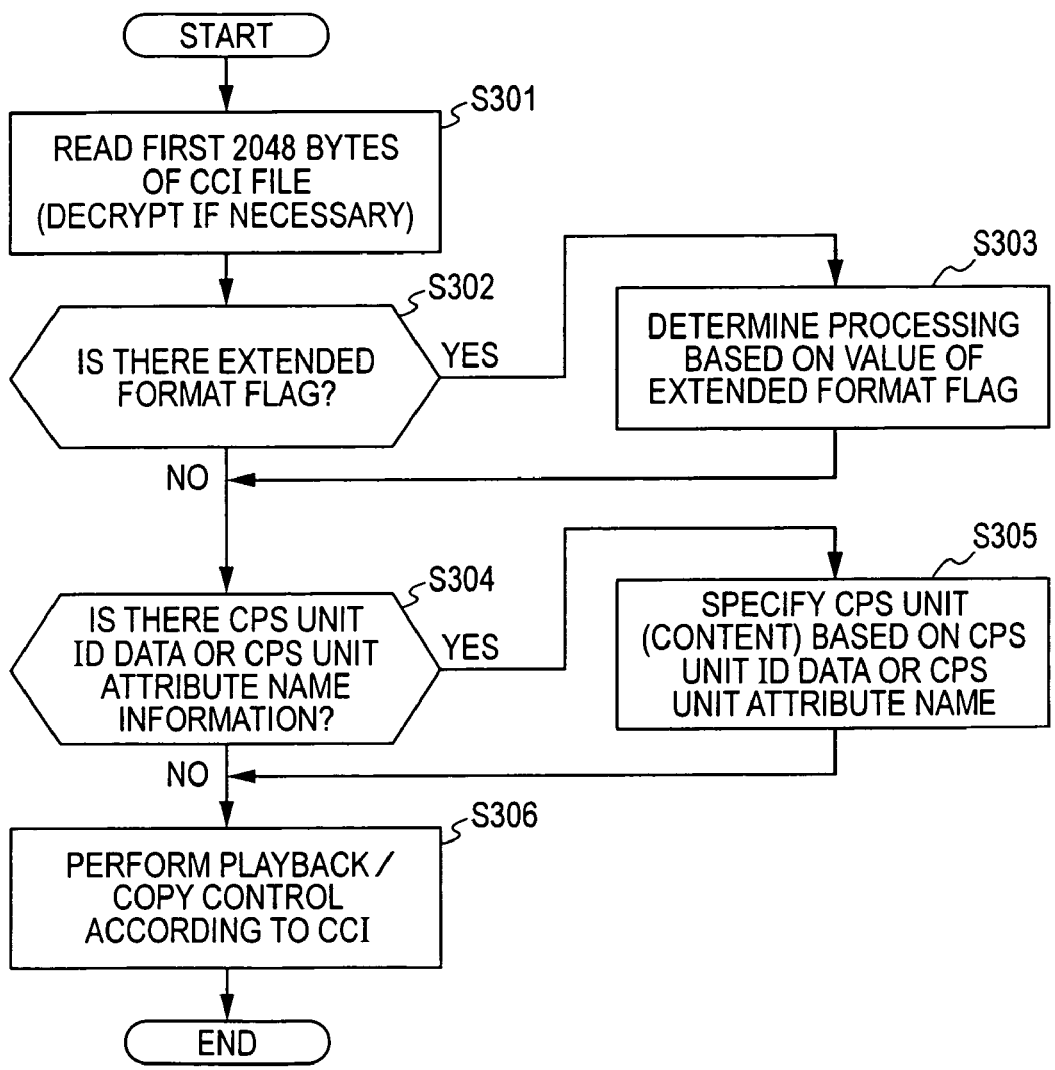
FIG. 37 is a flowchart illustrating a sequence performed by an information processing apparatus for executing processing according to various types of information read from playback/copy control information (CCI information)

The processing sequence shown in FIG. 37 is performed by a data processor, which reads content usage control information from an information recording medium, of the information processing apparatus. The data processor of the information processing apparatus has a content usage control information analyzer, serving as one data processing function, for analyzing the content usage control information. The processing sequence shown in FIG. 37 is mainly executed by the content usage control information analyzer of the information processing apparatus.

In step S301, the information processing apparatus selects the content usage control information file (CCI file) corresponding to a specific CPS unit, and reads the first 2048 bytes of the data area of the first block of the file. If the read information is encrypted, the decryption processing discussed with reference to FIGS. 26 and 27 is performed. In this decryption processing, a seed is obtained to generate a key, and as the seed, CPS-unit attribute name data or random-number data may be used, as stated above.

It is then determined in step S302 whether the content usage control information file (CCI file) contains an extended format flag. If so, the process proceeds to step S303 to check the value of the extended format flag. If the extended format flag [extended_format_flag] is 1, it is determined that a network connection is necessary for obtaining the CPS unit key for decrypting the content. If the information processing apparatus is a basic playback device that is difficult to connect to a network, a message indicating that the content cannot be played back is shown on the display. If the information processing apparatus is an extended playback device that can connect to a network, it connects to the network to obtain the required information.

It is then determined in step S304 whether CPS-unit ID data or CPS-unit attribute name data is contained in the content usage control information file (CCI file). If such data is contained, the process proceeds to step S305 in which the information processing apparatus specifies the content (CPS unit) corresponding to the CCI file based on the data. If the content has already been specified, step S305 is not necessary.

Then, in step S306, the content usage processing according to the playback/copy control information is performed depending on the type of information processing apparatus. That is, if the information processing apparatus is a basic playback device, content usage processing according to the basic control information is performed. If the information processing apparatus is an extended playback device, content usage processing according to the extended control information is performed.

Figure 38:
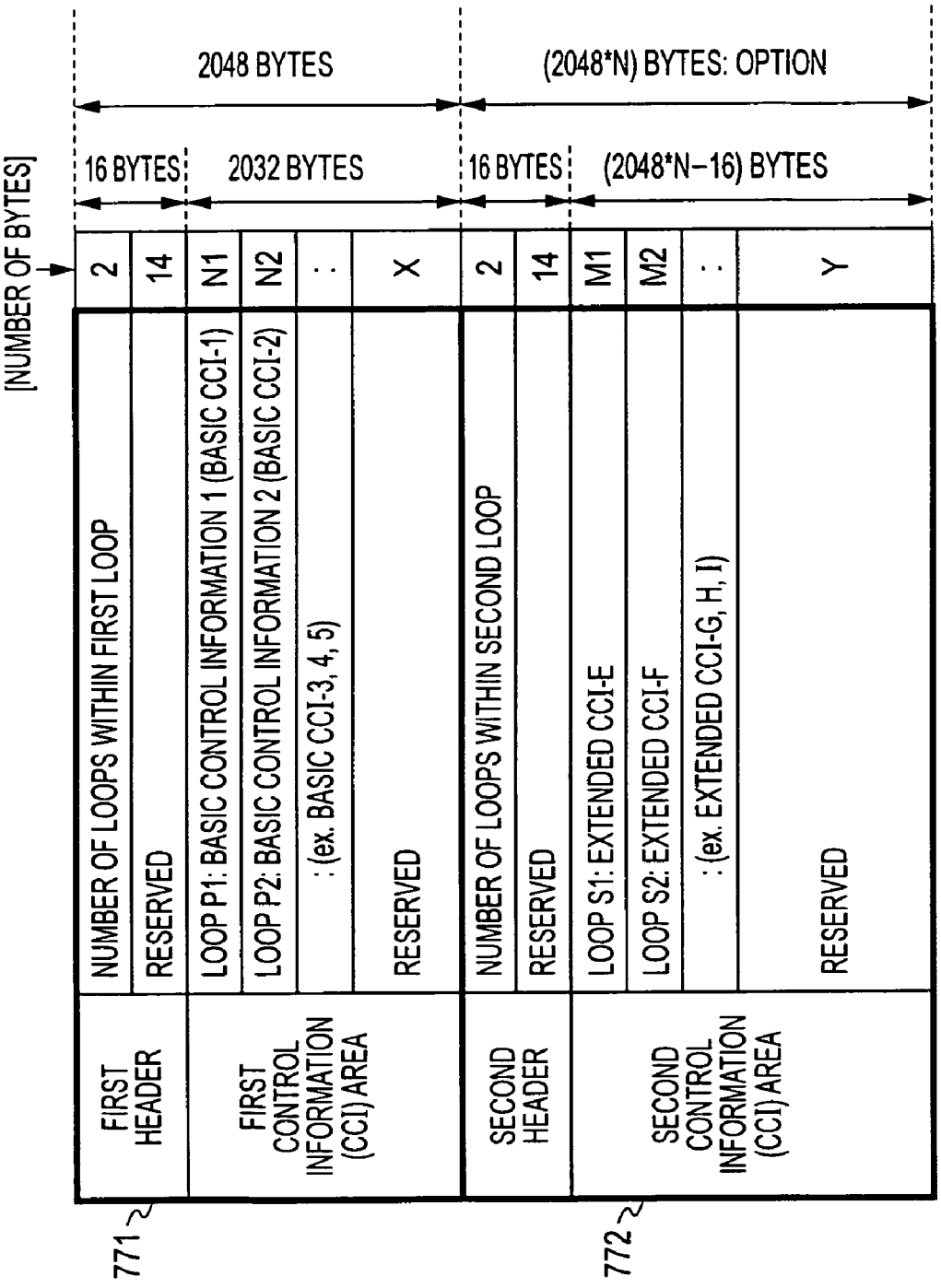
FIG. 38 illustrates an example of the recording of a content usage control information file corresponding to a content management unit (CPS unit) without a hash value.

10. Second Example of Detailed Configuration of Content Usage Control Information A description is now given, with reference to FIGS. 38 through 45, of a second example of the detailed configuration of content usage control information associated with a content management unit (CPS unit). Reference is first made to FIG. 38 to describe an example of the recording of the content usage control information file. The content usage control information file in the second example is different from that in the first example in that a hash value as tamper-proof data is not used.

In the first example, the integrity of content usage control information is verified based on a hash value. In the second example, the hash value is not set for the content usage control information. In the second example, the content usage control information is used for generating a key (unit key), and if the content usage control information is tampered with, it may be difficult to generate the correct unit key. As a result, unauthorized usage of content can be prevented. The configuration and processing of this mechanism is described later.

Copy/playback control information (CCI) corresponding to each CPS unit is stored by being distributed to a plurality of 2048-byte user data areas forming block data. In FIG. 38, there are shown a first block 771 as a 2048-byte user data area, which forms block data, storing copy/playback control information (CCI) and a subsequent block 772. The subsequent block 772 includes at least one block, for example, N blocks, resulting in (2048×N)-byte data.

The first block 771 is 2048-byte user data including a. a 16-byte first header and b. a 2032-byte first control information (CCI) area.

In the first header, information concerning the number of loops of the copy/playback control information (CCI) contained in the first control information (CCI) area and an additional control information area are set.

The additional control information area set in the first header is an area used for adding/extending copy/playback control information, for example, a flag for prohibiting a playback device that can cope with only basic control information from performing a playback operation by using only extended control information.

In the 2032-byte first control information (CCI) area subsequent to the header, the copy/playback control information (CCI) associated with each CPS unit is stored.

In the example shown in FIG. 38, as the copy/playback control information (CCI) of the first block 771, two types of control information, i.e., basic control information 1 (Basic CCI-1) and basic control information 2 (Basic CCI-2), and more specifically, five items of basic control information (Basic-CCI-1 through CCI-5) are stored.

The basic control information (Basic CCI) is data formed of basic, minimal copy/playback control information (CCI), and is read by almost all information processing apparatuses (basic playback devices) executing content playback processing according to a predetermined content playback processing program and instructs such apparatuses to perform processing according to the read control information. In contrast, the extended control information (Extended CCI) is data formed of extended content usage control information (playback/copy control information) applied to information-processing apparatuses (extended playback devices) performing advanced content usage processing, for example, apparatuses having processing functions of network transferring, data streaming sending/receiving, etc.

It is necessary that the basic control information (Basic CCI) be speedily extracted from the playback/copy control information storage file. In contrast, the extended control information (Extended CCI) is stored with small restrictions on, for example, the size, for future extensions. Specific examples of the basic control information (Basic CCI) and the extended control information (Extended CCI) have been discussed with reference to FIGS. 25A and 25B, respectively.

The subsequent block 772 shown in FIG. 38 is user data formed of N blocks having (2048×N) bytes.

The user data of the subsequent block 702 has the following data:
 a. second header: 16 bytes; and
 b. second control information (CCI) area: arbitrary bytes.

The second header is the first 16-byte area of the user data of the second block subsequent to the first block 771, and stores a reserved area and information concerning the number of loops of the copy/playback control information (CCI) contained in the second control information (CCI) area. The data of the second header (16 bytes) is used as seed information for generating the block key corresponding to the first 2048 bytes of the second block.

The second control information (CCI) area is set as the area storing a plurality of playback/copy control information (CCI) without exceeding (2048×N−16) bytes, which are calculated by subtracting the header (16 bytes) from the data size (2048×N) of the subsequent block 772. In the example shown in FIG. 38, a total of four information blocks (extended control information (Extended CCI-1 through CCI-4)) are stored.

With this configuration, the playback device using only the basic control information reads the first 2048 bytes of the CCI file to extract the basic control information, thereby controlling the playback/copy operation.

Figure 39:
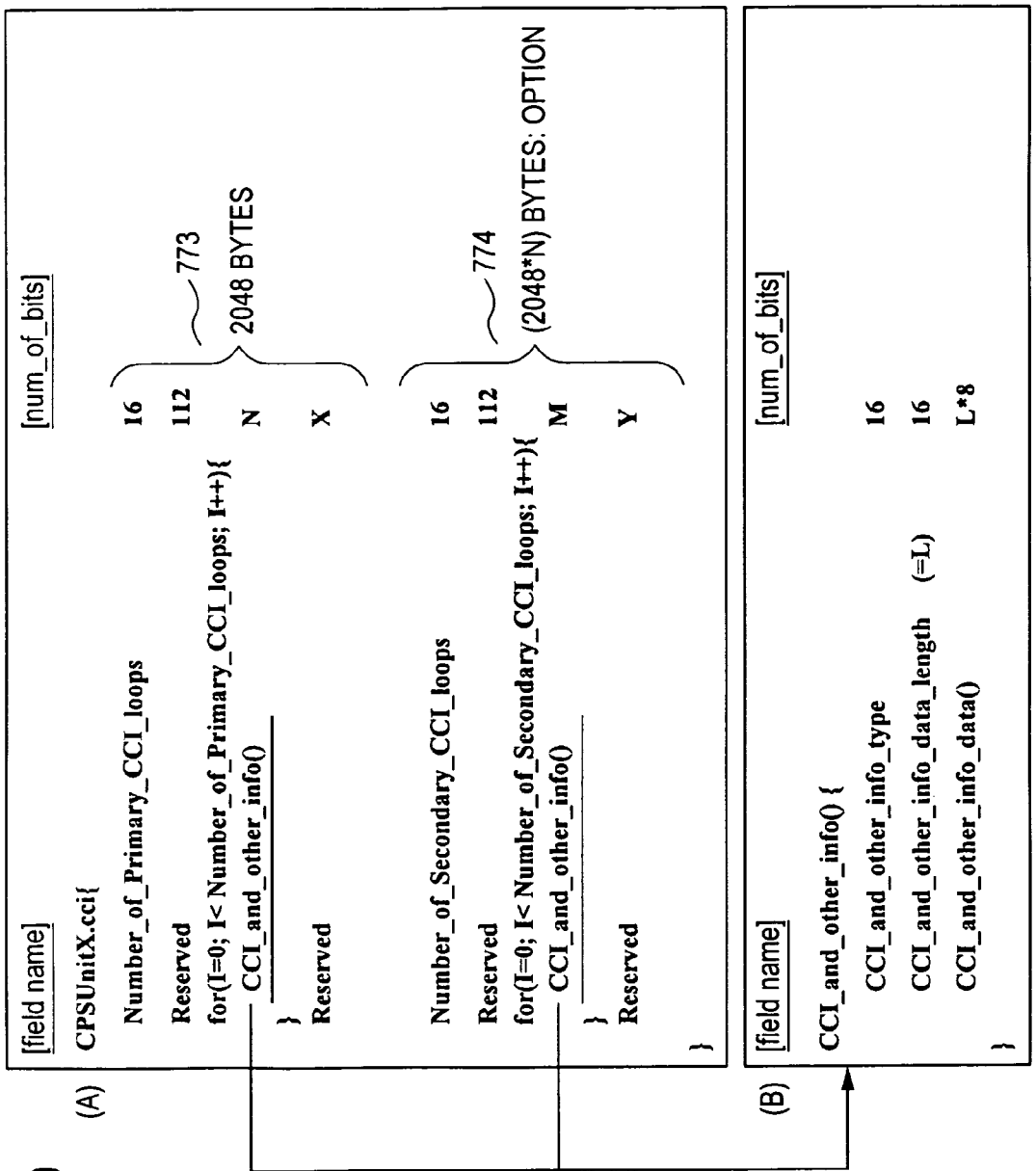
FIG. 39 illustrates the syntax of a storage example of the content usage control information shown in FIG. 38.

FIG. 39 illustrates the syntax of a storage example of the content usage control information shown in FIG. 38. (A) of FIG. 39 illustrates the overall configuration of the content usage control information, and (B) of FIG. 39 illustrates a detailed configuration of the playback/copy control storage block [CCI_and_other_info] shown in (A) of FIG. 39.

The content usage control information includes, as shown in (A) of FIG. 39, 2048-byte first block area data 773 and (2048×N)-byte (N is an integer) subsequent block area data 774 after the first block area data 773.

The first block area data 773 includes, as header information, 16-bit information [Number_of_Primary_CCI_loops] indicating the number of information blocks (loops) forming the content usage control information (playback/copy control information) indicated in the first block area, and also includes a 112-bit reserved area. The above-described two types of data form 16-byte data of the header.

The first control information (CCI information) includes, as shown in (B) of FIG. 39, 16-bit data type information [CCI_and_other_info_type] of the content usage control information (playback/copy control information), 16-bit data length information [CCI_and_other_info_data_length] of the content usage control information (playback/copy control information), and CCI_and_other_info_data_length×8-bit data value information [CCI_and_other_info_data] of the content usage control information (playback/copy control information).

The first control information (CCI information) also includes, as shown in (A) of FIG. 39, an X-bit reserved area. In this example, the hash value is not set, unlike the first example.

The data structure of the subsequent block area data 774 is similar to that of the first block area, and is formed of a header including information indicting the number of loops and a reserved area, content usage control information (playback/copy control information) including the data type, the data length, and the data value, and a reserved area. In this example, the hash value is not set, unlike the first example.

Content usage control information (playback/copy control information) in the second example is different from that of the first example in that the hash value is not used. The other features of the configuration of the second example are similar to those of the first example. Specific examples of the content usage control information (playback/copy control information) are similar to those of the first example discussed with reference to FIGS. 25A and 25B. Specific examples of the playback/copy control information storage block (CCI_and_other_info( )) shown in Fig. (B) of FIG. 39 are similar to those discussed with reference to FIGS. 29A and 29B.

The playback/copy control information storage block includes:
 data type information [CCI_and_other_info_type];
 data length information [CCI_and_other_info_data_length];
 data value information [CCI_and_other_info_data];
 EPN: information indicating whether the data is encrypted (encrypted/not encrypted);
 CCI: whether copy is allowed (copy allowed/not allowed/only one generation allowed);
 Image_Contraint_Token: video output resolution restriction information (output restricted/not restricted); and
 APS: analog copy control information (allowed/not allowed (specify an analog-copy-proof technique)).

The setting of the extended flag discussed with reference to FIGS. 30A, 30B, and 31, i.e., playback/copy control information, is similarly performed in the first example. More specifically, in the playback/copy control information (basic CCI information) used by the basic playback device, information (extended_format_flag) for prohibiting a basic playback device from playing back content in the corresponding CPS unit is contained.

Additionally, CPS-unit ID data for specifying the CPS unit corresponding to the CCI information discussed with reference to FIGS. 32A, 32B, and 33, i.e., CPS-unit ID data corresponding to the content, such as the studio ID, package ID, and CPS unit ID, can be recorded in the playback/copy control information, as in the first example. Also, the CPS-unit attribute name information as a character string representing the attributes of the CPS unit associated with the CCI information discussed with reference to FIGS. 34A, 34B, and 35 can be included, as in the first example.

As stated above, in the second example, the content usage control information is used as information for generating the key (unit key). Accordingly, if the content usage control information is tampered with, it may be impossible to generate the correct unit key. As a result, unauthorized usage of content can be prevented. The configuration and processing of this mechanism is described below with reference to FIG. 40.

A decryption/playback process of content, i.e., a CPS unit, stored in an information processing medium 780 is first discussed with reference to FIG. 40. In the content decryption process, an encryption processor 775 of the information processing apparatus (playback device) reads a device key 776 stored in a memory. The device key 776 is a private key stored in an information processing apparatus licensed to use the content.

In step S401, the encryption processor 775 decrypts an encryption key block (EKB) 781 stored in the information recording medium 780 by using the device key 776 to obtain the media key Km.

The EKB 781 is a key information block that allows only a licensed information processing apparatus (user device) with a device key (Km) to obtain the media key Km required for decrypting the content. That is, the EKB 781 makes it possible to obtain the media key only when the user device has a valid license according to an information distribution method based on a so-called hierarchical tree structure, and prevents revoked user devices from obtaining the key (media key). By changing the key information to be stored in the EKB, the management center can generate an EKB that prevents specific user devices from decrypting content by using device keys stored in the specific user devices, that is, that prevents the specific user devices from obtaining the media key required for decrypting the content. Accordingly, it is possible to revoke unauthorized devices at a specified time and to provide encrypted content only to devices having a valid license.

Figure 44:
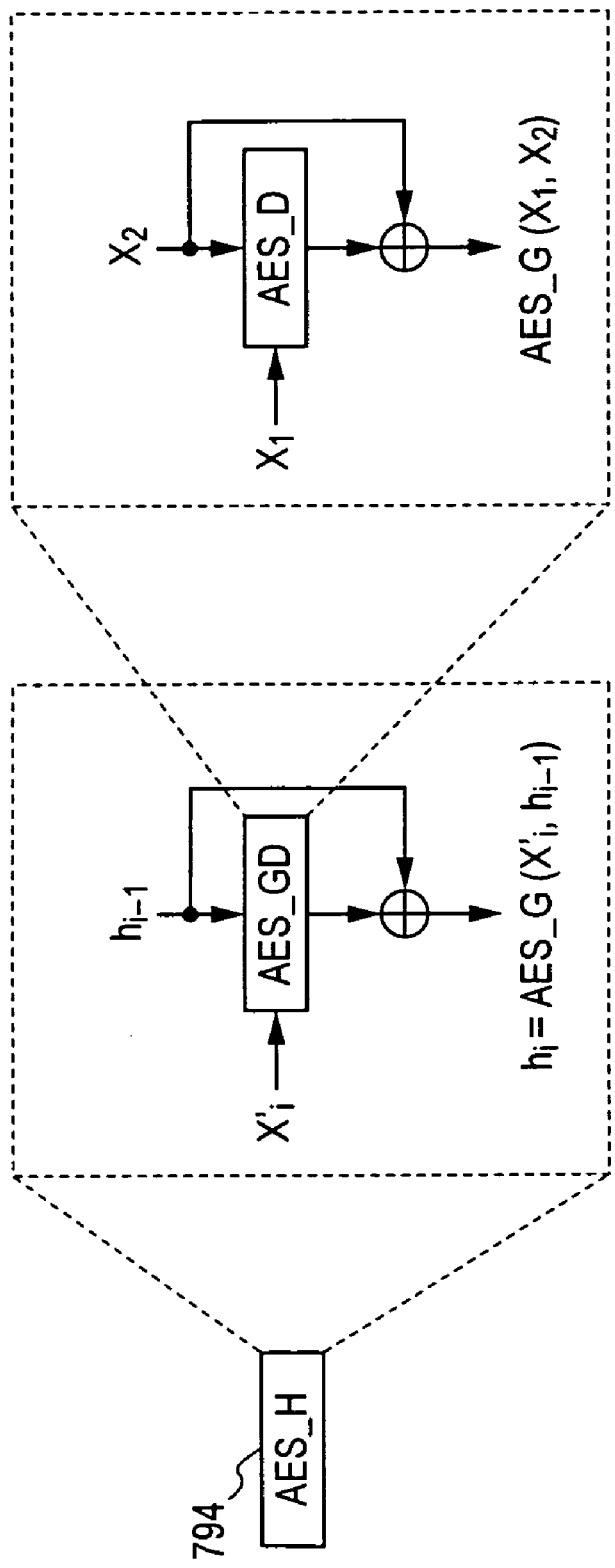
FIG. 44 illustrates a hash function used for playing back content in an information processing apparatus.

Then, in step S402, the encryption processor 775 performs encryption processing (AES_H) based on the media key Km obtained in the EKB processing of step S401 and a physical index 782 read from the information recording medium 780, thereby generating a unit key generation key Ke (embedded key). This key generation processing is executed according to, for example, the AES encryption algorithms. In FIG. 40, AES_D is data decryption processing using AES encryption processing, and AES_H is an AES hash function. The specific configuration is, as shown in FIG. 44, a combination of a key generation processor (AES_GD) accompanying data decryption using the AES encryption and an exclusive OR. The AES_GD is formed of, as shown in FIG. 44, an AES decryption processor and an exclusive OR. The content hash to be recorded on the information recording medium can be generated by a hash processor 794 shown in FIG. 44. Inputs x and h in FIG. 44 may be used as one or the other of the two inputs into the AES-H. For example, in (b) of FIG. 41, X may be Ke and h may be CCI, or X may be CCI and h may be Ke. In an actual recording/playback device, the assignment of the input values is selected before executing processing. The AES_GE is key generation processing accompanying data encryption using the AES encryption processing.

Then, in step S403, the encryption processor 775 performs encryption processing (AES_H) based on the unit key generation key Ke (embedded key) and copy/playback control information 783 read from the information recording medium 780, thereby generating a control key Kc. In step S404, the encryption processor 775 performs encryption processing (AES_H) based on the control key Kc and a content hash 784 read from the information recording medium 780, thereby generating a content hash key Kh. The content hash 784 is a hash value based on the content or the encrypted content data stored in the information recording medium 780.

As discussed above, the content usage control information (content/playback control information (CCI)) 783 and the content hash 784 are used for generating keys for decrypting the content (CPS unit). Accordingly, if the content usage control information or the content is tampered with, it is almost impossible to generate correct keys, thereby making it difficult to decrypt or play back the content. Thus, unauthorized usage of content can be prevented without the need to add a hash to the content usage control information or to verify the integrity of the content.

Subsequently, in step S405, the encryption processor 775 performs decryption processing (AES_D) by applying the content hash key Kh to an encryption unit key Enc(Ku) 785 read from the information recording medium 780, thereby generating a unit key Ku. In this example, the unit key Ku stored in the information recording medium 780 is stored as encrypted data with the content hash key Kh generated by a process similar to steps S401 through S404 of FIG. 40.

The encryption unit key Enc(Ku) 785 recorded on the information recording medium 780 is defined for each CPS unit, and also, the unit key Ku generated in step S405 is also defined for each CPS unit. The CPS unit key Ku(i) to be generated is set for the CPS unit associated with content to be played back, i.e., the CPS unit (i) selected among the CPS units 1 through n stored in the information processing medium 780.

For decrypting the encrypted content, in step S406, a block seed is extracted from encrypted content 786 read from the information recording medium 780, and encrypted data to be decrypted and non-encrypted data (plaintext), which is not required to be decrypted, are selected.

The block seed is encryption key generation information set for a block, which serves as the encryption processing unit. Content data as a CPS unit is encrypted with a block key Kb, which is different among block units having a predetermined data length. For decrypting the content, in step S407, a block key Kb, which is a decryption processing key for each block, is generated (AES_GE) by encryption processing based on the block seed and the CPS unit key Ku set for each block data, and in step S408 the content is decrypted by the generated block key Kb.

The block key Kb is a key used for decrypting encrypted content in an encryption processing unit having a specific size. As the size of the encryption processing unit, 6144-byte user data or 2048-byte user data can be considered.

In step S409, the non-encrypted data, such as a block seed, included in the encrypted content is combined with the data decrypted in step S408, resulting in decrypted content (CPS unit) 777.

Figure 41:
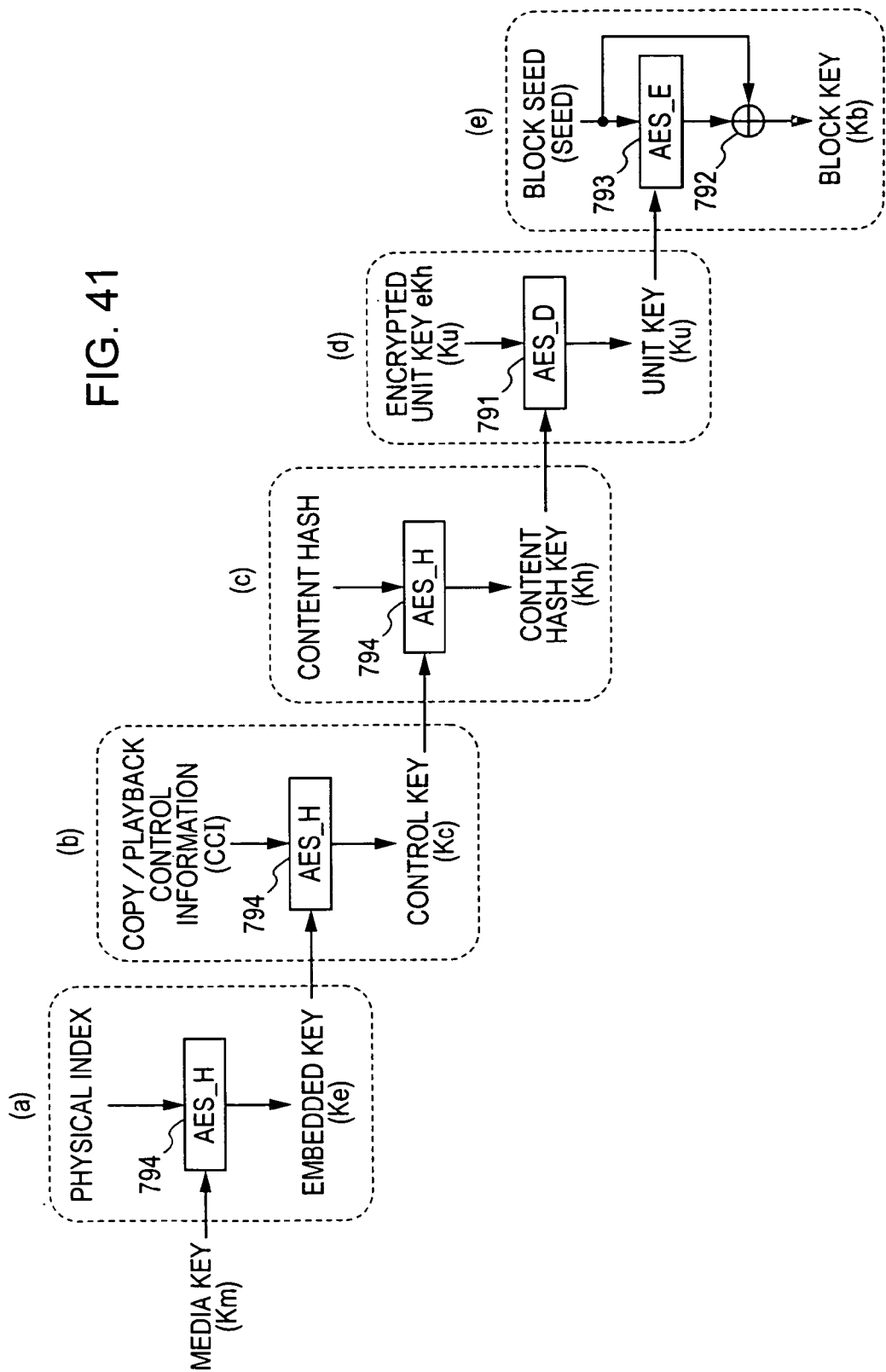
FIG. 41 illustrates details of encryption processing by generating keys to be used for playing back content in an information processing apparatus.

Specific examples of encryption processing executed in steps S402 through S405 and S407 are discussed below with reference to FIG. 41. In FIG. 41, an AES decryption processor (AES_D) 791 is a decryption processor having, for example, a 128-bit key length based on the AES or Electric Code Book (ECB) mode. An AES encryption processor (AES_E) 793 is an encryption processor having, for example, a 128-bit key length based on the AES or ECB mode. An exclusive OR 792 is a processor performing an exclusive OR (XOR) between two bit strings having the same length.

Figure 40:
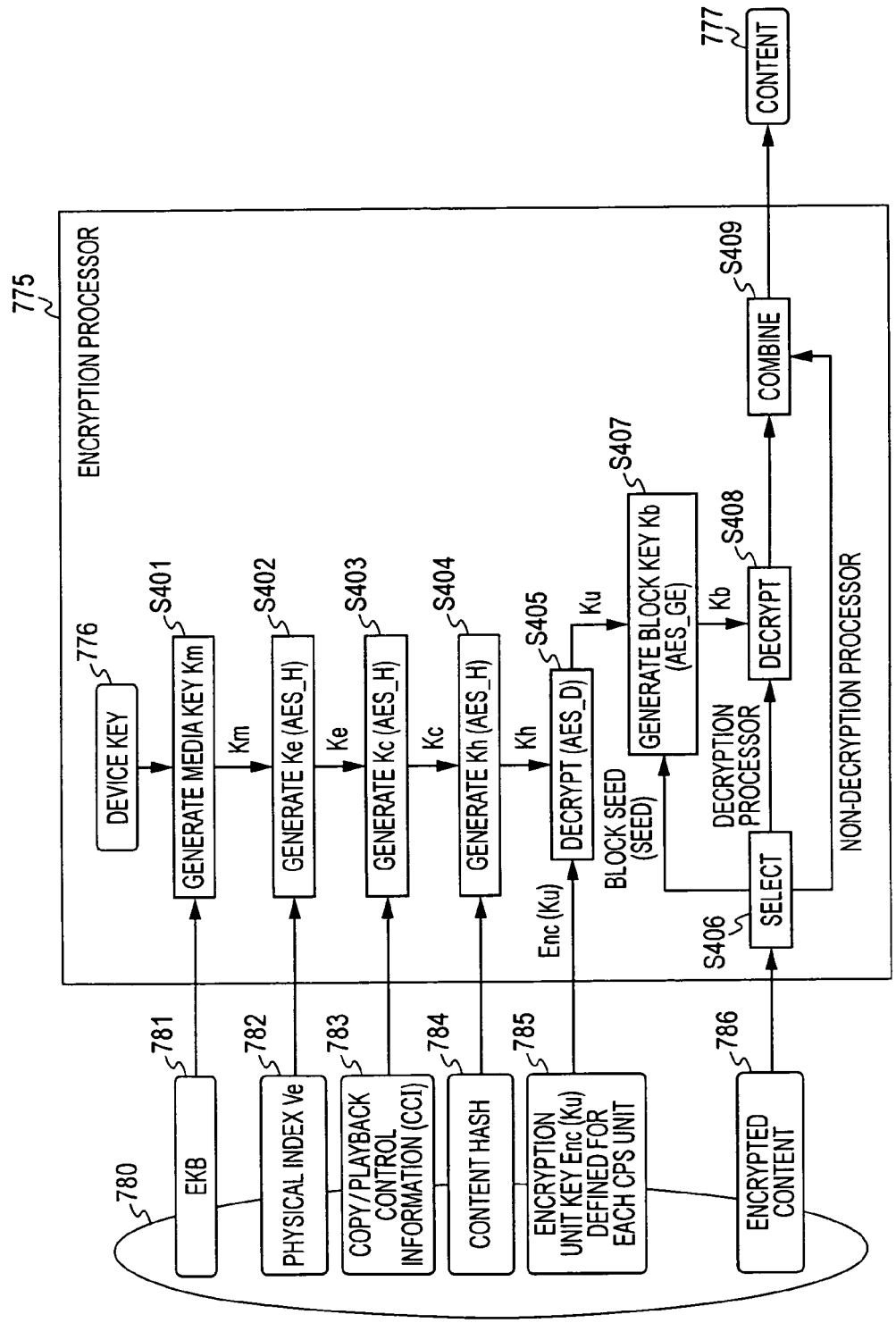
FIG. 40 illustrates a detailed example of content playback processing performed by an information processing apparatus.

In the generation processing (AES_H) for the unit key generation key Ke in step S402 of FIG. 40, specifically, as shown in (a) of FIG. 41, the physical index stored in the information recording medium 780 and the media key Km obtained from the EKB are input into AES_H 794, and the resulting value is output as the unit key generation key Ke.

Also, in the generation of the control key Kc in step S403 and the generation of the content hash key Kh in step S404, AES-H processing is performed as indicated by (b) and (c) of FIG. 41. The unit key Ku is generated (step S405), as shown in (d) of FIG. 41, as a result of decryption processing in the AES decryption processor 791 by applying the content hash key Kh to the encryption unit key eKh (Ku) obtained from the information recording medium 780. The generation of the block key Kb in step S407 of FIG. 40 is performed by the calculation by the AES decryption processor 791 and the exclusive OR 792, as indicated by (e) of FIG. 41.

In this embodiment, the AES encryption algorithm is used to generate 128-bit key data. However, a different algorithm may be used to generate key data having a different length.

Figure 42:
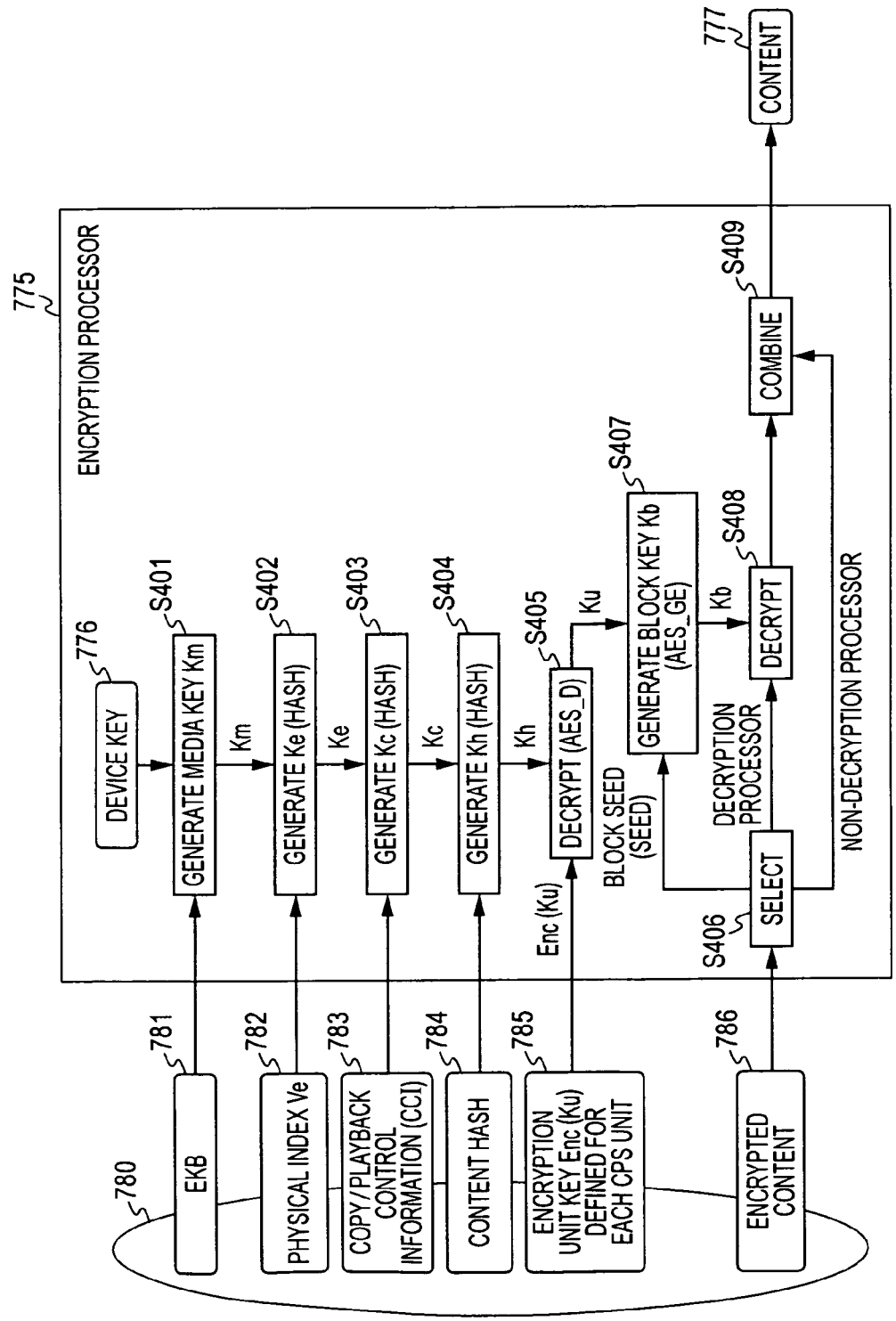
FIG. 42 illustrates another detailed example of content playback processing performed by an information processing apparatus.

Another example of the content playback processing is described below with reference to FIG. 42. In the example shown in FIG. 42, the generation of the unit key generation key Ke (embedded key) in step S402, the generation of the control key Kc in step S403, and the generation of the content hash key Kh in step S404 are performed by using hash functions rather than the AES encryption processing.

Figure 43:
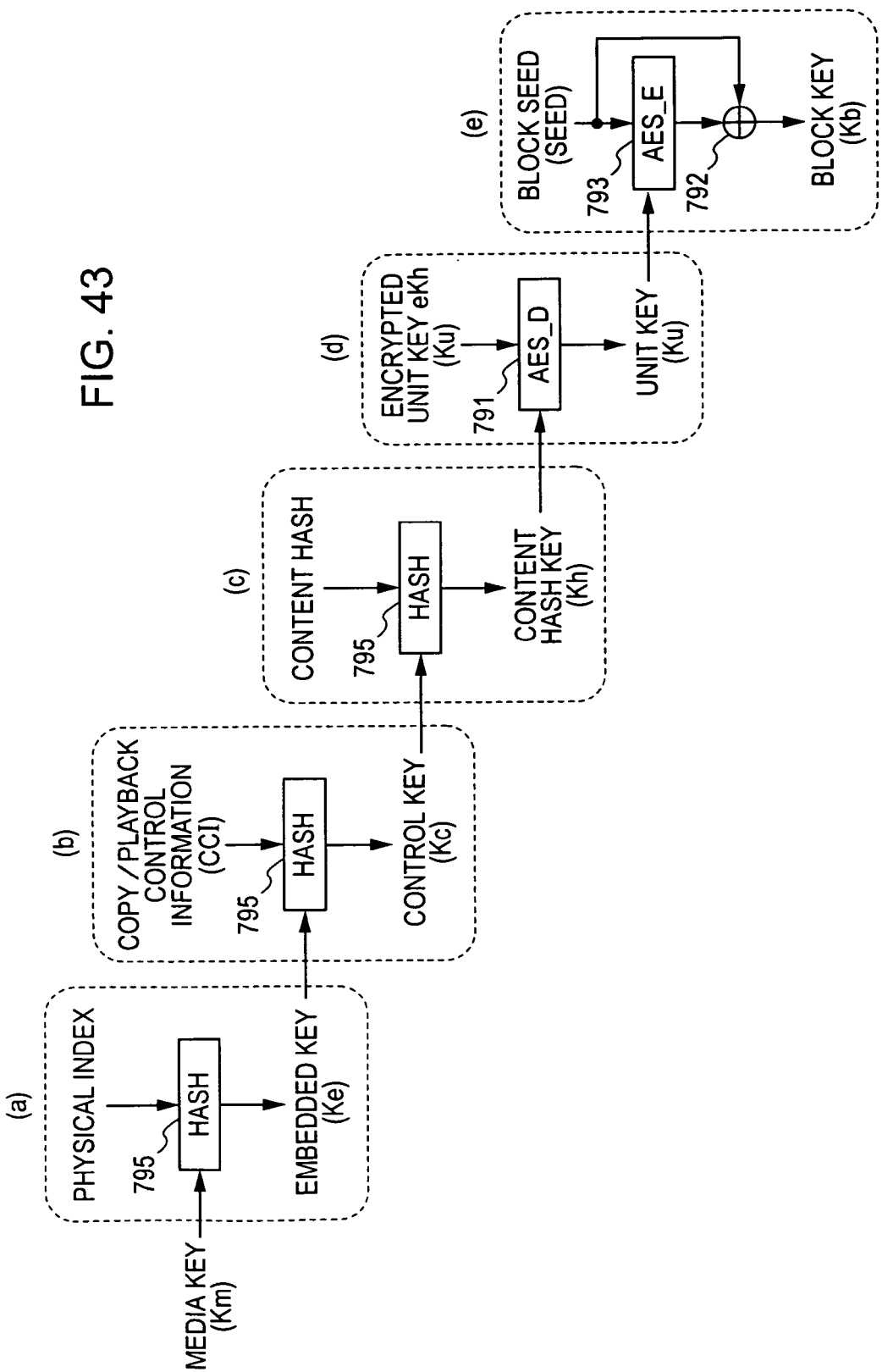
FIG. 43 illustrates details of encryption processing by generating keys to be used for playing back content in an information processing apparatus.

The specific configuration of this processing is discussed below with reference to FIG. 43. In FIG. 43, a hash processor 795 executes processing by using a hash function to calculate a hash value based on two input data. The output of the hash processor 795 is fixed-length data, which is almost unique.

The hash processor 795 is a hash function, for example, SHA-1. To input two values into a hash function and to obtain one output, one output can be obtained by sequentially inputting two input values into a hash function. For example, in (a) of FIG. 43, the media key (Km) and the physical index can be sequentially input into the hash function to obtain the embedded key (Ke). In this case, as the order of inputting the two values, either of the data can be input first. The definition and use of the hash function also applies to (b) and (c) of FIG. 43.

The processing for generating various key data in the content playback processing is continued. The generation of the unit key generation key Ke (embedded key) in step S402, the generation of the control key Kc in step S403, and the generation of the content hash key Kh in step S404 are performed by using the hash processor 795, by indicated by (a), (b), and (c), respectively, of FIG. 43, and the resulting data can be used as the key data. The generation of the unit key in step S405 and the generation of the block key in step S407 are similarly performed, as indicated by (d) and (e) of FIG. 43, to the processing discussed with reference to FIGS. 40 and 41.

In this embodiment, the AES encryption algorithm is used to generate 128-bit key data. However, a different algorithm may be used to generate key data having a different length.

As described above, content usage control information (copy/playback control information (CCI)) is used as information for generating a unit key for decrypting content (CPS unit). Accordingly, a correct unit key can be generated only by authenticated, not-tampered content usage control information, and the content can be decrypted with the unit key. As a result, efficient content usage processing can be implemented without the need for an information processing apparatus to verify the integrity of the content usage control information when playing back content.

A sequence for processing content usage control information when playing back content by an information processing apparatus is discussed below with reference to the flowchart of FIG. 45.

Figure 45:
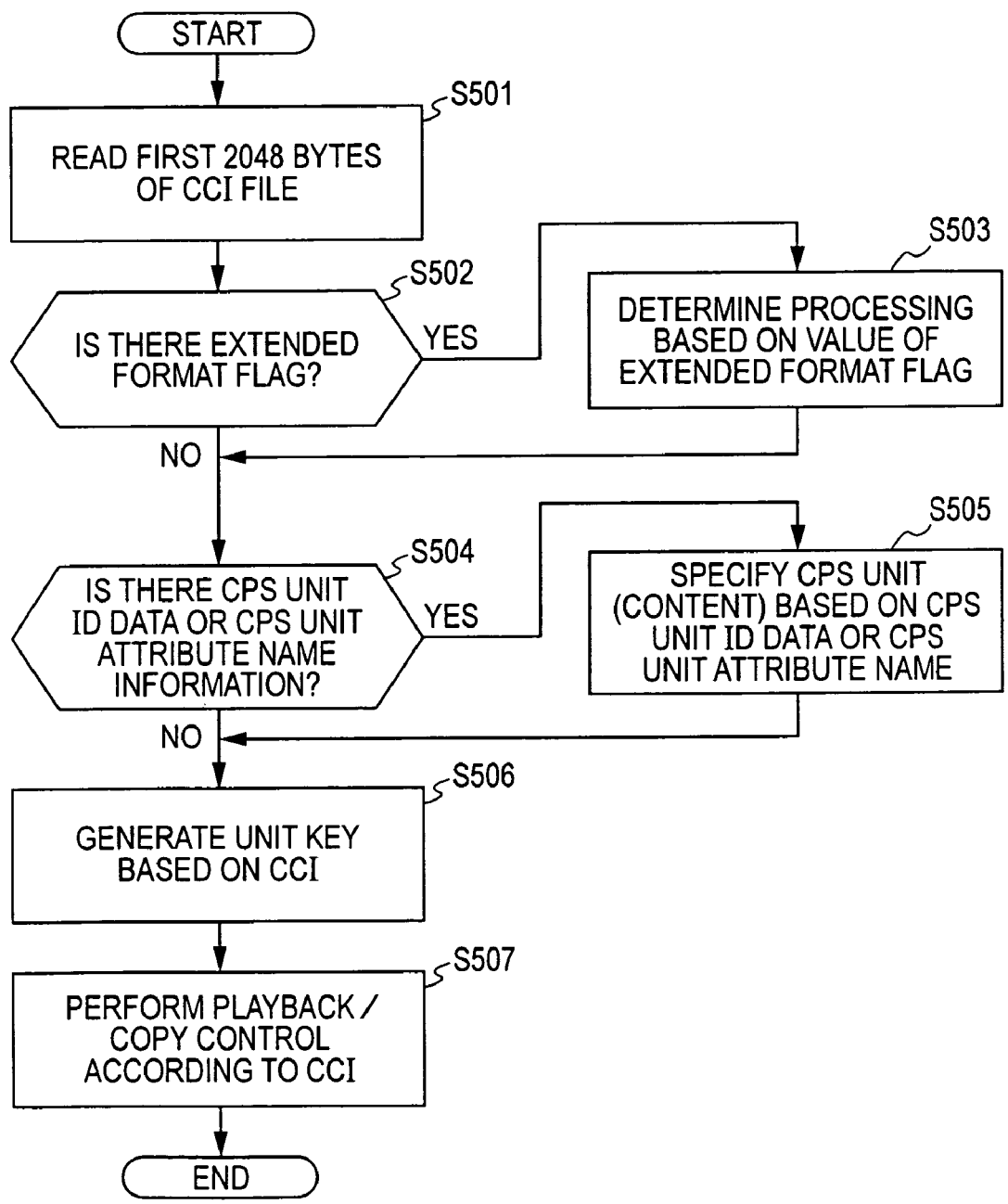
FIG. 45 is a flowchart illustrating a sequence performed by an information processing apparatus for executing processing according to various types of information read from playback/copy control information (CCI information)

The processing sequence shown in FIG. 45 is performed by a data processor, which reads content usage control information from the information recording medium, of the information processing apparatus. The data processor of the information processing apparatus has a content usage control information analyzer, which serves as one data processing function, for analyzing the content usage control information. The processing sequence shown in FIG. 45 is mainly executed by the content usage control information analyzer of the information processing apparatus.

In step S501, the information processing apparatus selects the content usage control information file (CCI file) corresponding to a specific CPS unit, and reads the first 2048 bytes of the data area of the first block of the file.

It is then determined in step S502 whether the content usage control information file (CCI file) contains an extended format flag. If so, the process proceeds to step S503 to check the value of the extended format flag. If the extended format flag [extended_format_flag] is 1, it is determined that a network connection is necessary for obtaining the CPS unit key for decrypting the content. If the information processing apparatus is a basic playback device that is difficult to connect to a network, a message indicating that the content cannot be played back is shown on the display. If the information processing apparatus is an extended playback device that can be connected to a network, it connects to a network to obtain the required information.

It is then determined in step S504 whether CPS-unit ID data or CPS-unit attribute name data is contained in the content usage control information file (CCI file). If such data is contained, the process proceeds to step S505 in which the information processing apparatus specifies the content (CPS unit) corresponding to the CCI file based on the data. If the content has already been specified, step S505 is not necessary.

Then, in step S506, a key is generated based on the CCI. That is, the unit key corresponding to the content management unit (CPS unit) is generated according to the processing discussed with reference to FIG. 40. When decrypting the content, the block key is generated based on the unit key, thereby decrypting the content into a plurality of blocks.

Then, in step S507, the content usage processing according to the playback/copy control information is performed depending on the type of information processing apparatus. That is, if the information processing apparatus is a basic playback device, content usage processing according to the basic control information is performed. If the information processing apparatus is an extended playback device, content usage processing according to the extended control information is performed.

11. Example of Configuration of Information Processing Apparatus

Figure 46:
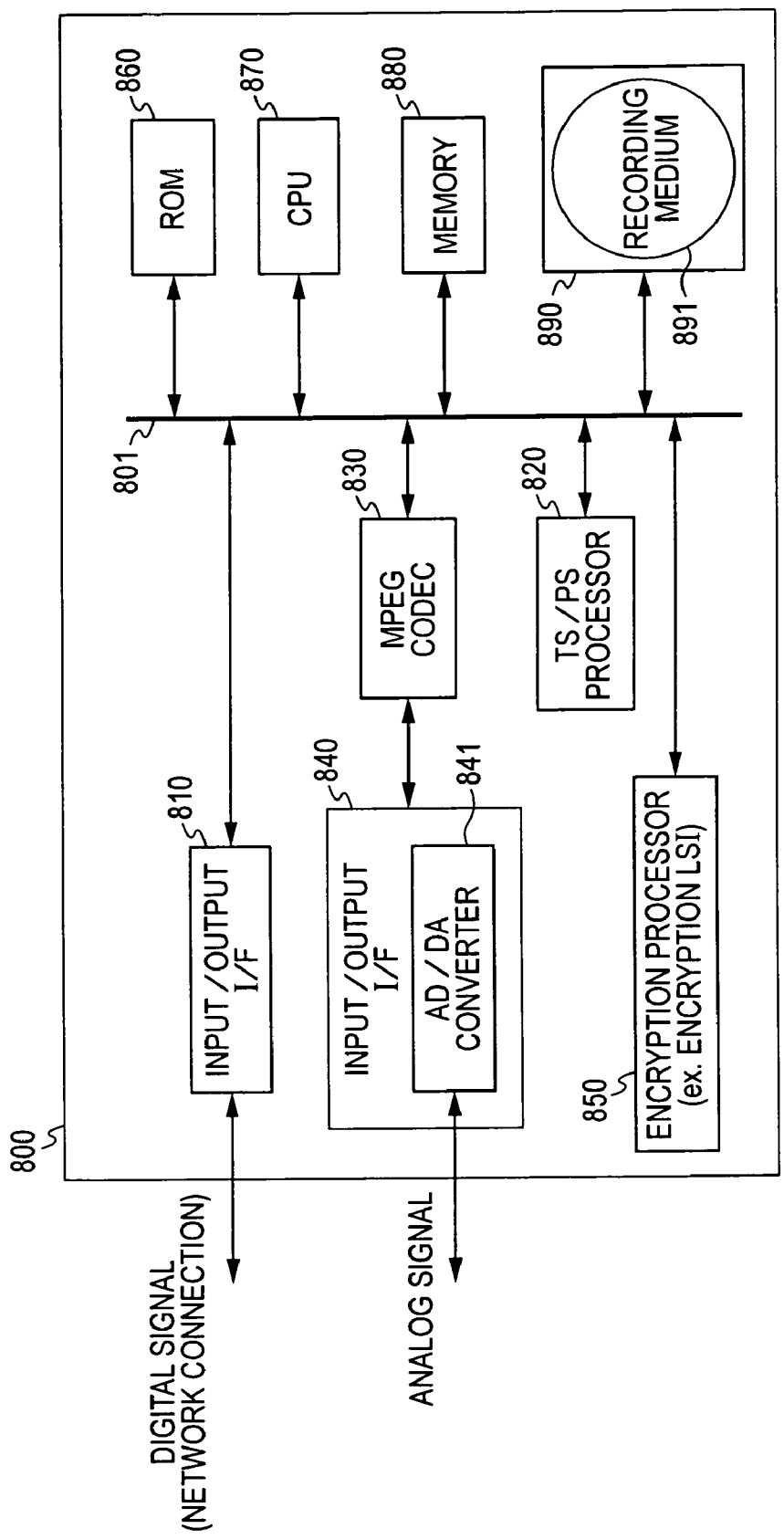
FIG. 46 is a block diagram illustrating an example of the configuration of an information processing apparatus in which an information recording medium is installed so as to playback content.

A description is now given, with reference to FIG. 46, of an example of the configuration of an information processing apparatus 800 for recording or playing back main content or sub-content having the above-described configuration of the content management unit (CPS unit).

The information processing apparatus 800 includes a drive 890 for driving an information recording medium 891 and for inputting/outputting a data recording/playback signal, a central processing unit (CPU) 870 for executing data processing according to various programs, a read only memory (ROM) 860 used as a storage area for programs and parameters, a memory 880, an input/output interface (I/F) 810 for inputting/outputting digital signals, an input/output I/F 840 for inputting/outputting analog signals and provided with an analog-to-digital (AD) or digital-to-analog (DA) converter 841, an MPEG codec 830 for encoding or decoding MPEG data, a transport stream/program stream (TS/PS) processor 820 for performing TS or PS processing, and an encryption processor 850 for executing various types of encryption processing. Those items are connected to a bus 801.

The data recording operation is first described. As data to be recorded, two types of signals, i.e., digital signals and analog signals can be considered.

A digital signal is input from the digital signal input/output I/F 810 and is subjected to encryption processing by the encryption processor 850 if necessary, and is then stored in the information recording medium 891. If the data format of the input digital signal is converted before being stored, it is converted into a data format by the MPEG codec 830, the CPU 870, and the TS/PS processor 820. The converted digital signal is then subjected to encryption processing by the encryption processor 850 if necessary, and is then stored in the information recording medium 891.

An analog signal is input from the input/output I/F 840 and is converted into a digital signal by the AD/DA converter 841 and is converted into a codec signal by the MPEG codec 830. Then, the resulting signal is converted into AV multiplex data, which is a recording format, by the TS/PS processor 820 and is subjected to encryption processing by the encryption processor 850 if necessary, and is then stored in the information recording medium 891.

For example, when recording main content, which is AV stream data including MPEG-TS data, the main content is divided into content management units (CPS units), which are encrypted with the corresponding unit keys by the encryption processor 850 and are recorded on the recording medium 891 by the drive 890.

As in the main content, sub-content is also divided into content management units (CPS units) corresponding to the data groups, and are encrypted with the unit keys by the encryption processor 850, and are recorded on the recording medium 891 by the drive 890.

The above-described management information, that is, the unit-structure/unit-key management table, such as that shown in FIG. 4, the state management table, such as that shown in FIG. 7, and the content-playback/copy-control information management table such as that shown in FIG. 8 or 9, can be formed and updated, and are recorded on the information recording medium 891 as tamper-proof data or encrypted data if necessary.

The playback operation of data from the information recording medium 891 is described below. For example, to play back AV stream data including MPEG-TS data as main content, when the data read from the information recording medium 891 in the drive 890 is identified as a content management unit, the unit key corresponding to the content management unit is obtained, and the content management unit is decrypted with the obtained unit key in the encryption processor 850 and is separated into video, audio, or subtitle data by the TS/PS processor 820.

The digital data decrypted in the MPEG codec 830 is converted into an analog signal in the AD/DA converter 841 in the input/output I/F 840. If the digital data is output as it is, the MPEG-TS data decrypted by the encryption processor 850 is output as digital data via the input/output I/F 810. In this case, the data is output to a digital interface, such as an IEEE1394 or Ethernet cable, or a wireless local area network (LAN). If the information processing apparatus 800 has a network connection function, the input/output I/F 810 also has a network connection function. If the data is converted into a format that can be received by a receiving device, the video, audio, or subtitle data separated by the TS/PS processor 820 is subjected to processing, such as rate conversion and codec conversion, in the MPEG codec 830, and is then multiplexed (MPEG-TS or MPEG-PS) in the TS/PS processor 820, and is then output from the digital input/output I/F 810. Alternatively, the data may be converted into a multiplexed file other than the MPEG format by using the CPU 870, and is then output from the digital input/output I/F 810.

As in the main content, to play back sub-content, when the sub-content is identified as a content management unit, the unit key associated with the content management unit is obtained, and the content-management unit is decrypted with the obtained unit key in the encryption processor 850 and is played back.

The above-described management information, that is, the unit-structure/unit-key management table, such as that shown in FIG. 4, the state management table, such as that shown in FIG. 7, and the content-playback/copy-control information management table such as that shown in FIG. 8 or 9, are read from the information recording medium 891 if they are stored therein, and are then stored in the memory 880. Key information for each content management unit (CPS unit) required for playing back content can be obtained from the data stored in the memory 880. If the management tables and the unit key are not stored in the information recording medium 891, they can be obtained from a network connected server according to a predetermined procedure.

As stated above, the content management unit (CPS unit) is set in association with main content or sub-content, and one unit key is set for each content management unit. The general playback control program for centrally controlling the playback operation of content detects that content management units have been changed, and switches the keys accordingly. If the key is not obtained, a message instructing the user to obtain the key is displayed.

If the content usage control information, that is, content playback/copy control information, is encrypted and set as tamper-proof data, when using the content, the encrypted content usage control information stored in the information recording medium is obtained and is decrypted with the unit key set for the content management unit. Then, the integrity of the content management unit is checked, and the content usage processing is performed based on the content usage control information only when the integrity of the content management unit is verified. The entire processing is controlled based on the data processing program executed by the CPU 870.

Additionally, various items of information contained in the content usage control information, i.e., the extended format flag, the CPS-unit ID data, the CPS-unit attribute name data, are obtained and the various types of processing based on the obtained data are executed according to the content usage control information analyzing program as the data processing program executed by the CPU 870.

If information required in an recording/playback device is obtained from an external device via a network, the obtained data is stored in the memory 880 of the recording/playback device. Data to be stored in the memory 880 includes key information required for playing back content, subtitles, audio information, or still image information to be played back together with the content, content management information, and operation rules of a playback device corresponding to the content management information.

The programs for executing the playback processing, the recording processing, the playback control information analyzing processing are stored in the ROM 806, and if necessary, the memory 880 is used as an area storing parameters or data or as a work area during the execution of the programs. Although in FIG. 46 the information processing apparatus 800 that can record and playback data is shown, an apparatus that can perform only a data recording operation or a playback operation may be formed. The present invention encompasses such apparatuses.

A series of processing described in the specification can be performed by hardware, software, or a combination thereof. If software is used, a program recording a processing sequence therein may be installed into a memory in a computer built in dedicated hardware and is executed. Alternatively, the program may be installed into a general-purpose computer that can execute various types of processing and is then executed.

The program may be recorded in a hard disk or a ROM as a recording medium. Alternatively, the program may be temporarily or permanently stored (recorded) in a removable recording medium, such as a flexible disk, a CD-ROM, a magneto-optical (MO) disk, a DVD, a magnetic disk, or a semiconductor memory. Such a removable recording medium can be provided as so-called "package software".

The program may be installed from the above-described removable recording medium into a computer. Alternatively, the program may be wirelessly transferred from a download site to a computer or may be transferred by wired means, such as a network, for example, a LAN or the Internet. The computer receives the transferred program and installs it in a built-in recording medium, such as in a hard disk.

The various types of processing described in the specification may be executed in chronological order discussed in the specification. However, they may be executed concurrently or individually according to the performance of an apparatus executing the processing or according to the necessity. The system in this specification means a logical set of a plurality of devices and it is not necessary that the devices be in the same housing.

While the present invention has been described with reference to exemplary embodiments, it is to be understood that the invention is not limited to the disclosed exemplary embodiments. It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a hardware computer data processor including a content usage control information analyzer configured to read content usage control information recorded on an information recording medium and to perform content usage processing according to the content usage control information,
wherein the content usage control information analyzer determines whether the usage of content corresponding to the content usage control information is allowed based on (1) a value of a flag included in the content usage control information, the flag being set to a first value when it is necessary to connect to a network to obtain information to decrypt the content, and (2) device information indicating whether the information processing apparatus is an extended device having an extended function of being able to connect to a network or a basic device without the extended function,
wherein the content usage control information includes basic control information and extended control information, and the content usage control information analyzer determines based on the value of the flag included in the basic control information whether the usage of content corresponding to the content usage control information is allowed.

2. The information processing apparatus according to claim 1, wherein, if the information processing apparatus is an extended device having an extended function, the information processing apparatus obtains, via a network, information necessary for using the content corresponding to the content usage control information based on the value of the flag included in the content usage control information.

3. The information processing apparatus according to claim 1, further comprising:
encryption processing means including a processor configured to decrypt encrypted content recorded on the information recording medium,
wherein the encryption processing means generates a unit key corresponding to each content management unit stored in the information recording medium and decrypts the content stored in the information recording medium by performing data processing using the unit key, and in generating the unit key, the encryption processing means performs data processing by using data of the content usage control information set for the content management unit.

4. A non-transitory information recording medium on which content whose usage is to be managed is recorded,
   wherein data included in the content is set as content management units,
   data included in each content management unit is stored as data encrypted based on a unit key associated with the content management unit, and
   content usage control information corresponding to each content management unit is stored, the content usage control information including a flag indicating whether the usage of the content is allowed depending on whether a device to use the content is an extended device having an extended function of being able to connect to a network or a basic device without the extended function, the flag being set to a first value when it is necessary to connect to a network to obtain information to decrypt the content,
   wherein the content usage control information includes basic control information and extended control information, and wherein the content usage control information is utilized to determine based on the value of the flag included in the basic control information whether the usage of content corresponding to the content usage control information is allowed.

5. The information recording medium according to claim 4, wherein the content usage control information includes information having tamper-proof data for the content usage control information.

6. The information recording medium according to claim 4, wherein the content usage control information includes a data portion having the flag set as a non-encrypted portion and an encrypted data portion.

7. An information processing method comprising:
   reading content usage control information recorded on an information recording medium;
   identifying a value of a flag included in the content usage control information; and
   determining, by a computer processor, whether the usage of content corresponding to the content usage control information is allowed based on (1) the value of the flag, the flag being set to a first value when it is necessary to connect to a network to obtain information to decrypt the content, and (2) device information indicating whether an information processing apparatus to use the content is an extended device having an extended function of being able to connect to a network or a basic device without the extended function,
   wherein the content usage control information includes basic control information and extended control information, and, in the determining, it is determined based on the value of the flag included in the basic control information whether the usage of content corresponding to the content usage control information is allowed.

8. The information processing method according to claim 7, further comprising:
   obtaining, if the information processing apparatus is an extended device having an extended function, via a network, information necessary for using the content corresponding to the content usage control information based on the value of the flag included in the content usage control information.

9. The information processing method according to claim 7, further comprising:
   generating a unit key corresponding to each content management unit stored in the information recording medium; and
   decrypting content stored in the information recording medium by performing data processing using the unit key,
   wherein, in the generating step, data processing by using data of the content usage control information set for the content management unit is performed.

10. A non-transitory computer readable medium storing computer executable instructions allowing a computer to analyze content usage control information, comprising:
    first computer executable instructions identifying a value of a flag included in the content usage control information read from an information recording medium; and
    second computer executable instructions determining whether the usage of content corresponding to the content usage control information is allowed based on (1) the value of the flag, the flag being set to a first value when it is necessary to connect to a network to obtain information to decrypt the content, and (2) device information indicating whether an information processing apparatus to use the content is an extended device having an extended function of being able to connect to a network or a basic device without the extended function,
    wherein the content usage control information includes basic control information and extended control information, and the second computer executable instructions utilize the content usage control information to determine based on the value of the flag included in the basic control information whether the usage of content corresponding to the content usage control information is allowed.

* * * * *